(12) United States Patent
Sato et al.

(10) Patent No.: US 6,249,362 B1
(45) Date of Patent: Jun. 19, 2001

(54) IMAGE READ APPARATUS, INFORMATION PROCESSING APPARATUS, AND IMAGE READ SYSTEM CONSTITUTED THEREWITH

(75) Inventors: Hidekage Sato, Kawasaki; Yasuhiro Tamekuni, Hiratsuka; Ryoichi Suzuki, Yokohama; Takashi Amikura, Tokyo, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/988,508

(22) Filed: Dec. 10, 1997

(30) Foreign Application Priority Data

Dec. 16, 1996 (JP) .................................................. 8-335775
Dec. 19, 1996 (JP) .................................................. 8-353923
Dec. 20, 1996 (JP) .................................................. 8-354728

(51) Int. Cl.[7] ............................. G03F 3/10; H04N 1/46; G06F 15/00
(52) U.S. Cl. ............................ 358/527; 358/509; 358/1.9
(58) Field of Search ........................ 358/527, 506, 358/537, 452, 434, 487, 1.9, 1.1, 509, 296; 396/116, 147, 151, 319; 382/162, 167; 352/59, 64, 123

(56) References Cited

U.S. PATENT DOCUMENTS

| | | | |
|---|---|---|---|
| 3,973,956 | * 8/1976 | Kuehnle | 96/1 R |
| 4,004,079 | 1/1977 | Boston | 358/456 |
| 4,255,766 | 3/1981 | Matsuda et al. | 358/435 |
| 4,516,139 | 5/1985 | Takiguchi | 347/15 |
| 4,953,012 | 8/1990 | Abe | 358/540 |
| 5,016,039 | * 5/1991 | Sosa et al. | 354/430 |
| 5,043,758 | * 8/1991 | Nealon | 355/40 |
| 5,124,742 | * 6/1992 | Yoshikawa | 355/27 |
| 5,321,520 | * 6/1994 | Inga et al. | 358/403 |
| 5,344,730 | * 9/1994 | Kitamoto | 430/14 |
| 5,383,027 | 1/1995 | Harvey et al. | 358/296 |
| 5,461,440 | * 10/1995 | Toyoda et al. | 354/106 |
| 5,467,168 | * 11/1995 | Kinjo et al. | 355/77 |
| 5,666,578 | * 9/1997 | Oikawa et al. | 396/319 |
| 5,696,576 | * 12/1997 | Itoh et al. | 355/40 |
| 5,768,642 | * 6/1998 | Sugiyama | 396/319 |
| 6,023,524 | * 2/2000 | Yamaguchi | 382/162 |

FOREIGN PATENT DOCUMENTS 0 422 688 A1  4/1991 (EP).
0 669 753 A2  8/1995 (EP).
6-119406  4/1994 (JP).

* cited by examiner

Primary Examiner—Madeleine Nguyen
(74) Attorney, Agent, or Firm—Morgan & Finnegan, LLP

(57) ABSTRACT

In an image read system which reads an image recorded on a film capable of holding incidental information of the image in an area different from the area where the image is recorded, the incidental information of the image recorded on the film is read, and the read image and the incidental information is processed and outputted as data of a single image.

35 Claims, 48 Drawing Sheets

| | |
|---|---|
| 1996. 3. 10 | 1996. 3. 10 |
| 1996年3月10日 | 1996. 3. 10 |
| '96-03-10 | *1996. 3. 10* |
| |  |

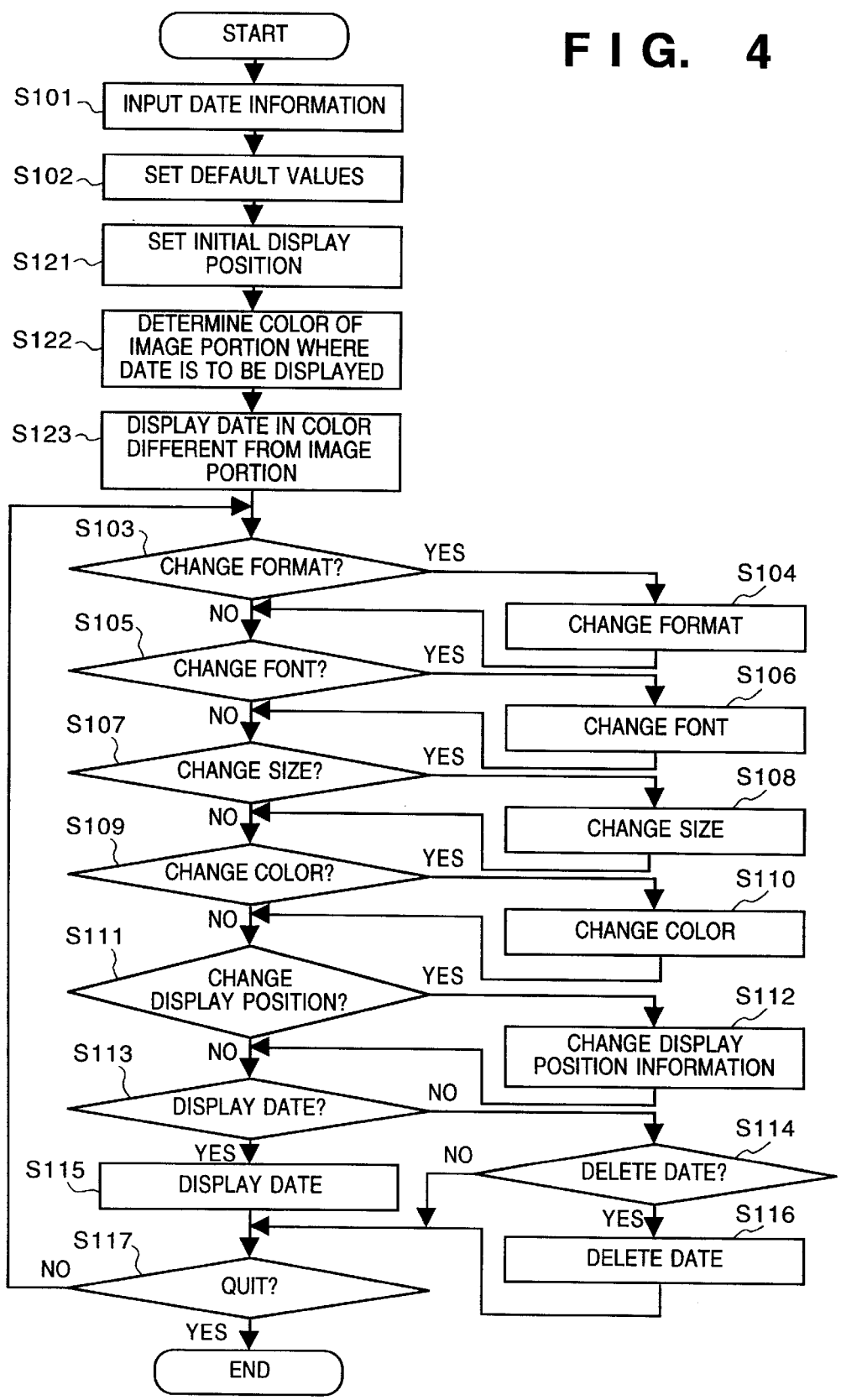

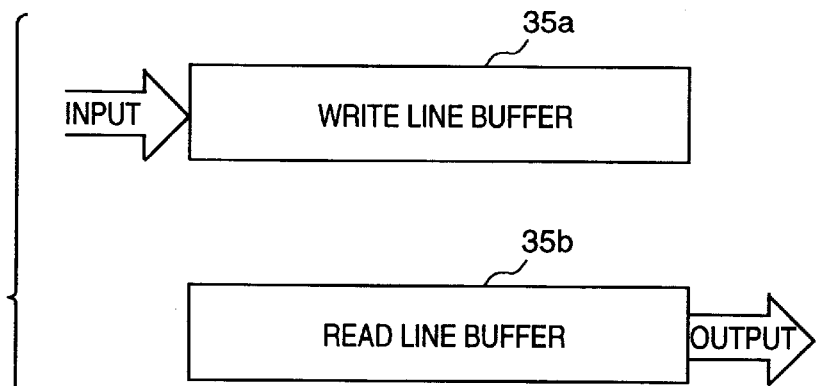
F I G. 12A
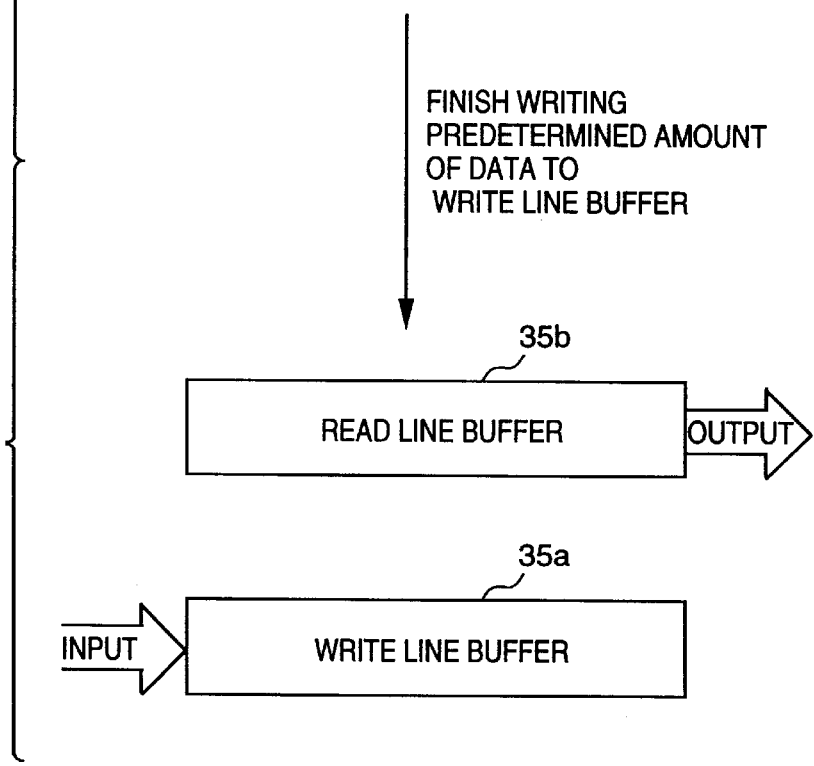
F I G. 12B

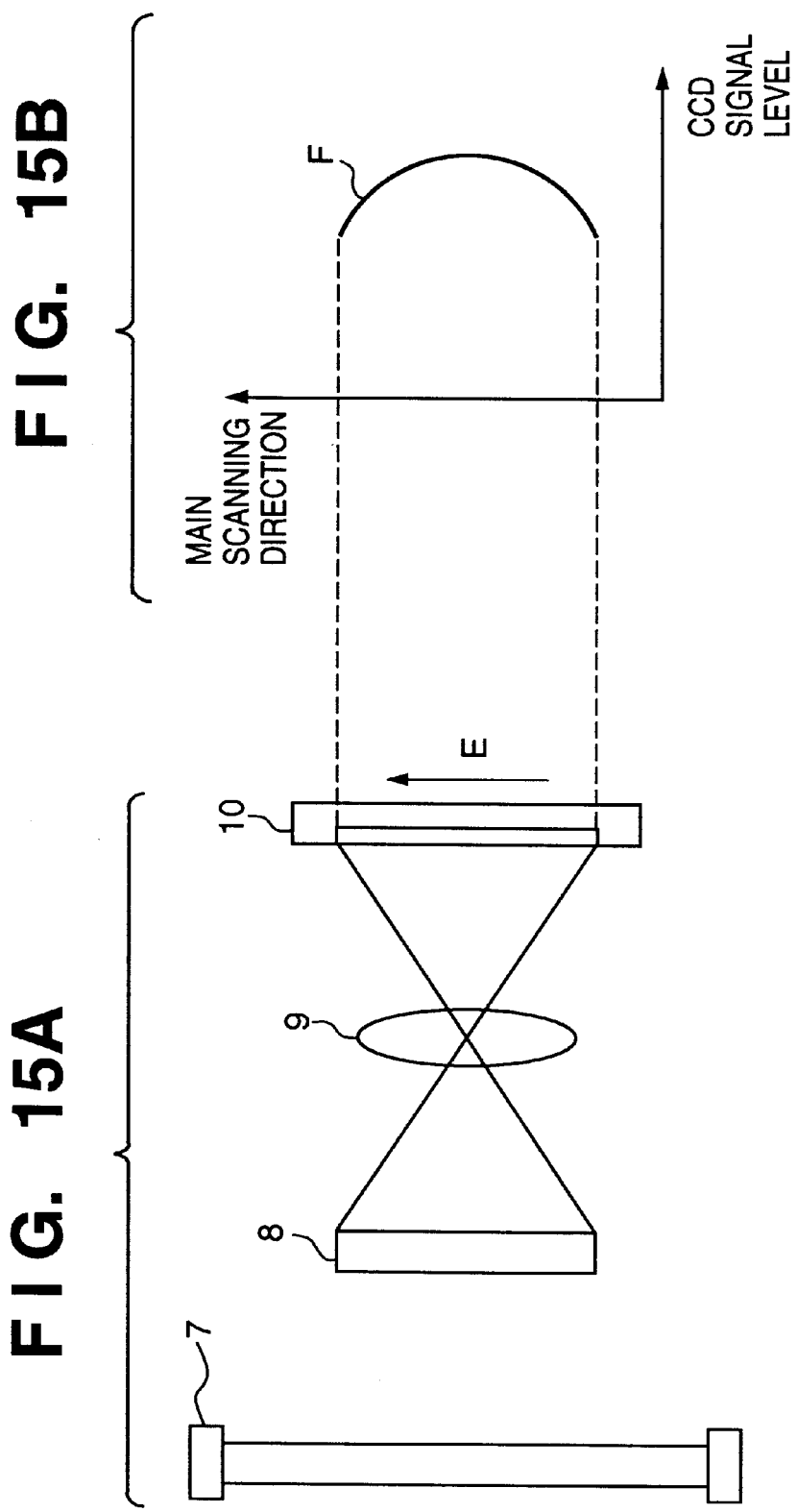

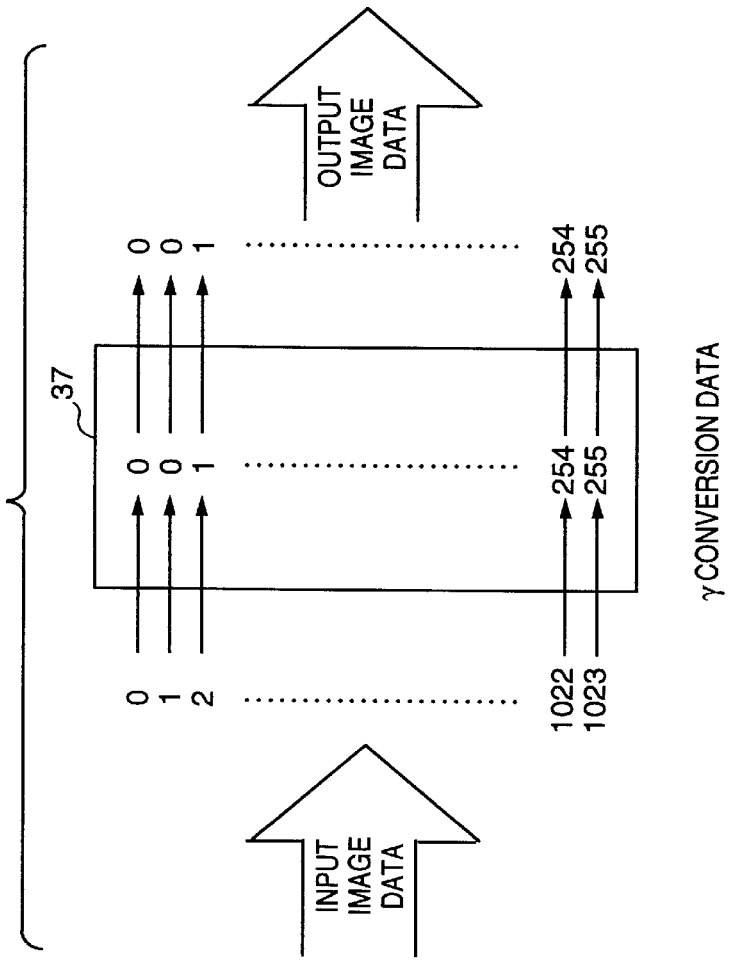
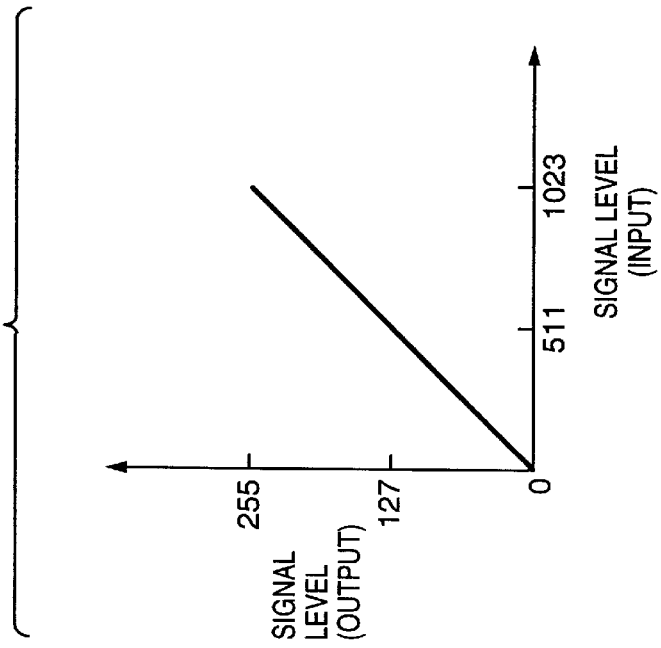
FIG. 16A
FIG. 16B

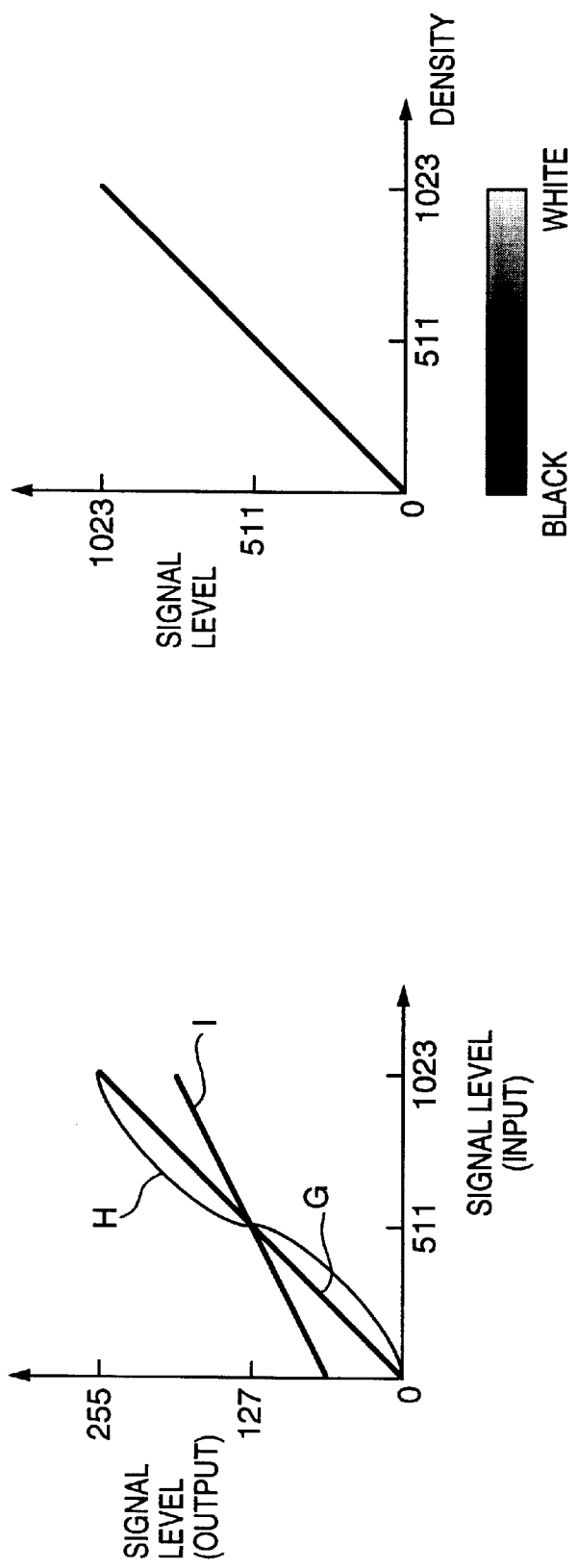

ORIGINAL IMAGE

OUTPUT IMAGE

ORIGINAL IMAGE

OUTPUT IMAGE

WRITTEN DIRECTION →

READ DIRECTION ←

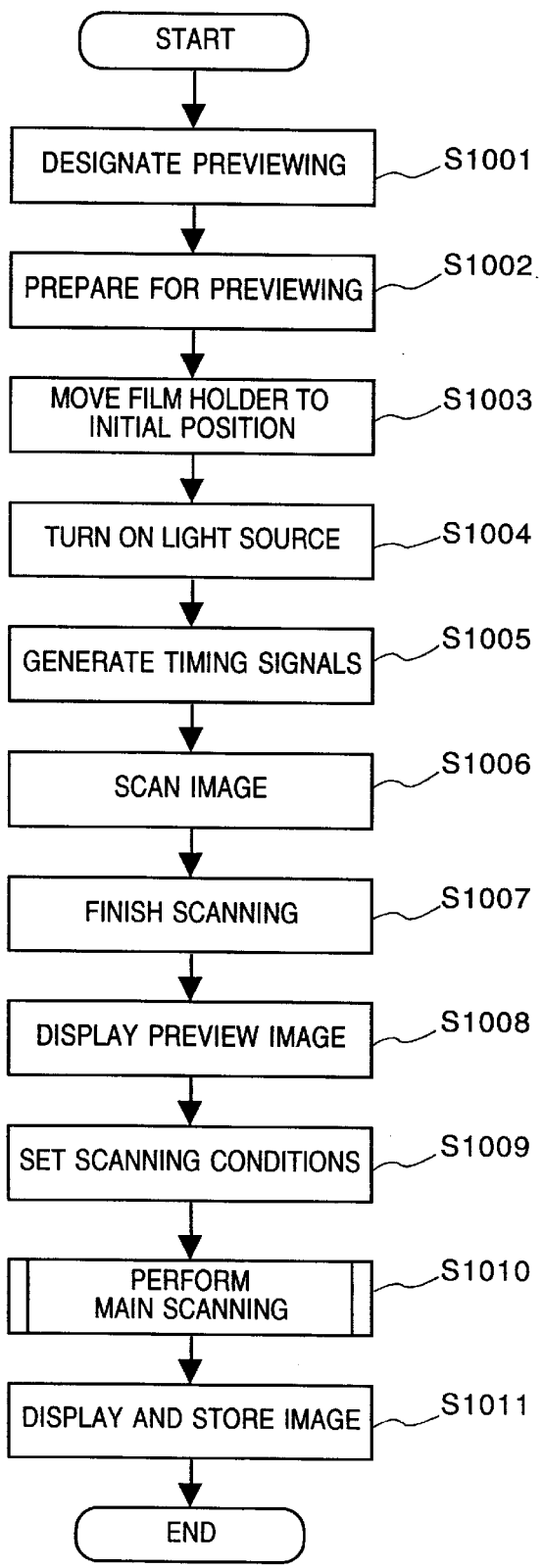

IMAGE READ APPARATUS, INFORMATION PROCESSING APPARATUS, AND IMAGE READ SYSTEM CONSTITUTED THEREWITH

BACKGROUND OF THE INVENTION

The present invention relates to an image read apparatus, an information processing apparatus, and a system constituted therewith and, more particularly, to an image read apparatus which reads an image together with information relating to the image and processes the image by using the information, and an information processing apparatus which controls a display device to display the read image, and a system constituted with the image read apparatus and the information processing apparatus.

A film scanner is known as an embodiment of an image processing apparatus for inputting an image recorded on a film to a device which displays the input image. A conventional film scanner has been developed for a 35 mm film. As a cartridge film conforming to an advanced photo-system (APS™) (referred to as "APS™ film" hereinafter) has been developed for practical use, a film scanner capable of reading image recorded on the APS™ film, as well, has been developed.

On the APS™ film, an image can be recorded in three different sizes: an H-type (high-vision type; length: breadth=9:16); a P-type whose length is shorter than that of the H-type (panoramic type; length:breadth=1:3), and a C-type whose breadth is shorter than that of the H-type (so-called Leica size; length:breadth=2:3). A user can select the desired size out of the three, then photographs an object. Further, various information (IX (information exchange) information), such as image sensing conditions, can be recorded on the APS™ film magnetically or optically.

An example of a conventional film scanner is explained. The conventional film scanner first scans an image in a low resolution at high speed, and after the scanned image is displayed on an external device (this processing is called "previewing" and the displayed image is called "preview image"), an area of the image to be read in a high resolution (main scan area) is designated on the preview image. Then, image data, read in the high resolution, of the image in the designated desired area is applied with predetermined image processes and transmitted from the film scanner to the external device.

FIG. 49 is a block diagram illustrating a configuration of a conventional film scanner 1001 capable of reading an image recorded on an APS™ film.

In FIG. 49, reference numeral 1008 denotes a film holder for holding an APS™ film (simply called "film" hereinafter) as a transparent original image. The film holder 1008 is configured movable in the sub-scanning direction (shown by an arrow a) by being driven by a sub-scanning motor 1012. The film holder 1008 has a protuberance (not shown), and an initial position of the film holder 1008 in the sub-scanning direction is detected by the sub-scanning position detector 1013 by detecting the protuberance. Then the detection signal is inputted to a system controller 1004. In turn, the system controller 1004 operates the sub-scanning motor 1012 via a sub-scanning motor driver 1011, thereby the film holder 1008 is moved back and forth in the sub-scanning direction shown by the arrow a.

When a light source 1007 turns on in accordance with the operation by a light-source on/off circuit 1006 in response to an instruction from the system controller 1004, an optical image which passed through the film further passes through a lens system 1009, and incidents on a CCD linear image sensor (referred to as "CCD" hereinafter) 1010 where the optical image is converted into an analog electric signal. Then, the analog electric signal is amplified by a predetermined gain and applied with clamping processing in an analog image processing unit 1453. The processed analog signal is converted into a digital image signal by an analog-digital (A/D) converter 1031. Thereafter, the digital image signal is applied with various image processes by an image processing unit 1033 at high speed. Thereafter, the processed digital image signal is temporarily stored in a line buffer 1035 for a while, and it is transmitted to an external device 1005 via an interface (I/F) 1036.

The system controller 1004, the image processing unit 1033, the line buffer 1035, the I/F 1036 and the system controller 1004 are connected to each other via a system bus 1038, and the system controller 1004 controls these units.

Note, the image processing unit 1033 provides an operation signal for operating the CCD 1010, and provides a sample-and-hold control signal for sampling and holding an input signal to the A/D converter 1031.

FIG. 50 is a flowchart showing an operational sequence of the film scanner 1001 and the external device 1005.

First in step S1001, previewing processing is designated. More specifically, the external device 1005 initiates a driver software stored in the external device 1005 in advance, and transmits various control information, such as type of film, area to be read, and resolution to be used, to the system controller 1004. In the previewing processing, the area to be read is an entire image recorded on the film and the resolution is set low.

Next, the system controller 1004 prepares for the previewing processing by setting the information provided from the external device 1005 in step S1002. Thereafter, the process proceeds to step S1003 where the system controller 1004 receives information from the sub-scanning position detector 1013 and controls the sub-scanning motor driver 1011 so that the film holder 1008 is moved to a predetermined initial position. Then, the system controller 1004 issues an instruction to turn on the light source 1007 to the light-source on/off circuit 1006 in step S1004. In the proceeding step S1005, the system controller 1004 issues an instruction to output timing signals, such as a CCD operation signal for reading one line of an image, to the image processing unit 1033.

Next in step S1006, scanning is performed. More specifically, the image is read line by line by exposing the CCD 1010 for a predetermined period of time while driving the sub-scanning motor 1012 at a predetermined speed, and predetermined image processes are performed on the obtained image data by the image processing unit 1033. Then, the image data is temporarily stored in the line buffer 1035, and transmitted to the external device 1005 via the I/F 1036.

After scanning the designated area of the image, the system controller 1004 drives the sub-scanning motor 1012 so as to move the film holder 1008 back to the initial position, turns off the light source 1007 in step S1007, thereby the scanning processing is completed. After that, the system controller 1004 is in stand-by state until a next command is received.

In turn, the external device 1005 receives the image data from the line buffer 1035 via the I/F 1036 and sequentially displays it on its display screen, thereby providing a preview image to a user in step S1008.

The process proceeds to step S1009 where the user sets image read (scanning) conditions while watching the preview image on the display screen. Here, similarly to a case where the previewing processing was designated in step S1001, various information, such as type of the film, area to be read, and resolution to be used, is transmitted to the system controller 1004. However, in this case, control information for main scanning operation, namely, area to be read designated by the user, and resolution to be used also designated by the user, and so on, is transmitted to the system controller 1004.

In turn, the system controller 1004 receives the image read conditions from the external device 1005 and performs the main scanning processing under the received image read conditions in step S1010 by repeating the processes in steps S1002 to S1007 as described above.

Thereafter, image data which is transmitted from the line buffer 1035 to the external device 1005 via the I/F 1036 is displayed on its display screen as well as stored in a predetermined storage medium (e.g., hard disk, magneto-optical disk, and floppy disk) in step S1011, thereby the entire processing is completed.

The aforesaid film scanner, however, has been developed for a 35 mm film, as described above, and, in a case of displaying a date, for example, the date which is recorded in the image is scanned along with the image, and displayed in a predetermined position of the displayed image.

Accordingly, even in a case where an image recorded on an APS™ film is read, as far as the conventional film scanner is used, the date which is recorded in the image is simply scanned along with the image and displayed. Therefore, it is not possible to erase or move the position of the date in the image without processing the image.

Further, even if the date is magnetically or optically recorded as the IX information of the APS™ film, but not recorded in the image, the data can not be inserted in the displayed image. As a result, the user may forget the date when the image is taken.

Further, in the conventional film scanner, a case where an object is sensed against the sun is not specifically considered. Therefore, when an image taken against the sun is displayed on a display screen, it is hard for the user to see it, and the image may not be expressed with desired contrast.

Further, in a conventional image read system configured with the film scanner and the external device for displaying a read image, even if an image which has been scanned before is to be read and displayed again, pre-screening processing has to be performed again, which is a waste of time. After the pre-scanning processing, a user reconfirms the image, then, main scanning is performed. Especially, once the film scanner or the external device is turned off, for scanning an image which has been scanned before, the operation shown in FIG. 50 is performed from the start, which is a waste of time, too.

SUMMARY OF THE INVENTION

The present invention has been made in consideration of the above situation, and has as its object to provide an image read apparatus, an information processing apparatus, and an image read system constituted therewith, capable of deleting displayed specific information, such as date stored in a film in correspondence with an image recorded on the film, from a displayed image, and moving a display position of the specific information to an arbitrary position.

According to the present invention, the foregoing first object is attained by providing an image read system which reads an image recorded on a film capable of holding incidental information of the image in an area different from an area where the image is recorded, the system comprising: reading means for reading the incidental information of the image recorded on the film; and processing means for processing the read image and the incidental information read by the reading means and outputting data of a single image.

The first object is also attained by providing an image read apparatus which reads an image recorded on a film capable of holding incidental information of the image in an area different from an area where the image is recorded, the apparatus comprising: reading means for reading the incidental information of the image recorded on the film; and outputting means for outputting the read image and the incidental information read by the reading means.

According to another aspect of the present invention, an information processing apparatus comprises: input means for inputting image data and associated incidental information from an external device; and processing means for processing the image data and the incidental information inputted by the input means and outputting data of a single image.

Further, it is the second object of the present invention to provide an image read apparatus capable of processing image data of an image on the basis of information recorded on a film accompanying the image.

According to the second embodiment, the foregoing object is attained by providing an image read apparatus which reads an image recorded on a film capable of holding incidental information of the image in an area different from an area where the image is recorded, the apparatus comprising: reading means for reading the incidental information of the image recorded on the film; and signal processing means for performing signal processes on an image signal of the read image in accordance with the incidental information read by the reading means.

More specifically, an image read apparatus capable of displaying an image of an object, which has been sensed against the sun, in a desired brightness on a display screen of a display device.

Accordingly, in the aforethe image read apparatus, when the backlight state information indicates that the image is taken against the sun and the supplemental light on/off information indicates that the image is sensed without turning on the supplemental light, the signal processing means preferably sets a higher gain to the amplification means than a case where the above two conditions are not satisfied.

Furthermore, the third object of the present invention provides an image read apparatus, an information processing apparatus, an image read system constituted therewith, and an image read method capable of obtaining a preview image of low resolution without performing scanning operation and swiftly reading an image from a film in high resolution in a case where the image has been read before.

According to the present invention, the foregoing third object is attained by providing an image read system having an image input apparatus, which reads an image recorded on a film capable of holding incidental information of the image in an area different from an area where the image is recorded, and an information processing apparatus, the system comprising:

identification detection means for detecting identification information in the incidental information recorded on the film; storage means for storing the identification information, detected by the identification detection means, and other information in relation to the identification information;

determination means for determining whether or not there is identification information, which had been stored in the storage means, identical to identification information newly detected by the identification detection means; and control means for, when the determination means determines that there is the identical identification information in the storage means, controlling to display the information which is stored in relation to the identical identification information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a flowchart showing date display processing by the external device according to a modification of the first embodiment of the present invention;

FIGS. 12A and 12B are conceptual views of a line buffer;

FIGS. 15A and 15B are views for explaining shading;

FIGS. 16A and 16B are views for explaining γ correction;

FIG. 17A is a graph showing examples of γ conversion data;

FIG. 17B is a graph showing relationship between densities and image signal levels;

FIG. 50 is a flowchart showing an operational sequence of the conventional film scanner and the external device.

DETAILED DESCRIPTION OF THE PREFERRED EMBODIMENTS

Preferred embodiments of the present invention will be described in detail in accordance with the accompanying drawings.

First Embodiment

Figure 1:
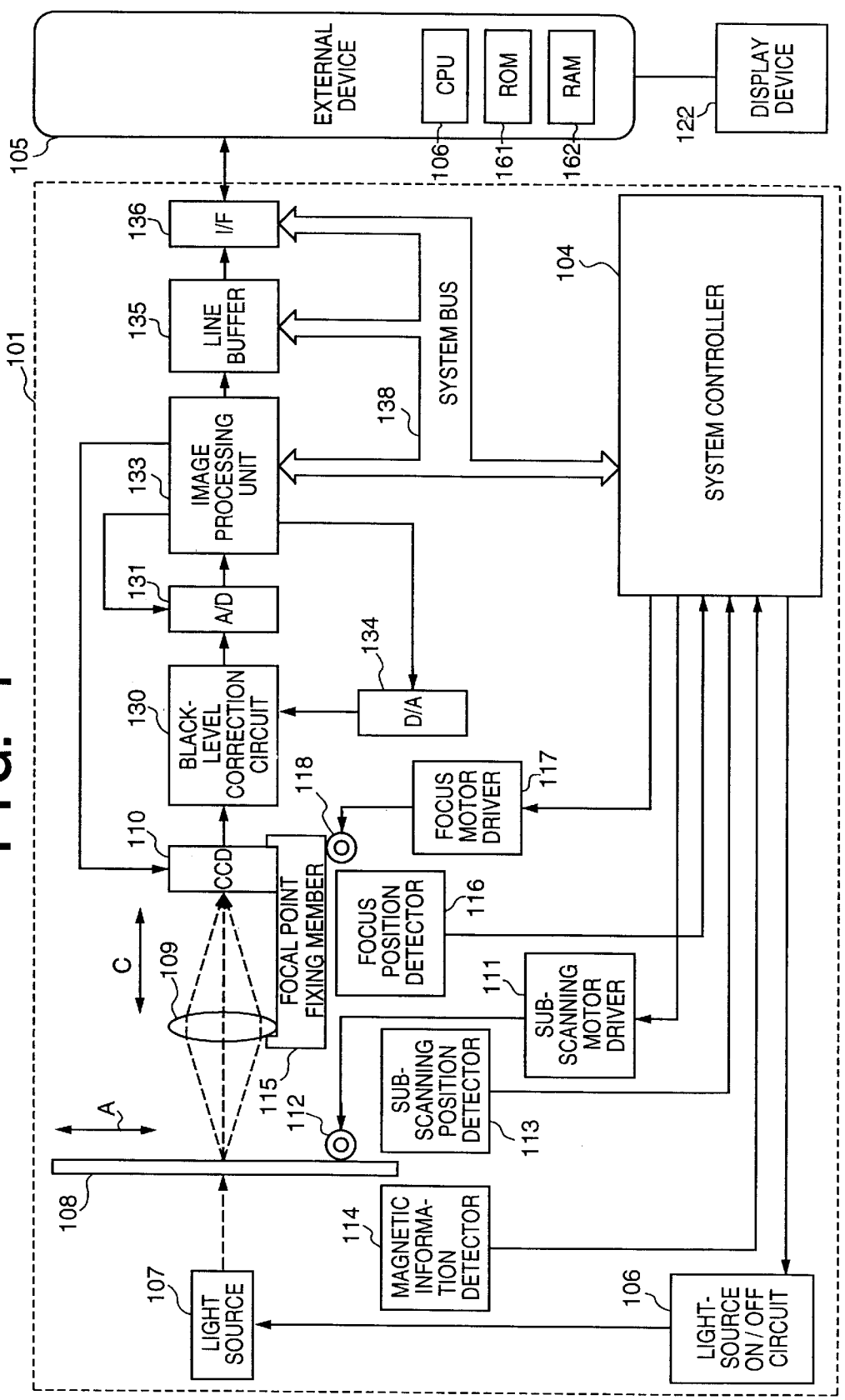
FIG. 1 is a block diagram illustrating a configuration of an image read system according to a first embodiment of the present invention.

FIG. 1 is a block diagram illustrating a configuration of an image read system according to a first embodiment of the present invention. As shown in FIG. 1, the image read apparatus is mainly constituted with a film scanner 101, an external device 105, and a display device 122.

In FIG. 1, reference numeral 107 denotes a light source having a cold-cathode tube; 108, a film holder for holding a transparent original image, namely a film, provided movable in the direction of an arrow A; 109, an optical system composed of a plurality of lenses; and 110, a linear image sensor basically constituted with CCD (referred to as "CCD 110" hereinafter) and provided near the optical system 109 in such a manner that the long side of the CCD 110 is normal to FIG. 1. In this arrangement, the main scanning direction, namely the long-side direction of the CCD 110, and the sub-scanning direction, which is the moving direction of the film holder 108, are orthogonal.

Reference numeral 115 denotes a focal point fixing member for holding the CCD 110 near the image plane of the optical system 109, and the CCD 110 and the optical system 109 are integrally moved back and forth along the optical axis, namely, in the direction shown by an arrow C.

Further, reference numeral 130 denotes a black level correction circuit for adjusting the black level of the analog image signal outputted from the CCD 110; 131, an analog-digital (A/D) converter for converting the analog image signal whose black level is corrected into a digital image signal; and 133, an image processing unit, configured with a gate array, for performing predetermined image processing (will be explained later) and providing a pulse used for operating the CCD 110. The image processing unit 133 performs various image processes at high speed. Further, reference numeral 135 denotes a line buffer, constituted with a general-purpose random access memory, for temporarily storing the image data; and 136, an interface (I/F) for communicating with an external device 105, such as a personal computer.

Furthermore, reference numeral 104 denotes a system controller storing an overall operational sequence of the film scanner 101, which controls various operations of each units in response to instructions from the external device 105; and 138, a system bus, which is configured with an address bus and a data bus, for connecting the system controller 104, the image processing unit 133, the line buffer 135, and the I/F 136.

Reference numeral 112 denotes a sub-scanning motor, a stepping motor, for moving the film holder 108 in the sub-scanning direction (in the direction of the arrow A); 111, a sub-scanning motor driver for driving the sub-scanning motor 112 in response to instructions from the system controller 104; and 113, a sub-scanning position detector for detecting the reference position of the film holder 108 in the sub-scanning direction by detecting the position of the protuberant shape (not shown) of the film holder 108 using a photo-interrupter.

Reference numeral 106 denotes a light-source on/off circuit, an inverter circuit, for turning on and off the light source 107; 114, a magnetic information detector, e.g., a magnetic reproducing head, for reading magnetic information recorded on the film; 117, a focus motor driver; 116, a focus position detector; and 122, the display device of the external device 105.

The external device 105, such as a personal computer, includes a CPU 160, ROM 161, RAM 162, etc., controls the image scanner 101 and the display device 122, and provides a user interface by executing the program stored, in advance, in the RAM 162.

An image formed on the CCD 110 is photo-electric converted, then applied with various signal processes by the image processing unit 133. Thereafter, the image signal is transmitted to the external device 105 via the I/F 136. The external device 105 controls the display device 122, such as a CRT, so as to display an image on the basis of the transmitted image signal on the display screen.

Meanwhile, the magnetic information detector 114 reads date information as specific information (IX information) in the first embodiment, and the obtained information is simultaneously transmitted to the external device 105 via the I/F 136 directly or after applied with processes, e.g., selection of necessary information, by the system controller 104.

The external device 105 initially does not display the date when it is not instructed by a user to do so, however, when it is instructed to display the date, it displays the date at a designated position in a designated format, font and size.

Next, an example of a film used in the first embodiment will be explained.

Figure 48:
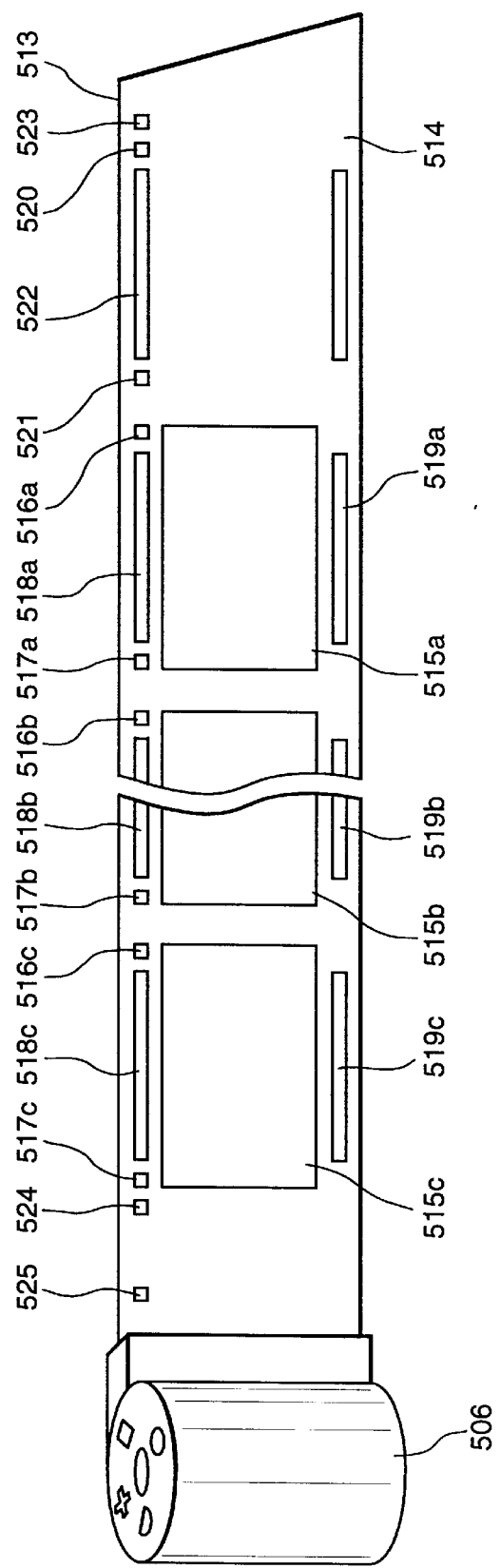
FIG. 48 is an explanatory view briefly showing a film to be set to a film scanner.
Figure 49:
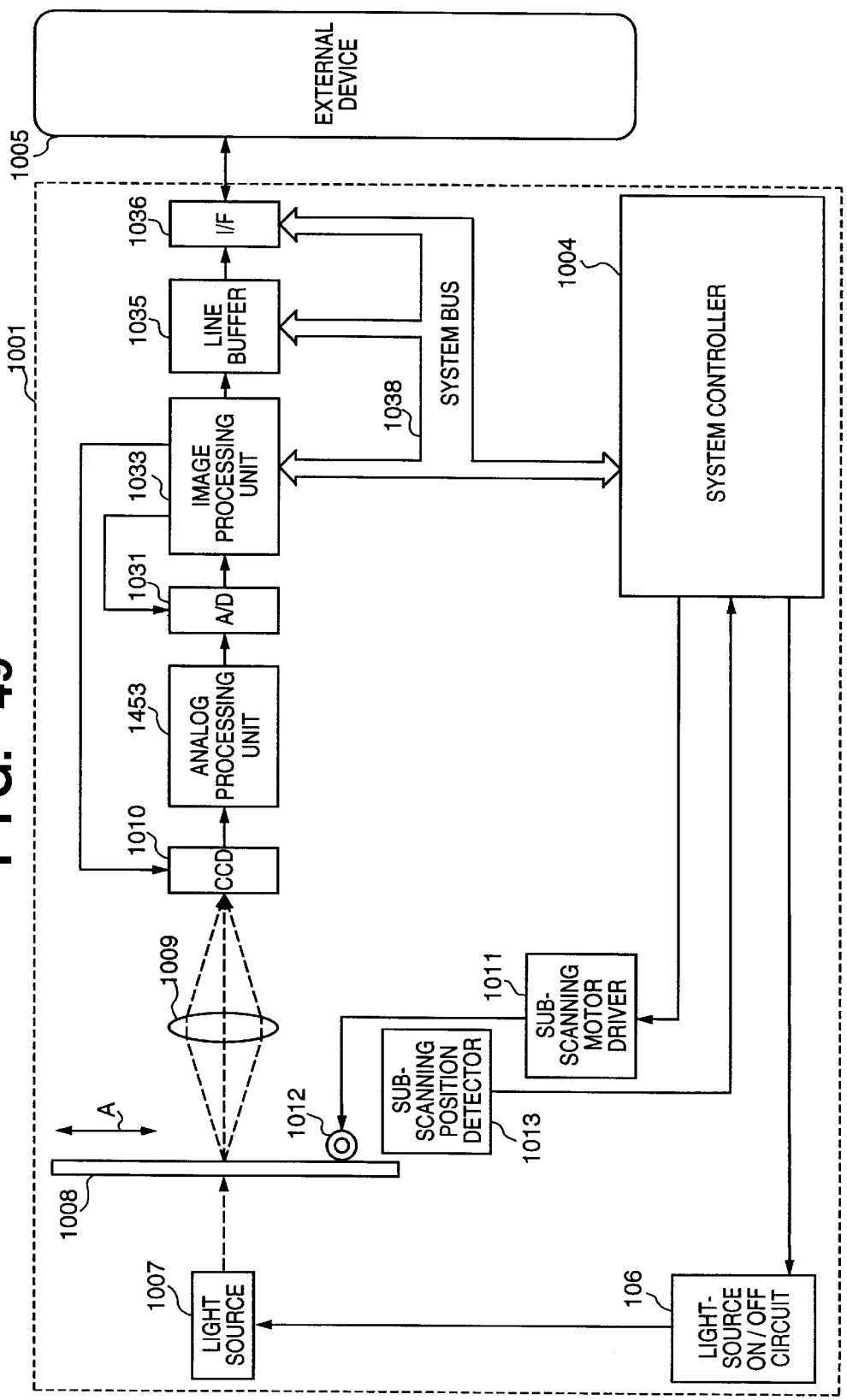
FIG. 49 is a block diagram illustrating a configuration of a conventional film scanner capable of reading an image recorded on an APS™ film.

FIG. 48 is an explanatory view briefly showing a film to be set to the film scanner 101. FIG. 48 shows a state when the film 513 is pulled out from the film cartridge 506.

A leader 514 of a predetermined length is provided in the front portions portion of the film 513, and in the succeeding portion to the leader 514, a number of frames 515a, 515b, 515c, . . . , are formed. At respective front ends in one side of the respective frames 515a, 515b, 515c, . . . , first perforations 516a, 516b, 516c, . . . , are formed, and at respective rear ends in the same side of the respective frames 515a, 515b, 515c, . . . , second perforations 517a, 517b, 517c, . . . , are formed. Further, between corresponding pairs of the first perforations 516a, 516b, 516c, . . . , and the second perforations 517a, 517b, 517c, . . . , first magnetic tracks 518a, 518b, 518c, . . . , are formed. On the first magnetic tracks 518a, 518b, 518c, . . . , development information, such as exposure conditions and frame numbers, are recorded. Further, in the other side of each frame, second magnetic tracks 519a, 519b, 519c, . . . , are formed across the frames 515a, 515b, 515c, . . . On the second magnetic tracks 519a, 519b, 519c, . . . , image sensing information, such as dates and image sensing conditions, are recorded.

Further, in the reader 514, a first leader perforation 520 and a second leader perforation 521 are formed at the same interval as that between the first perforations 515a, 515b, 515c, . . . , and the second perforations 516a, 516b, 516c, . . . Furthermore, between the first leader perforation 520 and the second leader perforation 521, a third magnetic track 522 is formed. On the third magnetic track 522, various information of the film 513, such as reproduction conditions, light-source characteristics, title of the film 513, and ID information, are recorded.

Further, in front of the first leader perforation 520, a third perforation 523 is formed at a predetermined distance from the first leader perforation 520. Furthermore, behind the last second perforation (517c in FIG. 48), a first trailing perforation 524 and a second trailing perforation 525 are formed at predetermined intervals. The interval between the last second perforation 517c and the first trailing perforation 524 and the interval between the first trailing perforation 524 and the second trailing perforation 525 are different.

Next, date display processing performed by the external device 105 will be explained with reference to a flowchart shown in FIG. 2. Note, the following processing is performed by the CPU 160 in accordance with a program stored, in advance, in the RAM 162.

First in step S101, data information obtained by the magnetic information detector 114 is inputted, then in step S102, default values of format, font, size, color, etc., for displaying the date are set.

Next in step S103, whether or not selection of format is requested is determined, and if YES, the format is changed in step S104 and the process proceeds to step S105, whereas if NO, the process directly proceeds to step S105.

Then, in step S105, whether or not selection of font is requested is determined, and if YES, the font is changed in step S106 and the process proceeds to step S107, whereas if NO, the process directly proceeds to step S107.

In step S107, whether or not selection of size is requested is determined, and if YES, the size is changed in step S108 and the process proceeds to step S109, whereas if NO, the process directly proceeds to step S109.

In step S109, whether or not selection of color is requested is determined, and if YES, the color is changed in step S110 and the process proceeds to step S111, whereas if NO, the process directly proceeds to step S111.

In step S111, whether or not a display position is designated is determined, and if YES, display position information is changed in step S112 and the process proceeds to step S113, whereas if NO, the process directly proceeds to step S113.

Next, in step S113, whether or not display of the date information is requested is determined, and if YES, the date is displayed in step S115 and the process proceeds to step S117. Whereas, if NO in step S113, then whether or not deletion of the date information from the display screen is requested is determined in step S114, and if YES, the date stops being displayed in step S116, then the process proceeds to step S117.

At last, whether or not to quit the date display processing is determined, if YES, then the date display processing is completed.

Examples of displayed images and date information are shown in FIGS. 3A to 3E.

Figure 3A:
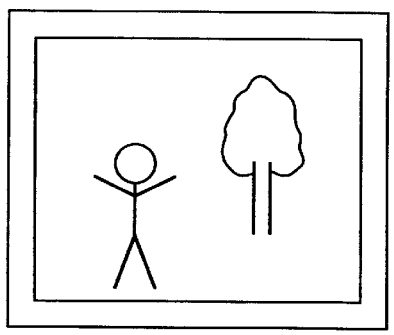
FIGS. 3A to 3E show examples of displayed images and date information according to the first embodiment of the present invention.
Figure 3D:
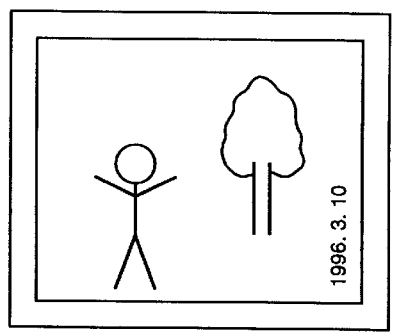
Figure 3B:
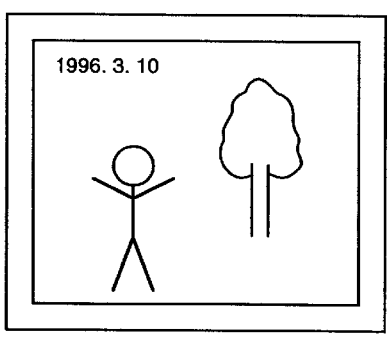
Figure 3E:
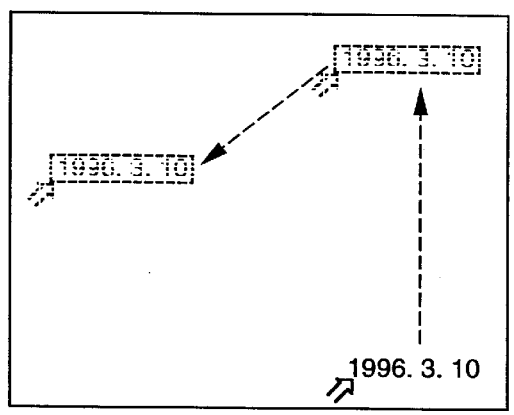
Figure 3C:

FIG. 3A is an example where the date is not requested and no date is displayed; FIG. 3B is an example when date is displayed on the upper-left corner of an image; FIG. 3C shows examples of format, size and font of date; FIG. 3D is an example when date is displayed after it is rotated; and FIG. 3E is an example when a display position of date is moved freely by using an input device (e.g., a mouse).

According to the first embodiment, as the film scanner reads date information recorded on a film and transmits it to the external device 105 having a display device 122, a user is able to control to display a date on the display screen at an arbitrary position in a preferred font, size and color, for instance.

Modification of the First Embodiment

In the above-described first embodiment, when an image read by the film scanner 101 is displayed for the first time, a date is not displayed, according to the processing described with reference to the flowchart in FIG. 2, however, it is possible to display the date in a predetermined format when displaying an image for the first time, as shown in a flowchart in FIG. 4.

Referring to FIG. 4, date information recorded on the film is inputted by the image scanner 101 to the external device 105 in step S101, then default values of font and size, for example, are set in step S102.

Thereafter, in step S121, an initial value of a display position is set, and a color of the portion of an image where the date is to be displayed is determined in step S122.

Next, in step S123, the date is displayed at the predetermined position in a predetermined format in a color different from the color of the image portion where the date is displayed.

Figure 2:
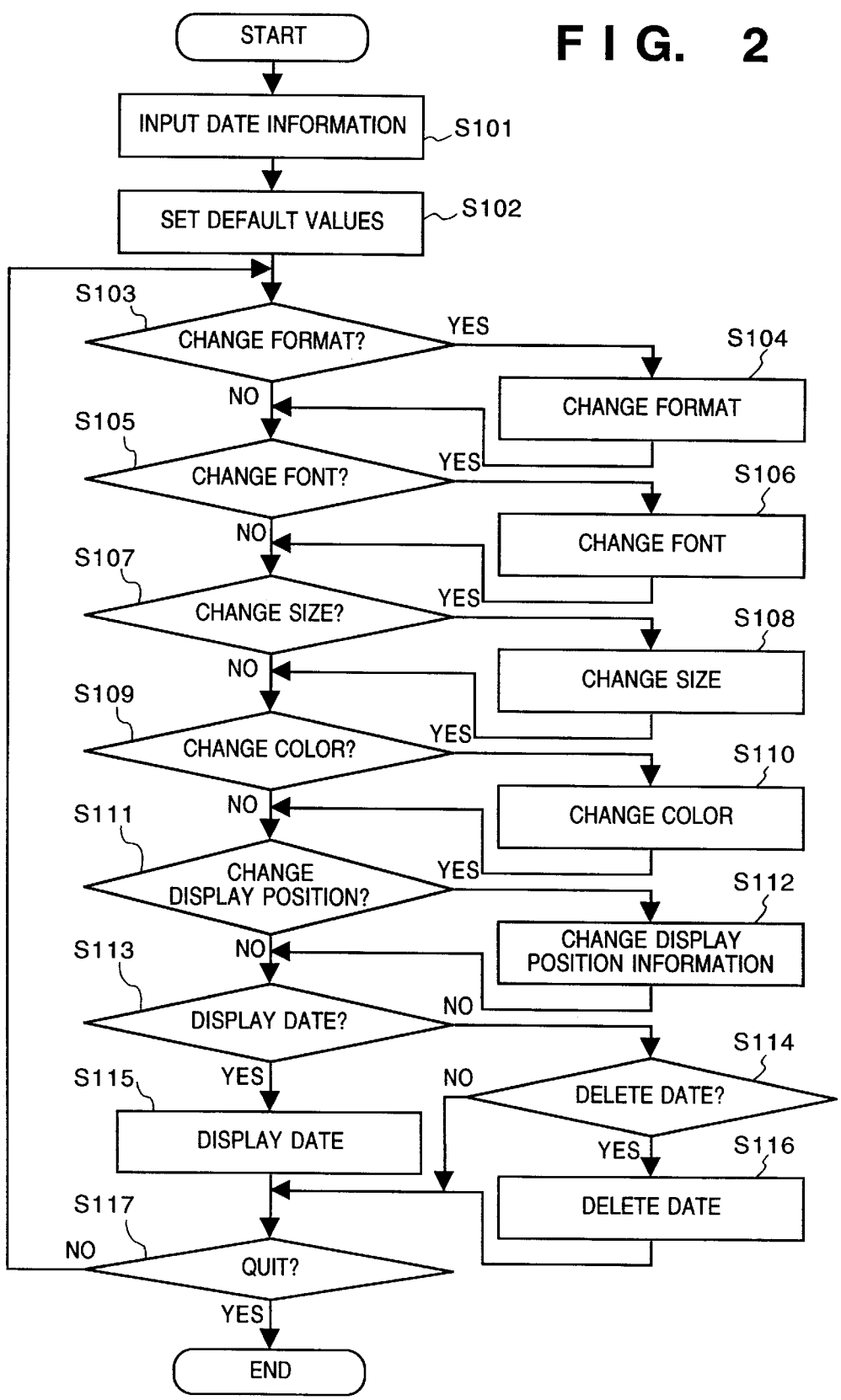
FIG. 2 is a flowchart of date display processing performed by an external device according to the first embodiment of the present invention.

In step S103 and subsequent steps, the same processes as shown in the flowchart in FIG. 2 explained in the first embodiment are performed.

Regarding the initial color of the date which is different from the background color (i.e., the color of the image portion), it may be a complementary color of the background color.

According to the modification of the first embodiment as described above, when an image recorded on a film is displayed for the first time, the corresponding date is automatically displayed in a color different from the background color. Thereby, the date is displayed so as to be clearly visible when it is displayed.

Further, timing for automatically selecting a color of the date in accordance with the background color, so as to be clearly visible, is not limited to the timing as described in the modification of the first embodiment, and it is possible to configure the image read system so as to automatically select the color at arbitrary timing.

Second Embodiment

A second embodiment of the present invention will be explained below.

Figure 5:
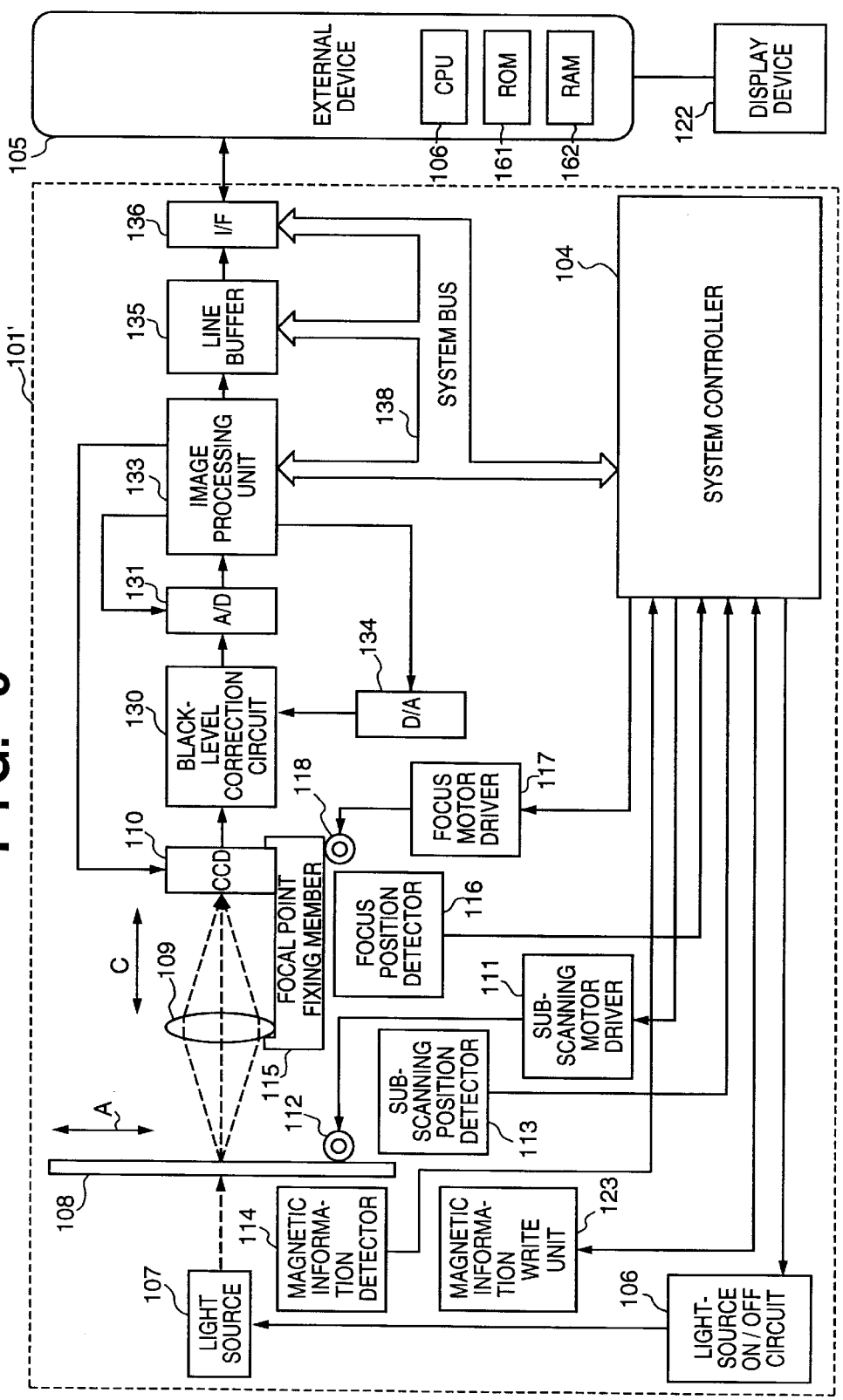
FIG. 5 is a block diagram illustrating a configuration of an image read system according to a second embodiment of the present invention.

FIG. 5 is a block diagram illustrating a configuration of an image read system according to the second embodiment of the present invention. Similarly to the first embodiment, the image read system is mainly constituted with a film scanner 101', the external device 105, and the display device 122. The difference between the configuration shown in FIG. 5 and the configuration shown in FIG. 1 is that a magnetic information write unit 123 is provided in FIG. 5, and the other units and elements are the same as those shown in FIG. 1.

Referring to FIG. 5, when a request for writing date display information, such as format, font, size, color and display position information of date, is transmitted from the external device 105 to the film scanner 101' via the I/F 136, then the system controller 104 controls the magnetic information write unit 123 to write the date display information in the magnetic track of the corresponding image in the film.

Further, when reading an image, whether or not the date display information is recorded is determined, and if it is, the date display information is transmitted to the external device 105 along with the read image. Accordingly, when the external device 105 displays the image on the display device 122, the date is also displayed based on the date display information.

Figure 6:
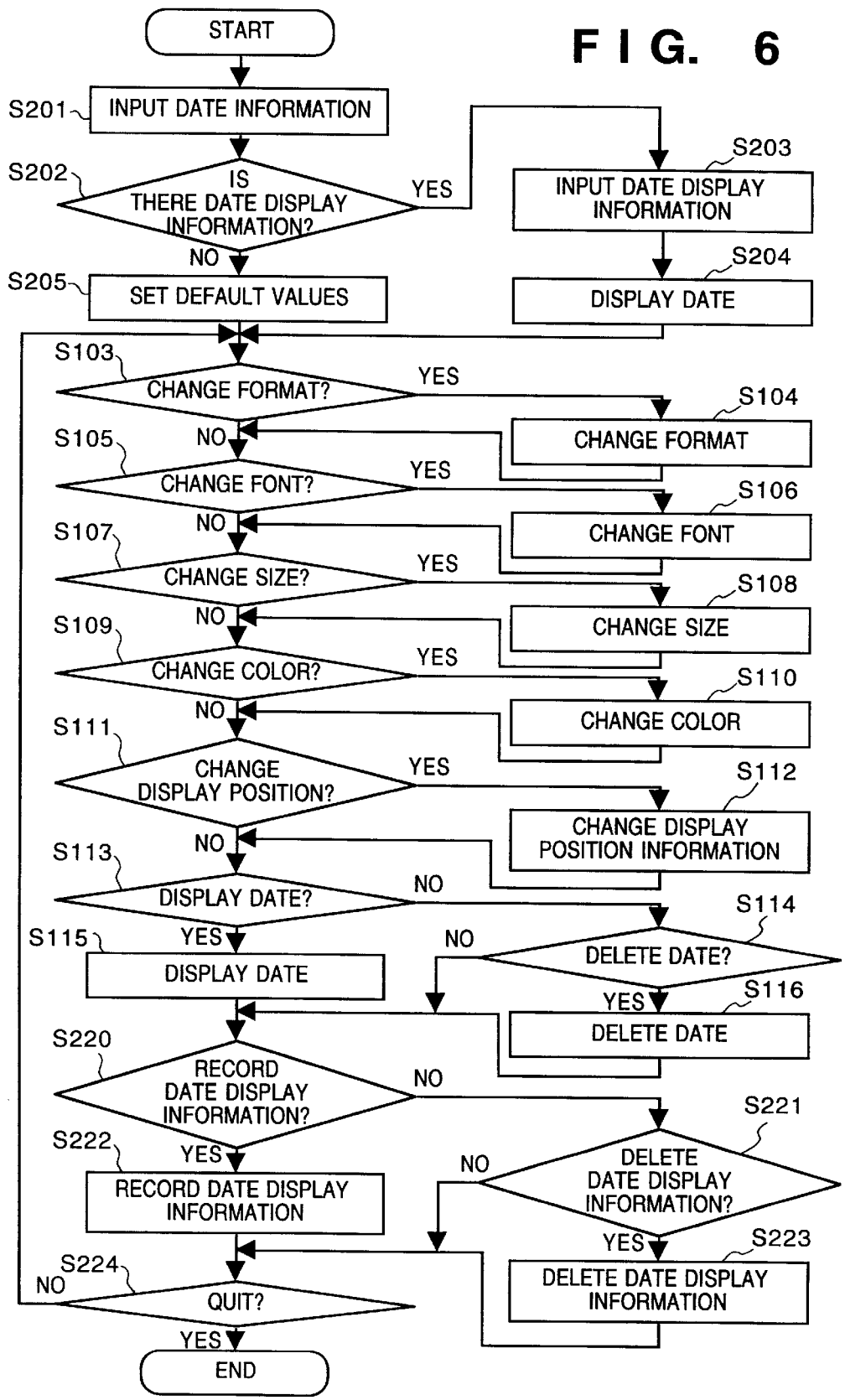
FIG. 6 is a flowchart of date display processing performed by the external device according to the second embodiment of the present invention.

Next, an operation of date display processing according to the second embodiment will be explained with reference to a flowchart in FIG. 6.

First, in step S201, date information is inputted, then in step S202, whether or not date display information is received is determined. If it is, a format, font, size, color and displayed position of the date to be displayed is obtained in step S203, and the date is displayed in step S204 on the basis of the information obtained in step S203, then the process proceeds to step S103.

Next, if the date display information is not received in step S202, then the process proceeds to step S205 where default values of format, font, and size for displaying the date are set in step S205, and the process proceeds to step S103.

Processes performed in step S103 to S116 are the same as those explained in the first embodiment with reference to FIG. 2. Namely, in step S103, whether or not selection of format is requested is determined, and if YES, the format is changed in step S104 and the process proceeds to step S105, whereas if NO, the process directly proceeds to step S105.

Then, in step S105, whether or not selection of font is requested is determined, and if YES, the font is changed in step S106 and the process proceeds to step S107, whereas if NO, the process directly proceeds to step S107.

In step S107, whether or not selection of size is requested is determined, and if YES, the size is changed in step S108 and the process proceeds to step S109, whereas if NO, the process directly proceeds to step S109.

In step S109, whether or not selection of color is requested is determined, and if YES, the color is changed in step S110 and the process proceeds to step S111, whereas if NO, the process directly proceeds to step S111.

In step S111, whether or not a display position is designated is determined, and if YES, display position information is changed in step S112 and the process proceeds to step S113, whereas if NO, the process directly proceeds to step S113.

Next, in step S113, whether or not display of the date information is requested is determined, and if YES, the date is displayed in step S115 and the process proceeds to step S220. Whereas, if No in step S113, then whether or not deletion of the date information from the display screen is requested is determined in step S114, and if YES, the date stops being displayed in step S116, then the process proceeds to step S220.

In step S220, whether or not there is a request for recording the display settings of the date, namely, new data display information, on the magnetic track of the film is determined, and if YES, the external device 105 instructs to the system controller 104 via the I/F 136 to control the magnetic information write unit 123, all shown in FIG. 5, to write the new date display information on the magnetic track of the film, and the process proceeds to step S224.

If there is no request for recording the date display information in step S220, the process proceeds to step S221 where whether or not date display information which is already recorded on the magnetic track is to be deleted is determined. If deletion is requested, then the date display information is deleted from the magnetic track in step S223, whereas, if the date information is not to be deleted, the process proceeds to step S224.

In step S224, whether or not to terminate the date display processing is determined, and if it is, the date display processing is completed.

According to the second embodiment as described above, by reading date information recorded on a film, it is possible for a user to display the date at an arbitrary position in a preferred font, size, and color, for example, along with an image. In addition, by recording date display information, such as the set display position, format, font, size and color, on a magnetic track of the film, when the image is read and displayed again, the date is automatically displayed under the conditions set in the previous display processing.

Third Embodiment

Figure 7:
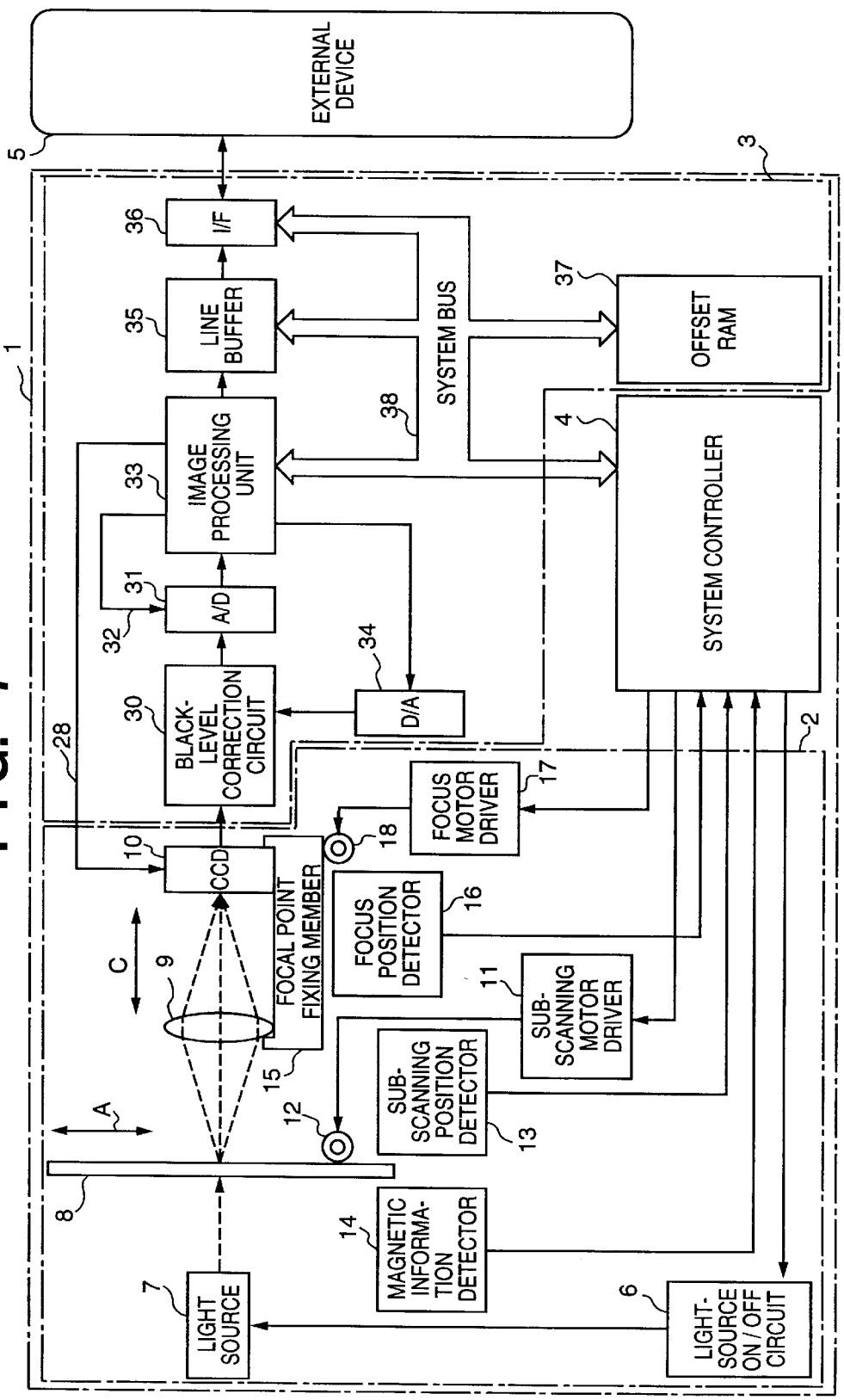
FIG. 7 is a block diagram illustrating a configuration of an image read system according to a third embodiment of the present invention.

FIG. 7 is a block diagram illustrating a configuration of an image read system according to a third embodiment of the present invention. The image read system includes an film scanner 1 and an external device, such as a personal computer. The film scanner 1 includes a photoelectric conversion subsystem 2 for converting an optical image to an electric signal, an image processing subsystem 3 for applying predetermined image processes to the image data which has been converted to electric signals by the photoelectric conversion subsystem 2, and a system controller 4 having a CPU for controlling the photoelectric conversion subsystem 2 and the image processing subsystem 3 and storage devices (e.g., ROM and RAM). The film scanner 1 is connected to an external device 5, such as a personal computer (information processing apparatus).

Note, a configuration of a film used in the third embodiment is the same as that described in the first embodiment with reference to FIG. 48, therefore, the explanation of it is omitted.

Configuration of the Photoelectric Conversion System 2

In the photoelectric conversion subsystem 2, a light source (projection means) 7 having a cold-cathode tube which turns on and off in accordance with an instruction from a light-source on/off circuit 6 which is controlled by the system controller 4, a film holder 8 for holding a transparent original image, namely a film, an optical system 9 composed of lenses, and a CCD 10, having three lines respectively covered with red (R), green (G), and blue (B) filters, for converting an optical image passed through the optical system 9 are arranged on an optical axis in the written order.

The film holder 8 is provided movable in the sub-scanning direction (in the direction of an arrow A) by being driven by a sub-scanning motor 12, including a stepping motor. At a proper edge portion of the film holder 8, a sub-scanning position detector 13 having a photo-interrupter is provided. The sub-scanning position detector 13 detects the position of a protuberant shape (not shown) of the film holder 8 as a reference position of the film holder 8 in the sub-scanning direction, and provides a detection signal of the protuberant shape to the system controller 4. In turn, the system controller 4 drives the sub-scanning motor 12 via a sub-scanning motor driver 11, thereby the film holder 8 is moved back and forth in the sub-scanning direction shown by the arrow A.

A magnetic information detector 14 includes a magnetic reproducing head and is provided at a proper position near the film holder 8. It obtains magnetic information recorded on the film, and provides an information signal to the system controller 4. Note, in the third embodiment, image sensing information; e.g., whether or not an image is sensed against the sun and whether or not the image is sensed using a strobe light; is recorded as the IX (information exchange) information in the magnetic tracks.

The CCD 10 is held near the image plane of the optical system 9 by a focal point fixing member 15, and the CCD 10 and the optical system are integrally moved back and forth along the optical axis in the direction shown by the arrow C. More specifically, a focus position detector 16 is arranged at a proper position near the focal point fixing member 15, detects an initial position of the focal point fixing member 15 (position where the focal point fixing member 15 is before performing a focusing operation), and sends the detection signal of the initial position to the system controller 4. In turn, the system controller 4 controls a focus motor driver 17 to drive a focus motor 18, thereby the lens system 9 and the CCD 10 fixed on the focal point fixing member 15 is moved integrally in the back and forth direction shown by the arrow C.

Figure 8:
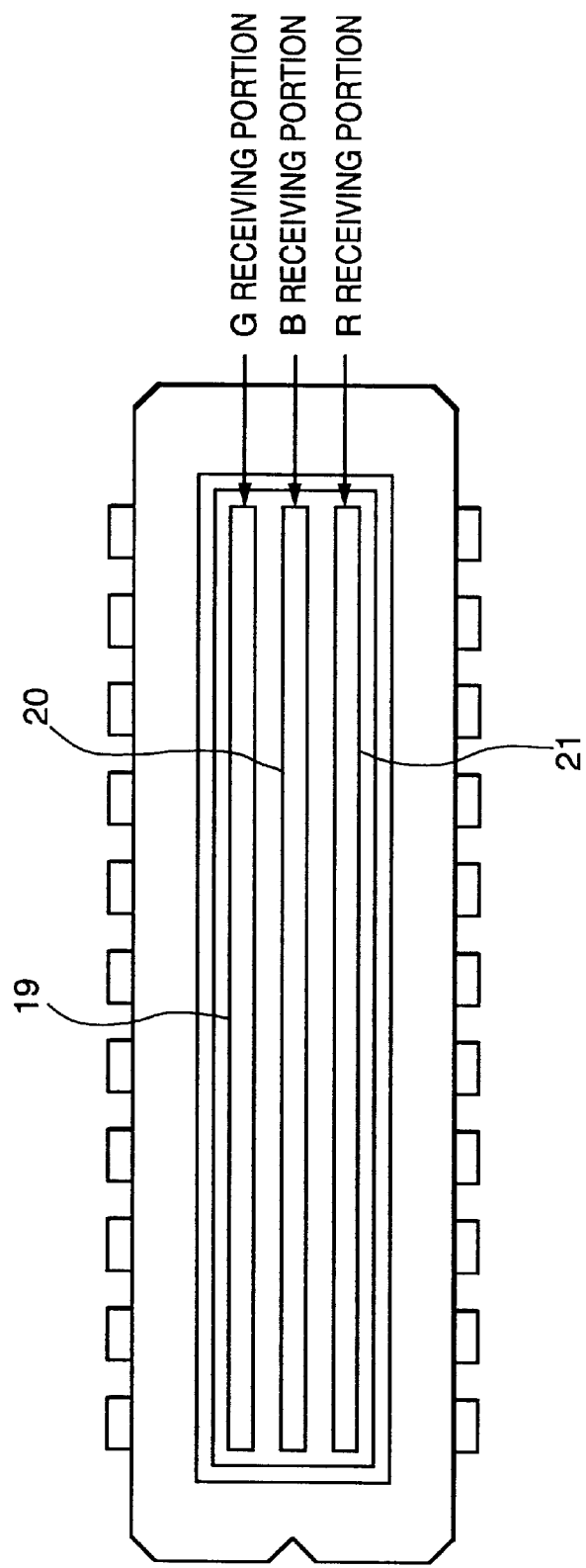
FIG. 8 is an explanatory view of a photosensing surface of a CCD.

The CCD 10 is provided in such a manner that the long side (main scanning direction) of the CCD 10 is normal to FIG. 7. The CCD 10 is configured with an one-chip photoelectric converting element on which a circuit for scanning is provided. The photosensing surface of the CCD 10 is as shown in FIG. 8. A green light (G) receiving portion 19, a blue light (B) receiving portion 20, and a red light (R) receiving portion 21 are arranged in parallel. More specifically, in the CCD 10, the G receiving portion 19, the B receiving portion 20, and R receiving portion 21, each of which is constituted with a great number of photo-reception elements of several-micrometer square, are arranged in parallel separated at a predetermined distance from each other.

Figure 9:
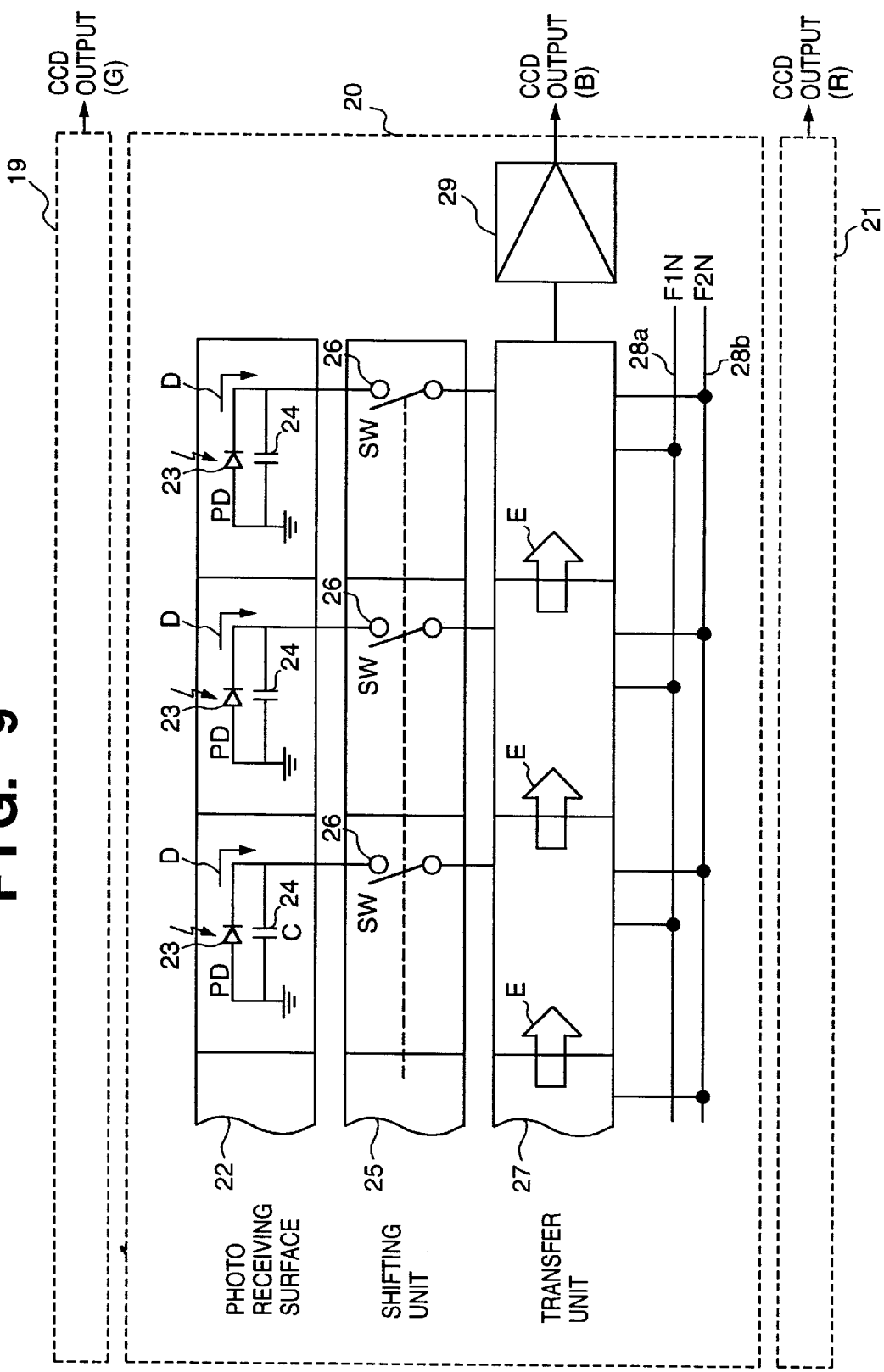
FIG. 9 is a diagram illustrating a detailed configuration of a blue light photo receiving portion 20 of the CCD shown in FIG. 8.

FIG. 9 is a diagram illustrating a detailed configuration of the B photo receiving portion 20 of the CCD 10. Since the configurations of the G and R photo receiving portions 19 and 21 are the same as that of the B photo receiving portion 20, explanation of them is omitted.

In the B photo receiving portion 20, light emitted from the light source 7 passes through the optical system 9 and incidents on a photo receiving surface 22 of the CCD 10, then charges proportional to the quantity of light are generated by photo-diodes 23 and current flows in the direction of an arrow D. Thereby, in condensers 24, the charges corresponding to the quantity of light are stored. The charges stored in the condensers 24 are simultaneously transmitted to a transfer unit 27 by simultaneously closing all switches 26 in a shifting unit 25. Thereafter, the charges transferred to the transfer unit 27 are further transferred in the main scanning direction, shown by an arrow E, in synchronization with CCD operation signals 28a and 28b, generated by the image processing unit 33 which will be explained later, having different phases. Further, the transferred charges are amplified by proper gains by the amplifier 29, and the amplified charges, namely, electric image signals (CCD outputs) are outputted to the image processing subsystem 3. Configuration of the Image Processing System 3

Referring to FIG. 7, the image processing subsystem 3 includes: a black level correction circuit 30 for adjusting a black level of electric image signals (analog signals) outputted from the photoelectric conversion subsystem 2; an analog-digital (A/D) converter 31 for converting an analog image signal whose black level is corrected into a digital image signal; the image processing unit 33, configured with a gate array, for performing predetermined image processing and providing a clock signal 28 to the CCD 10 used for operating it, as well as providing a control signal 32 to the A/D converter 31 used for sample-and-hold processing; a digital-analog (D/A) converter 34 for converting the digital image signal processed by the image processing unit 33 into an analog image signal and providing the analog image signal to the black level correction circuit 30; a line buffer 35 for temporarily storing the image data outputted from the image processing unit 33; an interface (I/F) 36 configured with a SCSI (small computer system interface) controller which controls interface operation with the external device 5; and an offset RAM 37 used as a working area for the image processing performed by the image processing unit 33. The image processing unit 33, the line buffer 35, I/F 36, and the offset RAM 37 are connected to the system controller 4 via a system bus 38, and those units are controlled by the system controller 4.

Figure 10:
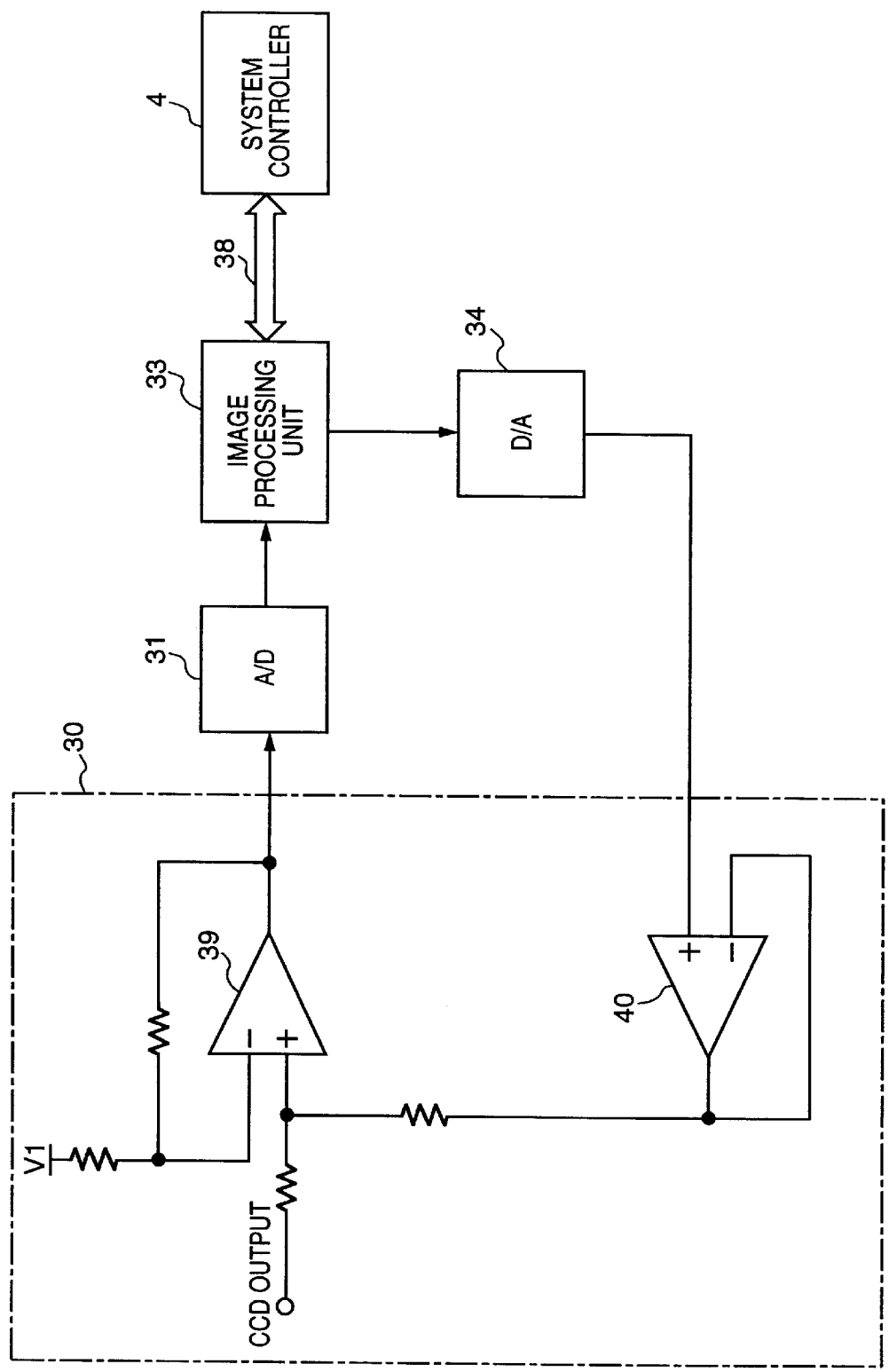
FIG. 10 is a circuit diagram of a black level correction circuit and its peripheral units.

FIG. 10 is a circuit diagram of the black level correction circuit 30 and its peripheral units. As shown in FIG. 10, the black level correction circuit 30 has first and second comparators 39 and 40. Meanwhile, the system controller 4 regularly checks a voltage applied to the image processing unit 33 by the A/D converter 31 via the system bus 38. Then, when the voltage which is equal or higher than a predetermined voltage V1 (e.g., 5V), is applied to the first comparator 39, the system controller 4 generates data, which reduces a voltage of an image signal, i.e., output signal from the CCD 10, inputted to the positive terminal of the first comparator 39 to a voltage less than the predetermined voltage V1, on the basis of the image data which is analog-digital converted by the A/D converter 31. Thereafter, the generated data is converted into an analog electric signal by the D/A converter 34 and added to an output signal from the CCD 10. By lowering the voltage applied to the A/D converter 31, as described above, black level is stabilized. More specifically, since the black level of the output signal from the CCD 10 is not sufficiently stabilized only by amplifying the output signal by the amplifier 29, the black level correction circuit 30 adjusts the output from the CCD 10 and fixes the black level of image data so that the maximum voltage of a signal inputted to the A/D converter 31 is the predetermined voltage V1. Note, the aforesaid black level correction is performed for each of R, G and B signals in parallel.

Figure 11:
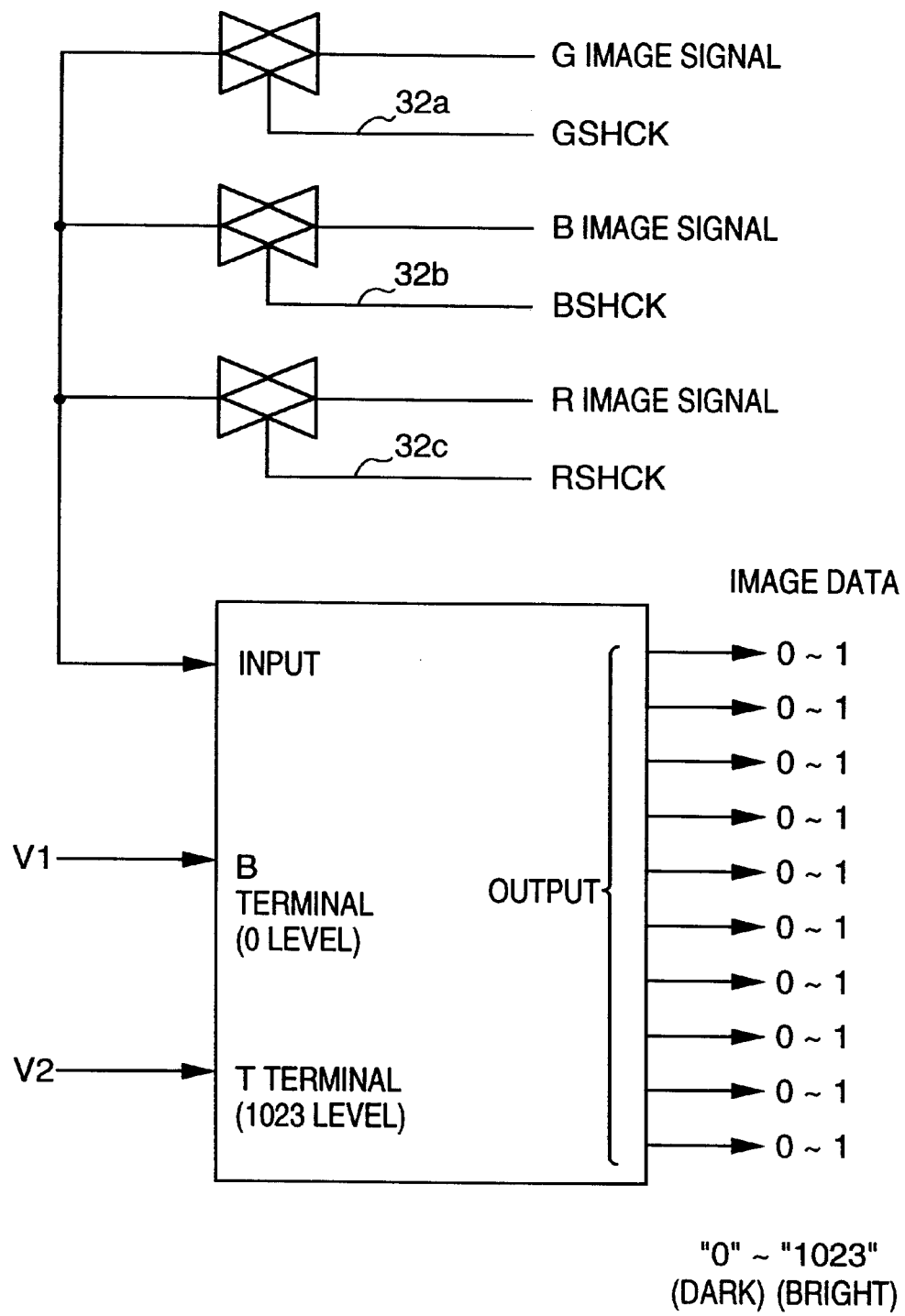
FIG. 11 is a diagram for explaining an operation of an A/D converter.

FIG. 11 is a diagram for explaining an operation of the A/D converter 31. Referring to FIG. 11, sample-and-hold signals (GSHCK, BSHCK, RSHCK) 32a to 32c for respective colors are provided from the image processing unit 33 to the A/D converter 31, and analog image signals are converted to ten-bit digital image signals by the A/D converter 31 in the order of G image signal, B image signal and R image signal, in accordance with the sample-and-hold signals 32a to 32c. More specifically, the A/D converter 31 has a B terminal and a T terminal, and the predetermined voltage V1 (e.g., 5V) is applied to the B terminal, and a reference voltage V2 (e.g., 2.5V) is applied to the T terminal. Then, the A/D converter 31 outputs, for example, "0" from all the output terminals ("0" as an image signal level) when an inputted analog electric image signal is the predetermined voltage V1, whereas outputs "1" from all the output terminals (namely, "1023" as an image signal level) when the inputted analog electric image signal is the reference voltage V2. Likewise, the A/D converter converts an analog image signal into a ten-bit digital image signal.

The line buffer 35 for temporally storing the processed image data is conceptually divided into two blocks, namely, a write line buffer 35a and a read line buffer 35b, as shown in FIGS. 12A and 12B. While image data is written to the write line buffer 35a (FIG. 12A), image data is read from the read line buffer 35b and another image data inputted to the I/F 36. When the write line buffer 35a is written to its full capacity, the write line buffer 35a is changed to the read line buffer 35b and the read line buffer 35b is changed to the write line buffer 35a, as shown in FIG. 12B.

Figure 13:
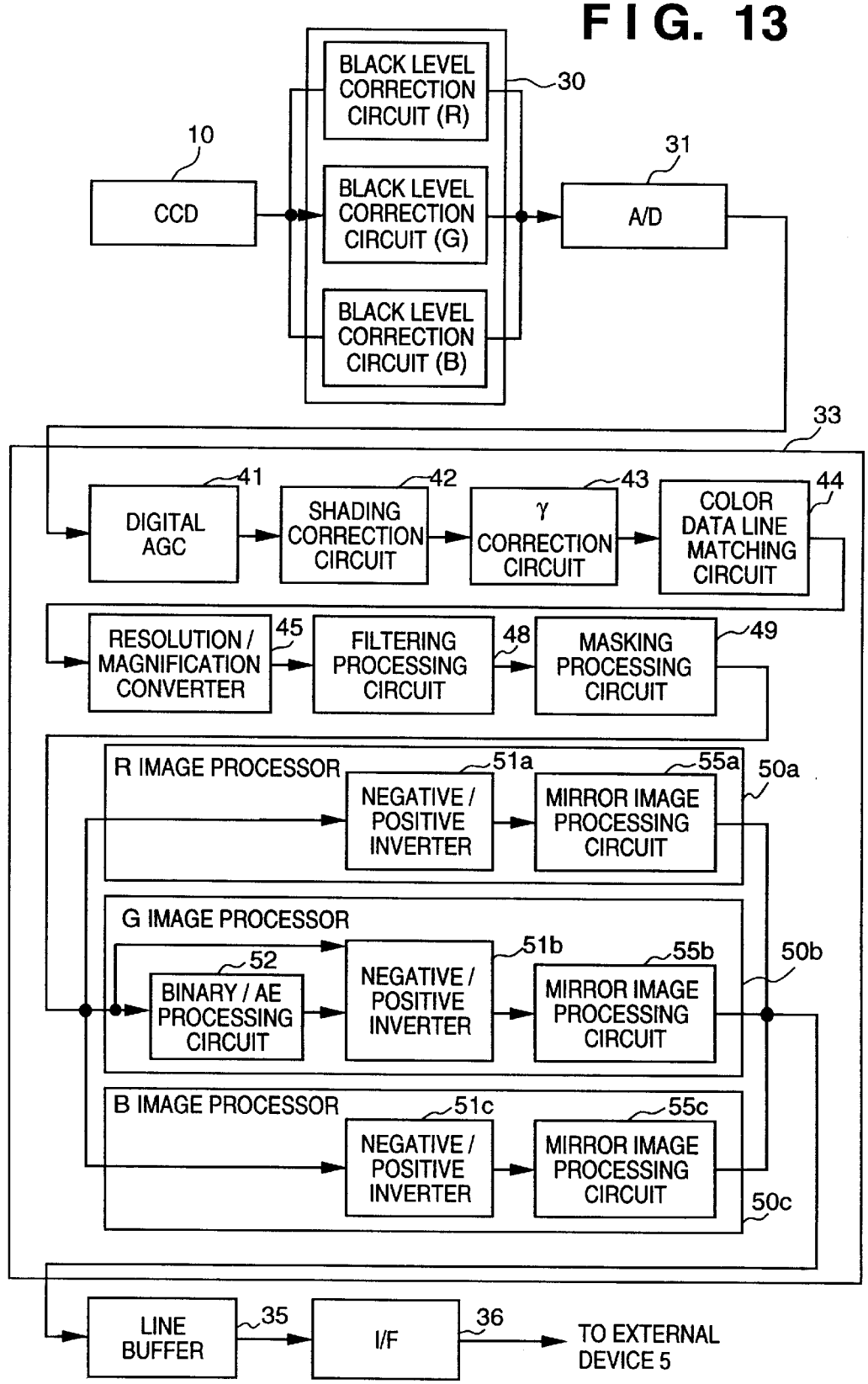
FIG. 13 is a block diagram illustrating a detailed internal configuration of an image processing unit.

FIG. 13 is a block diagram illustrating a detailed internal configuration of the image processing unit 33.

Detailed contents of the image data processing performed by the image processing unit 33 are explained below.

An electric image signal outputted from the A/D converter 31 enters a digital automatic gain controller (AGC) 41 and a signal level of image data (image signal level) is adjusted.

Figure 14A:
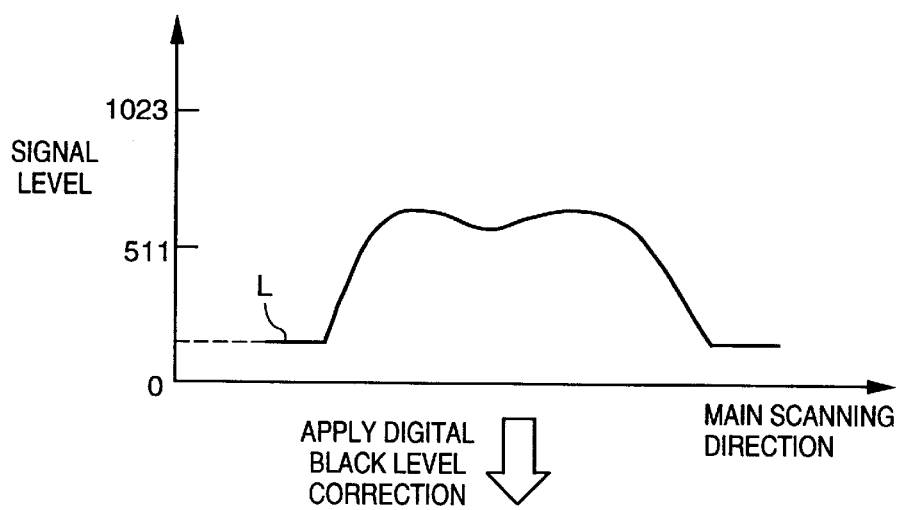
FIGS. 14A to 14C are graphs showing how an image signal level changes while being processed by a digital automatic gain controller.
Figure 14B:
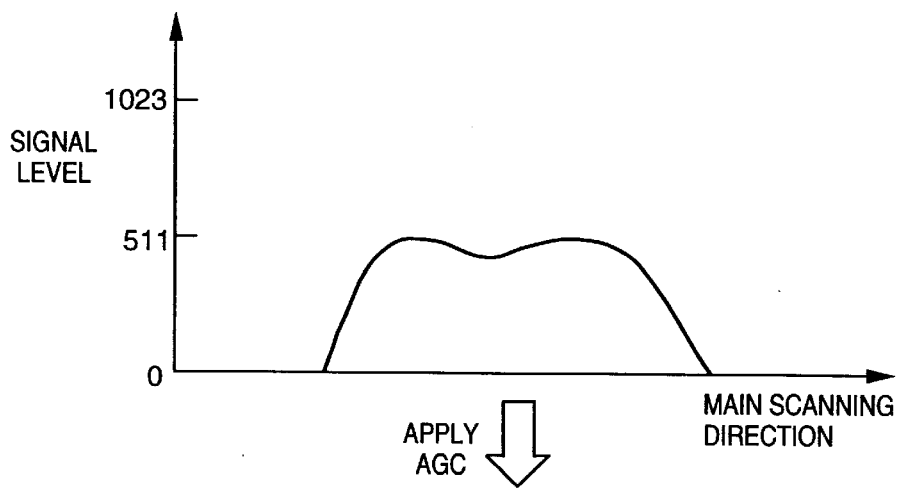
Figure 14C:
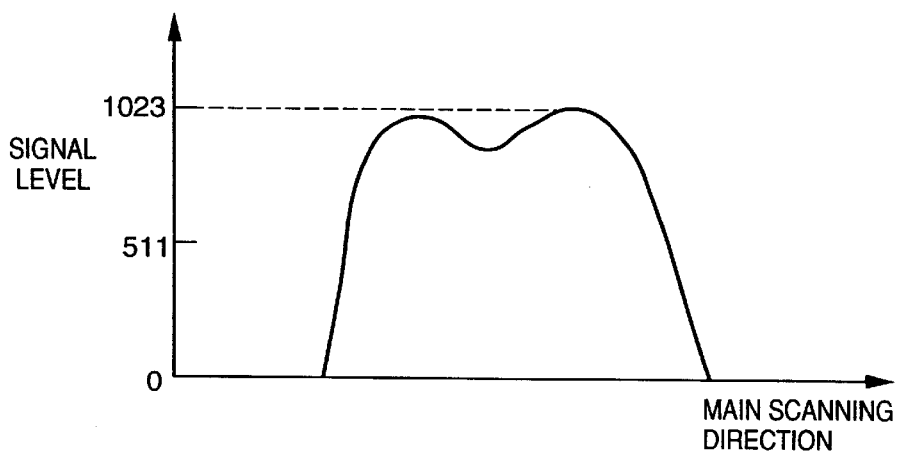

FIGS. 14A to 14C are graphs showing how an image signal level changes while being processed by the digital AGC 41. First, image data having signal levels as shown in FIG. 14A with respect to the main scanning direction is inputted from the A/D converter 31. In FIG. 14A, a constant signal level part indicated by reference L corresponds to an optically black portion outputted from the CCD 10. Then, the signal level is calibrated so that the signal level of the optically black portion becomes "0" by subtracting the signal level of the optically black portion from the signal level of the image data. Further, digital black level correction is performed on the calibrated image data, thereby the image data having signal levels shown in FIG. 14B is generated. Then, the signal levels shown in FIG. 14B are amplified so that a maximum signal level becomes the maximum value, "1023", which is the maximum value of the ten-bit image signal level. As a result, image data as shown in FIG. 14C is generated.

After image data of respective colors is balanced, the electric image signal is inputted to a shading correction circuit 42 where the variation in signal level of image signals due to shading is corrected. FIGS. 15A and 15B are views for explaining shading. The reason for performing the shading correction is that the distribution of signal levels of image data is not always uniform as shown by a curve F in FIG. 15B, for example, when no film is held by the film holder 8. This is because, (1) Quantity of light from the light source 7 is higher in the central portion than in edge portions,
(2) Quantity of light transmitted through the lens system 9 is higher in the central portion than in edge portion, and
(3) Sensitivity of each of photo-receiving elements covered with R, G and B filters and included in the CCD 10, is not the same for all photoreceiving elements.

For the aforesaid reasons, it is necessary to perform shading correction so that the variation in distribution of image signals is substantially compensated. In the third embodiment, before a film is set to the film holder 8, distributions of light intensity corresponding to the film holder 8 in the main scanning direction (indicated by an arrow E) are read by the respective G, B and R lines of the CCD 10 and temporarily stored in the offset RAM 37. Then, the system controller 4 compares the data stored in the offset RAM 37 with a reference density data of a white color, and stores deviation between the reference density data and the data stored in the offset RAM 37 in the offset RAM 37 as shading data. This shading data is used for correcting image data when scanning a film held by the film holder 8.

The electric image signal which is processed with the shading correction enters a γ correction circuit 43 where contrast of the image is adjusted and the image signal which is represented as ten-bit image data is converted into eight-bit image data.

Upon executing the γ correction, a γ correction operation window is displayed on a display device (not show) connected to the external device 5, and the γ correction is performed on the basis of a γ pattern directly operated and set by a user on the displayed γ correction operation window. FIG. 16A shows an example of a γ conversion data, and the abscissa shows signal level (0 to 1023) of input image data (10 bits) and the ordinate shows signal level (0 to 255) of output image data (8 bits). This γ conversion data is displayed on the display device by operating the external device 5 as well as transmitted to the system controller 4 and stored in the offset RAM 37. By using the stored γ conversion data, input image data (10 bits) is converted into output image data (8 bits) as shown in FIG. 16B.

FIG. 17A is a graph showing other examples of γ conversion data. A straight line G is called a "through pattern", and this converts ten-bit input image data into eight-bit output image without changing characteristics of the input image data. A curve H is called a "high contrast pattern", and this enhances differences in density of the image. Further, a straight line I is called a "low contrast pattern", and this reduces differences in density of an image. FIG. 17B is a graph showing relationship between densities and image signal levels (0 to 1023).

Figure 18:
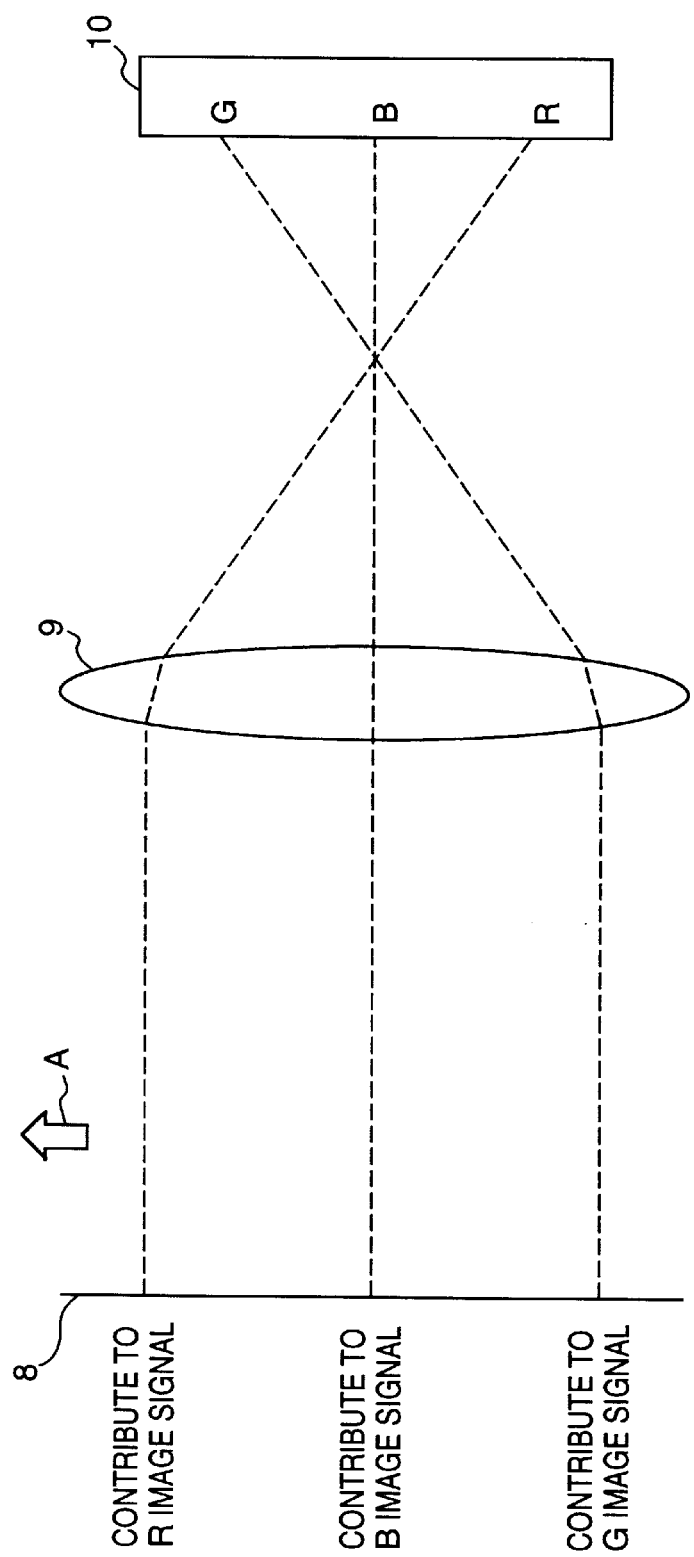
FIG. 18 is an explanatory view showing relationship between an arrangement of R, G and B lines of the CCD and portions of an image sensed by the R, G and B lines.

Next, the electric image signal which is applied with the γ correction is inputted to a color data line matching circuit 44 where data taken from different positions of respective colors of the CCD 10 are compensated. More specifically, since three lines of photo-reception elements for obtaining R, G and B signals are arranged in parallel along the main scanning direction, as shown in FIG. 18, R, G and B image data representing a single line can not be read simultaneously, and actually, R, G and B image data representing different three lines in an image is read simultaneously. Therefore, in the third embodiment, the color data line matching circuit 44 stores the R, G and B image data in the offset RAM 37, and, when all the R, G and B image data representing an identical line is stored in the offset RAM 37, it outputs the stored R, G and B image data.

Figure 19:
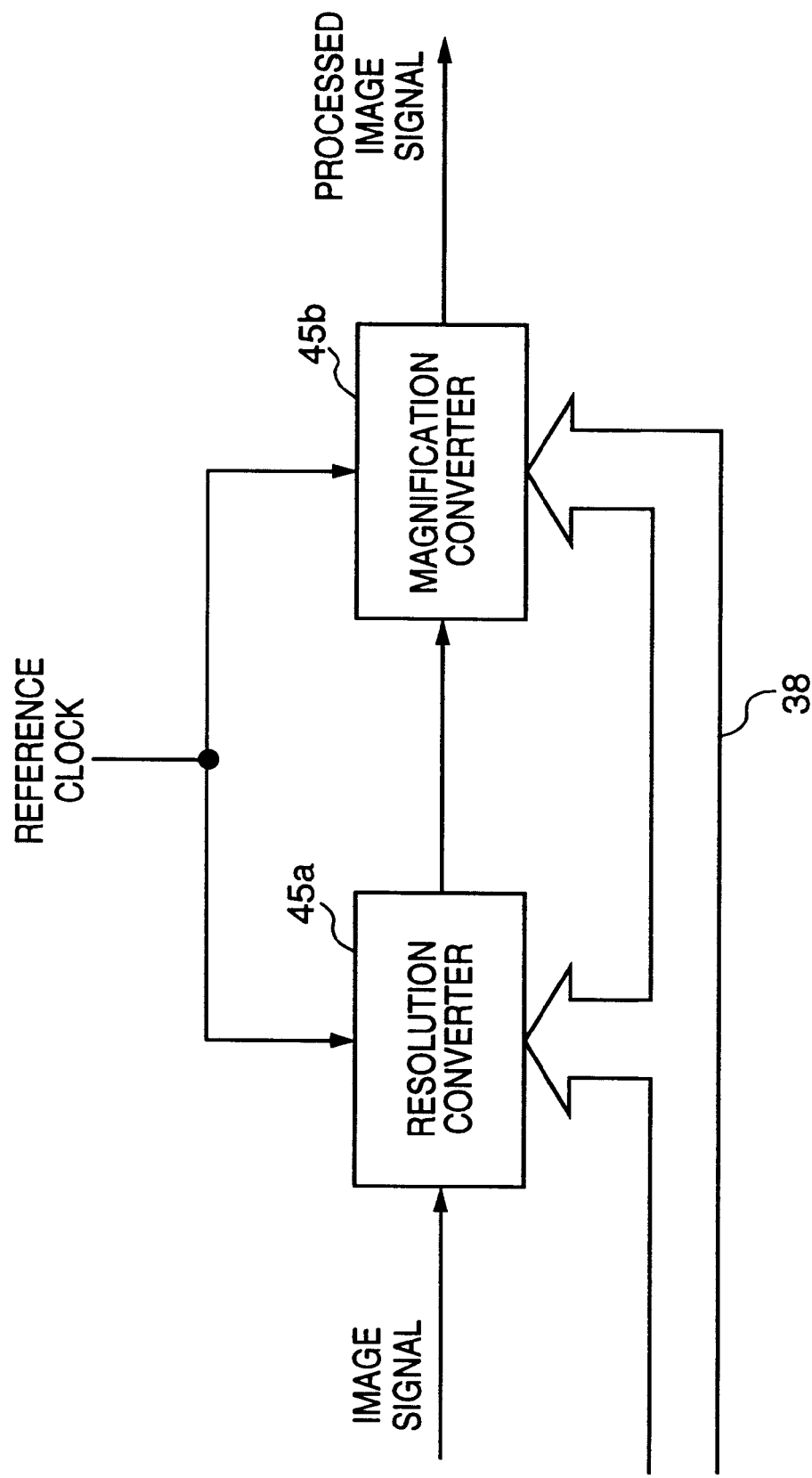
FIG. 19 is a block diagram illustrating an internal configuration of a resolution/magnification converter.
Figure 20A:
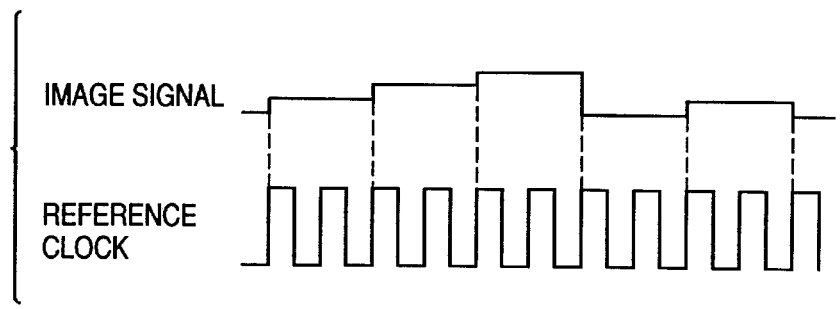
FIGS. 20A and 20B are timing diagrams showing clock signals generated by the resolution/magnification converter.

Next, the image signal outputted from the color data line matching circuit 44 enters a resolution/magnification converter 45. FIG. 19 is a block diagram illustrating an internal configuration of the resolution/magnification converter 45. As shown in FIG. 19, the resolution/magnification converter 45 has a resolution converter 45a which generates a clock for changing resolution (resolution conversion clock) on the basis of a reference clock and processes an input image signal in accordance with the resolution conversion clock and a magnification converter 45b which generates a clock (magnification conversion clock) for triggerring to take the image signal transmitted from the resolution converter 45a to an input port (not shown), and outputs the image signal taken in accordance with the magnification conversion clock. To the resolution converter 45a and the magnification converter 45b, conversion parameters generated by the system controller 4 are inputted via the system bus 38. The frequency of the reference clock is set twice higher than that of a clock used for operating the CCD 10 (clock signal 28, referred to as "CCD clock"). Therefore, the frequency of the reference clock is twice higher than that of the input image signal, as shown in FIG. 20A.

Figure 20B:
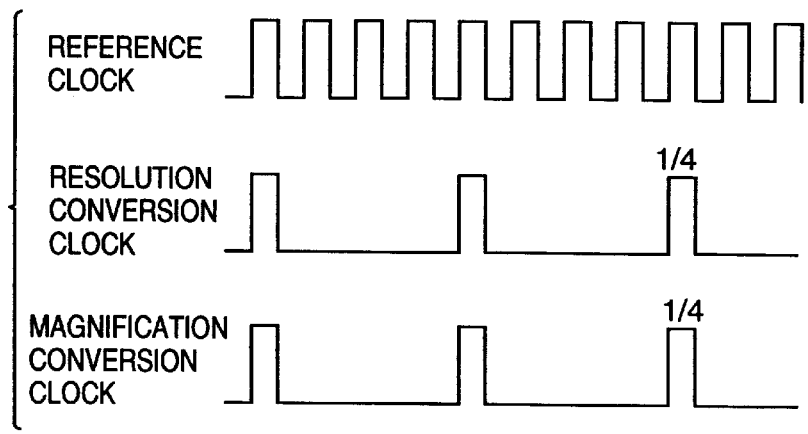

In a case where the resolution converter 45a operates in accordance with the resolution conversion clock having a half frequency of that of the reference clock and the magnification converter 45b operates in accordance with the reference clock, two image signals having identical information are outputted in series from the resolution/magnification converter 45 while each image signal is inputted. In this case, the resultant outputted image data represents an image having the resolution of the CCD 10 and enlarged by 200%. The above operation is based on an instruction to output an image in the same resolution as that of the CCD 10 with magnification of 200%. In a case where an instruction to output an image at half the resolution of the CCD 10 and with magnification of 50% in the main scanning direction is inputted, the resolution converter 45a operates in accordance with the resolution conversion clock having a frequency of one-fourth of the reference clock as shown in FIG. 20B, thereby skipping one-half of the output signal from the CCD 10. Further, the magnification converter 45b operates in accordance with the magnification conversion clock also having a frequency of one-fourth of the reference clock.

Figure 21A:
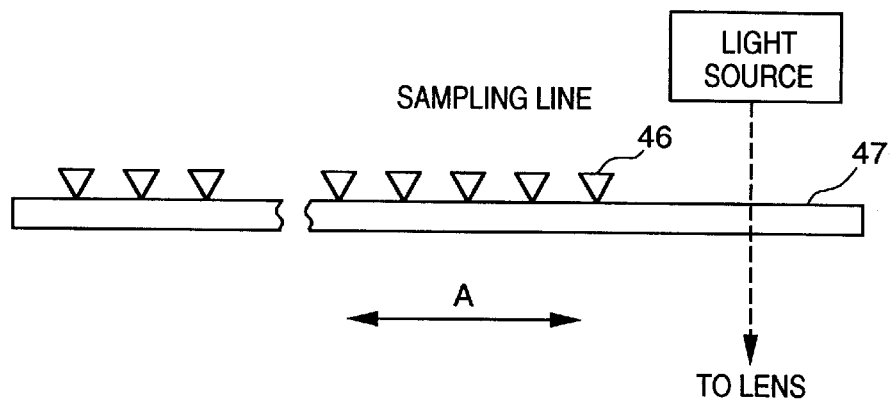
FIGS. 21A to 21C are diagrams for explaining resolution/magnification conversion in the sub-scanning direction.
Figure 21B:
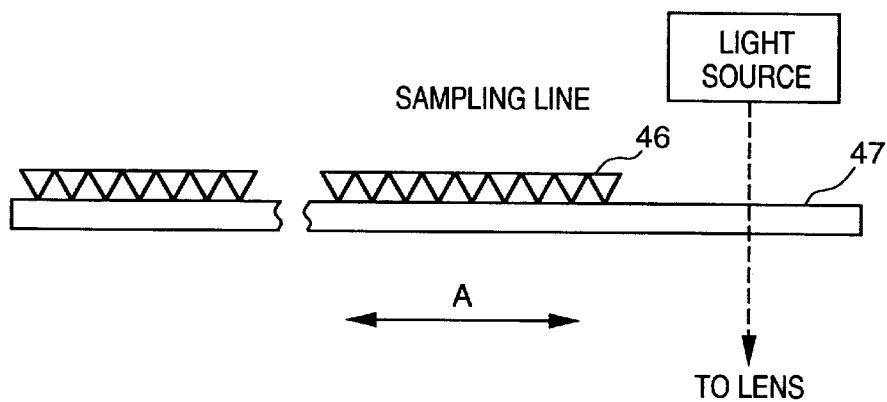
Figure 21C:
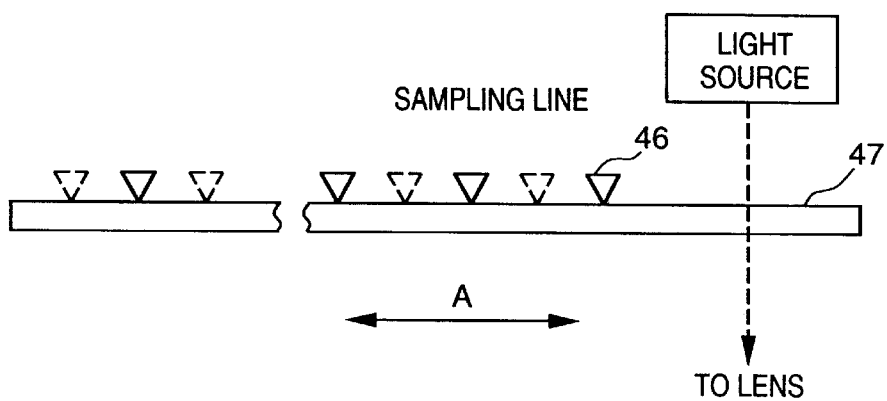

FIGS. 21A to 21C are diagrams for explaining resolution/magnification conversion in the sub-scanning direction shown by an arrow A.

In FIGS. 21A to 21C, reference numeral 46 denotes sampling lines. FIG. 21A shows a case where the film holder 8, or the film 47 held by the film holder 8, is moved at a predetermined reference speed in the sub-scanning direction A. In order to increase the resolution or the size of an image, the number of the sampling lines is increased by conveying the film 47 at a lower speed than the reference speed in the sub-scanning direction, as shown in FIG. 21B, and the read data is written to the offset RAM 37. Whereas, in a case of decreasing the resolution or the size of an image, the film 47 is conveyed at the reference speed in the sub-scanning direction, however, part of the data read in the sampling lines 46 is not written to the offset RAM 37, as shown in FIG. 21C. Of course, it is possible to carry the film 47 at a higher speed than the reference speed and write all the read data to the offset RAM 37.

Thereafter, the electric image signal enters a filtering processing circuit 48, where a filtering processing is performed so that the quality of an image is not deteriorated by the resolution conversion or the magnification conversion performed by the resolution/magnification converter 45.

A following table 1 shows the contents of the filtering processing:

TABLE 1

| Tone | Resolution (dpi) | Interpolation Main | Interpolation Sub | Averaging | Smoothing | Edge Processing |
|---|---|---|---|---|---|---|
| 24 bits | 170–340 | X | 0 | 0 | X | X |
| " | 341–680 | X | 0 | 0 | X | X |
| " | 681–1360 | X | 0 | 0 | X | X |
| " | 1361–2719 | 0 | 0 | X | 0 | 0 |
| " | 2720 | X | X | X | X | X |
| " | 2720–5440 | 0 | X | X | 0 | 0 |
| 8 bits | 170–340 | X | 0 | 0 | X | X |
| " | 341–680 | X | 0 | 0 | X | X |
| " | 681–1360 | X | 0 | 0 | X | X |
| " | 1361–2719 | 0 | 0 | X | 0 | 0 |
| " | 2720 | X | X | X | X | X |
| " | 2720–5440 | 0 | X | X | 0 | 0 |
| Binary | 170–340 | X | 0 | 0 | X | 0 |
| " | 341–680 | X | 0 | 0 | X | 0 |
| " | 681–1360 | X | 0 | 0 | X | 0 |
| " | 1361–2719 | 0 | 0 | X | 0 | 0 |
| " | 2720 | X | X | X | X | X |
| " | 2720–5440 | 0 | X | X | 0 | 0 |

Note, in the table 1, "main" and "sub" indicate the main scanning direction and the sub-scanning direction, respectively. Further, "0" in the table 1 indicates "apply", and "X" in the table 1 indicates "not apply".

As shown in the table 1, various known filtering processing, such as interpolation in the main scanning direction and in the sub-scanning direction, averaging, smoothing, and edge processing, are selectively performed on the image signal in accordance with resolutions in the respective tones (24 bits, 8 bits, binary).

Next, the electric image signal which is applied with the filtering processing is inputted to a masking processing circuit 49 where transmission characteristics of the R, G and B filters on the CCD 10 are corrected.

Figure 22:
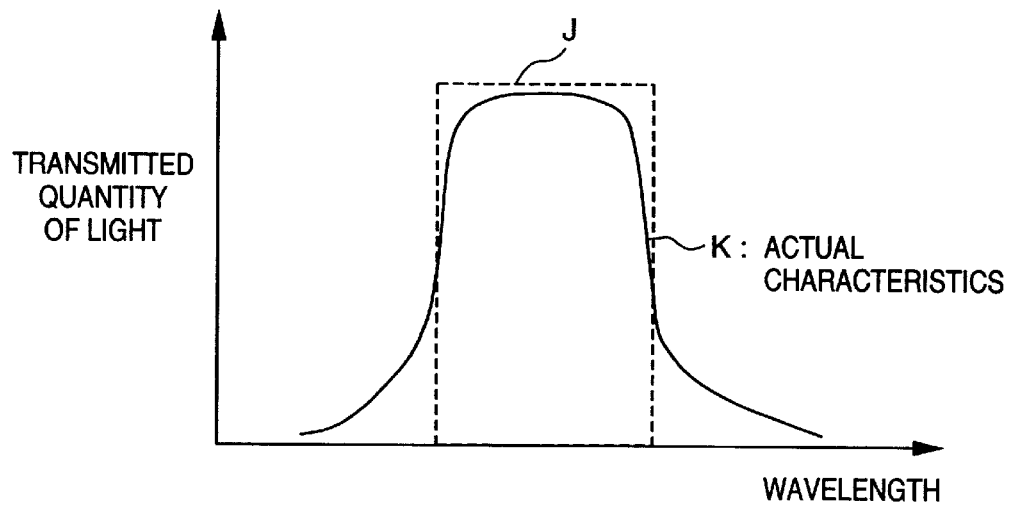
FIG. 22 is a graph showing a relationship between wavelength and quantity of light transmitted through a filter.

FIG. 22 is a graph showing a relationship between wavelength and the quantity of light transmitted through a filter. Ideally, a color filter only transmits light whose wavelength is in a range shown by a dashed line, referred by a reference alphabet, J, and blocks light whose wavelength is outside of the range. In practice, however, the filter transmits light, as shown by a curve K, whose wavelength is outside of the range referred by J. Accordingly, the masking processing circuit 49 corrects the actual characteristics of the color filters so as to approach the ideal characteristics by using the following equations (1)

$$\begin{bmatrix} Rout \\ Gout \\ Bout \end{bmatrix} = \begin{bmatrix} Rr & Gr & Br \\ Rg & Gg & Bg \\ Rb & Gb & Bb \end{bmatrix} \begin{bmatrix} Rin \\ Gin \\ Bin \end{bmatrix} \quad (1)$$

where Rout, Gout and Bout are signals outputted from the masking processing unit 49; Rin, Gin and Bin are signals inputted to the masking processing unit 49; and Rr, Gr, Gr, Rg, Gg, Bg, Rb, Gb, and Bb are predetermined filtering correction coefficients.

Accordingly, the masking processing unit 49 multiplies the input signals of respective color by filtering correction coefficients to generate the output signals, then outputs them.

The R, G and B image signals processed by the masking processing unit 49 enter an R image data processor 50a, a G image data processor 50b and a B image data processor 50c, respectively.

More specifically, the R and B image signals inputted to the R image data processor 50a and the B image data processor 50c enter a negative/positive inverters 51a and 51c, respectively, and the G image signal inputted to the G image data processor 50b is directly inputted to the negative/positive inverter 51b and indirectly via a binary/automatic exposure (AE) processing circuit 52.

Figure 23:
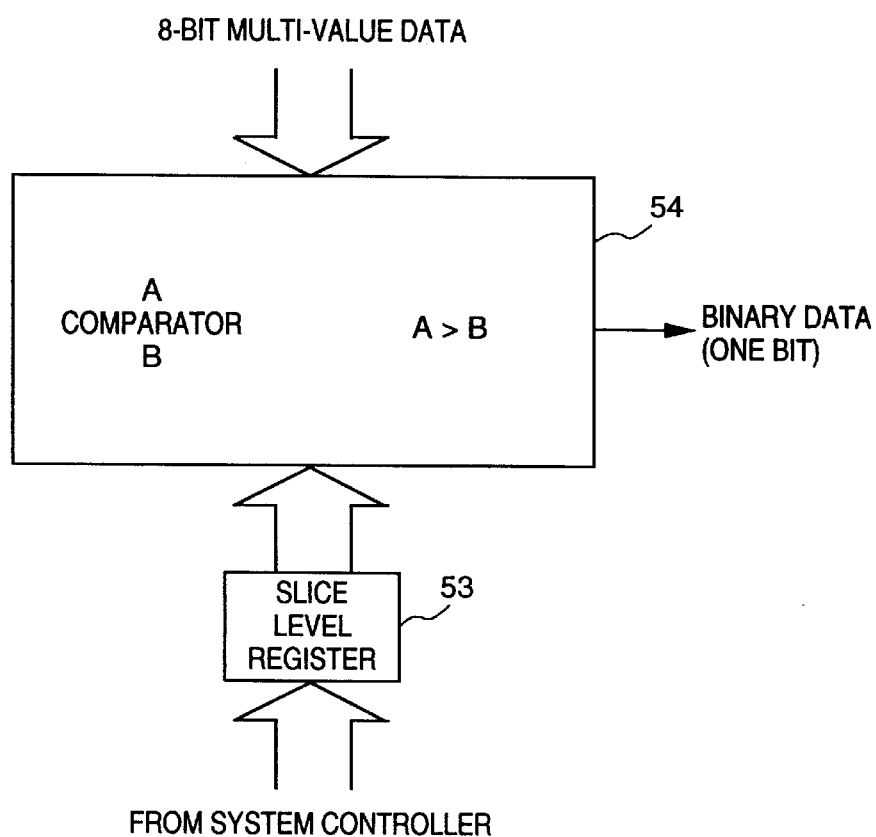
FIG. 23 shows a brief configuration of a binary/AE processing circuit.
Figure 24:
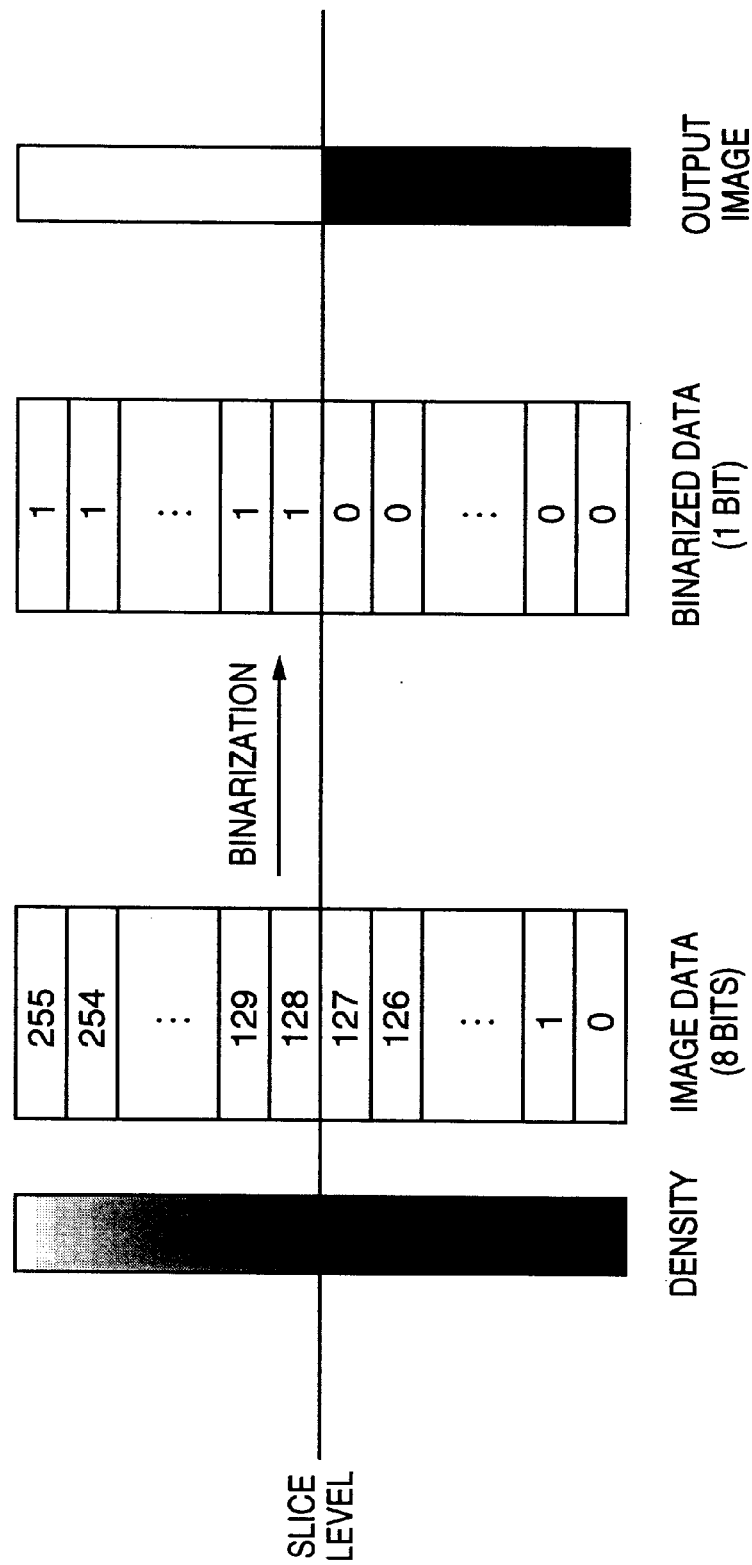
FIG. 24 is a view for explaining binarization.

The binary/AE processing circuit 52 converts an 8-bit multi-value data into binary image data which represents either black or white using one bit. More specifically, the binary/AE processing circuit 52 has a slice level register 53 and a comparator 54, as shown in FIG. 23, and, when binary processing is instructed from the external device 5, the system controller 4 sets a parameter B to the slice level register 53, and the comparator 54 compares the parameter B and an 8-bit multi-value data A. If the 8-bit multi-value data A is greater than the parameter B, binary data, "1", is outputted, whereas, if equal or less than the parameter B, binary data "0" is outputted, as shown in FIG. 24. At the same time, the binary/AE processing circuit 52 determines an optimized slice level by picking up a white peak value and a black peak value of each line while scanning the film and updates the contents of the slice level register 53. Accordingly, when the density of the original image changes while scanning the film, the slice level is automatically changed, as an AE function, which enables the binary/AE processing circuit 52 to output a binary data of good reproductivity.

Figure 25A:
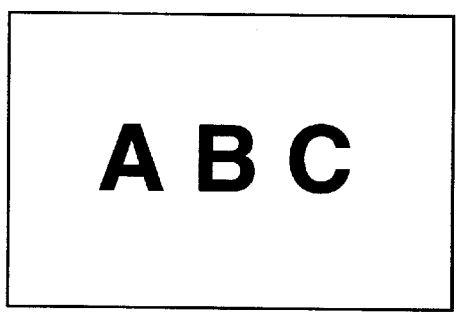
FIGS. 25A and 25B are explanatory views for explaining negative/positive inversion.
Figure 25B:
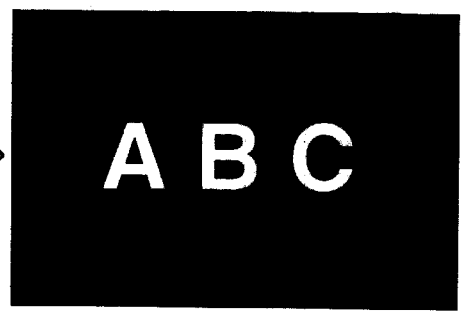
Figure 26:
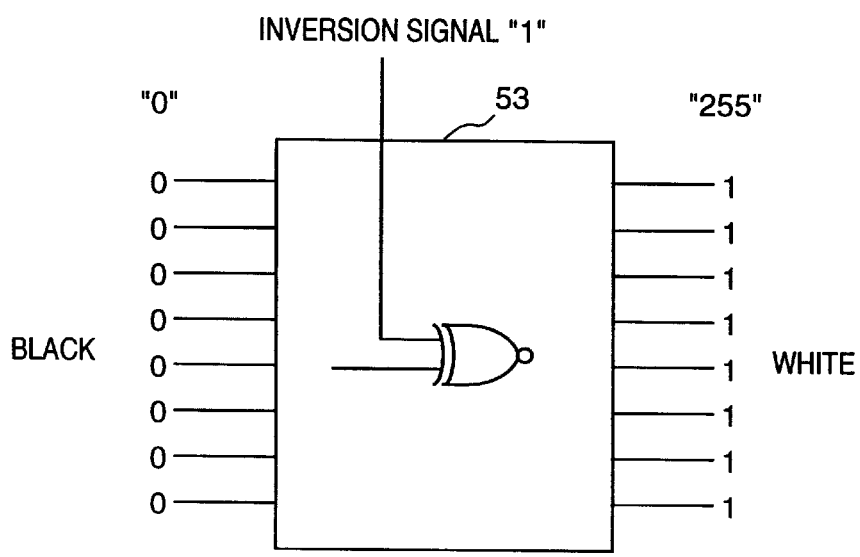
FIG. 26 is a diagram illustrating a brief configuration of a negative/positive inverter.

Further, the negative/positive inverters 51a to 51c invert the density levels of image data of the original image as shown in FIGS. 25A and 25B. More specifically, each of the negative/positive inverters 51a to 51c has an exclusive NOR gate as shown in FIG. 26, and when the system controller 4 sets "1" which is an inversion signal, image data of each pixel is inverted.

Figure 27A:
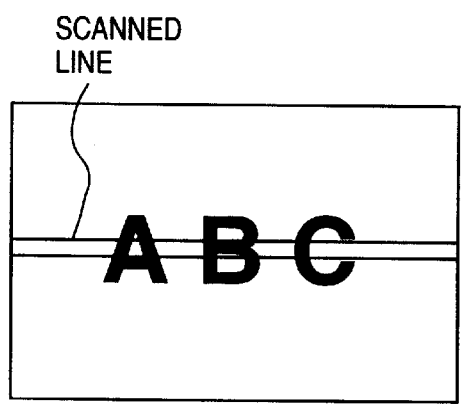
FIGS. 27A to 27C are explanatory views for explaining mirror image processing.
Figure 27B:
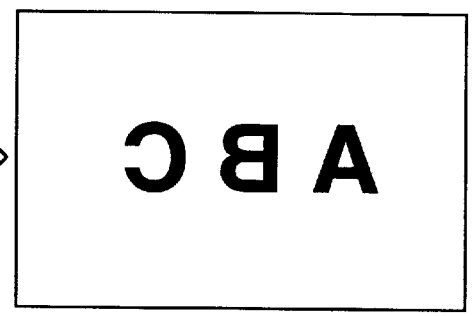
Figure 27C:
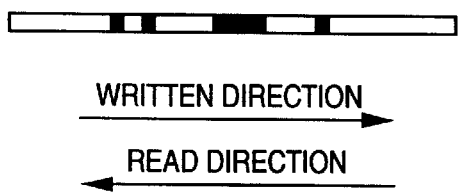

Next, the image signals which are black/white inverted enter mirror image processing circuits 55a to 55c, respectively, and rotated by 180° in the main scanning direction as shown in FIGS. 27A and 27B. This mirror image processing is realized by reading image data written in the line buffer 35 in the opposite direction to the write direction as shown in FIG. 27C.

The image data processed with the mirror image processing by the mirror image processing circuits 55a to 55c, as described above, is temporally stored in the line buffer 35, then outputted to the external device via the I/F 36.

Next, an operational sequence of the film scanner 1 configured as above will be described in detail with reference to flowcharts in FIGS. 28 to 36.

Figure 28:
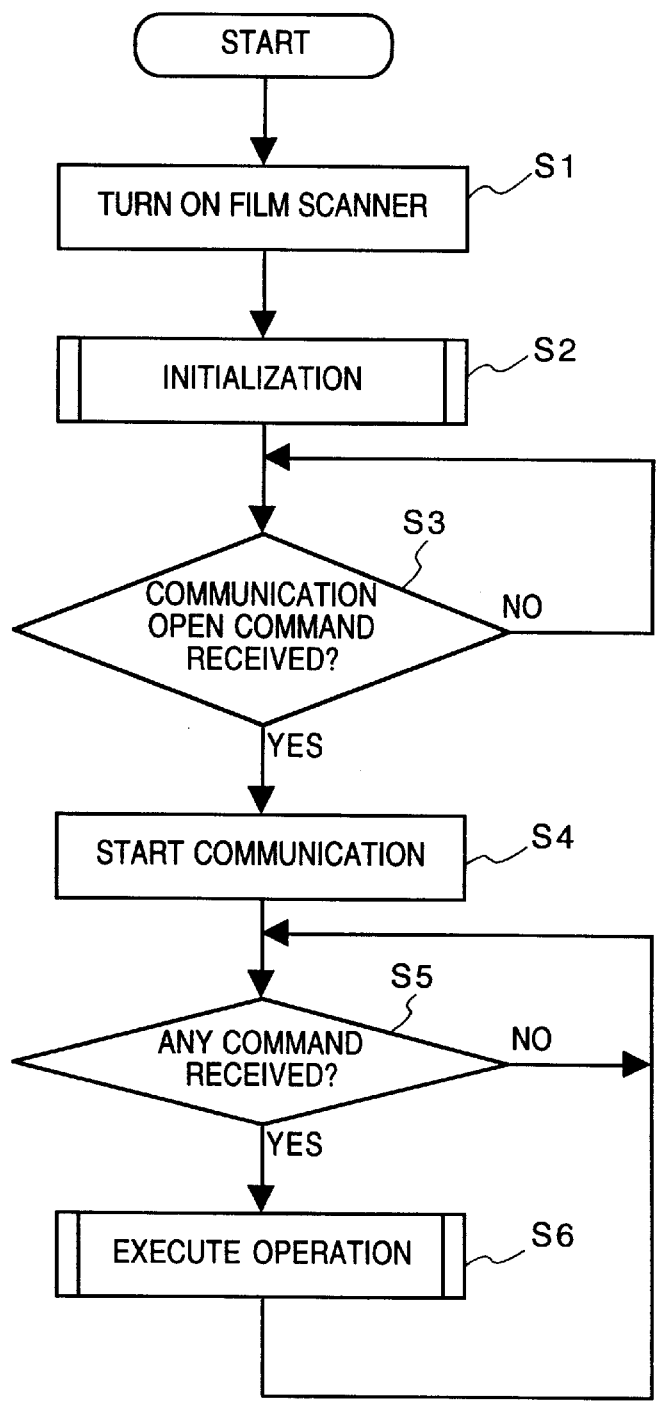
FIG. 28 is a flowchart showing a communication sequence in the film scanner when communicating with an external device according to the third embodiment of the present invention.

FIG. 28 is a flowchart showing a communication sequence in the film scanner 1 when communicating with the external device 5 according to the third embodiment of the present invention.

After the film scanner 1 is turned on in step S1, initialization, which will be explained later, is performed in step S2. Then the process proceeds to step S3 where whether or not a communication open command is received from the external device 5 is determined. If NO in step S3, then the film scanner 1 goes to a stand-by state waiting for the command, whereas if YES, then the process proceeds to step S4 and the film scanner 1 starts communicating with the external device 5. Then, in the proceeding step S5, whether or not a command relating to an operation instruction is received is determined. If NO in step S5, then the film scanner 1 becomes a stand-by state waiting for a command, whereas if YES, then the film scanner 1 executes an operation in response to the received command in step S6, then the process returns to step S5.

Figure 29:
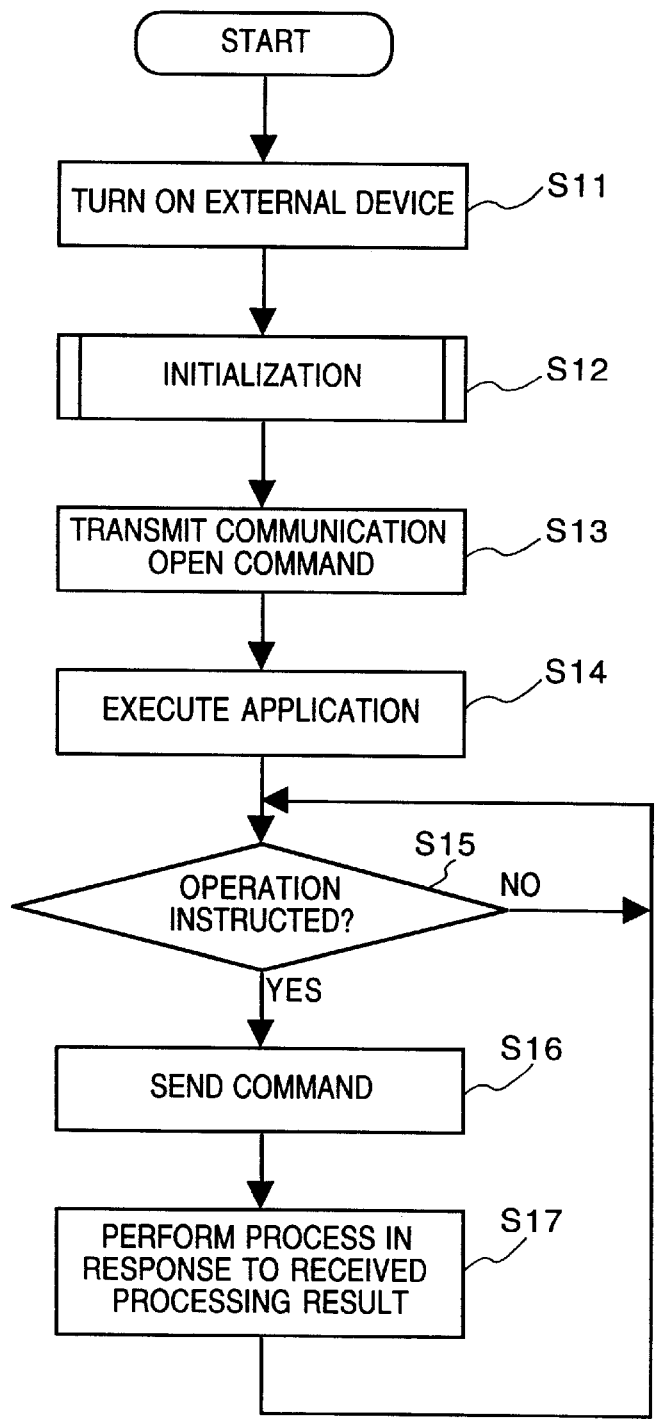
FIG. 29 is a flowchart showing a communication sequence in the external device when communicating with the film scanner according to the third embodiment of the present invention.

FIG. 29 is a flowchart showing a communication sequence in the external device 5 when communicating with the film scanner 1 according to the third embodiment of the present invention.

After the external device 5 is turned on in step S11, initialization, such as memory check, is performed in step S12, and a communication open command requesting to open communication is transmitted to the film scanner 1 in step S13. Next in step S14, an application software, such as a driver software, installed in the external device 5 is executed. In the proceeding step S15, whether or not a user instruction on the operation of the film scanner 1 has been received is determined. Note, the termination of the application is performed in response to a termination instruction by the user, and when such instruction is designated by the user, communication with the film scanner 1 is closed and the application is terminated.

When the determination in step S15 becomes YES in response to an instruction by the user, the driver software generates a command corresponding to the operation instruction designated by the user, and sends the command to the film scanner 1 in step S16. Thereafter, the process proceeds to step S17 where a processing result of the operation instruction is received from the film scanner 1, and the user is informed of the processing result and the process returns to step S15.

Figure 30:
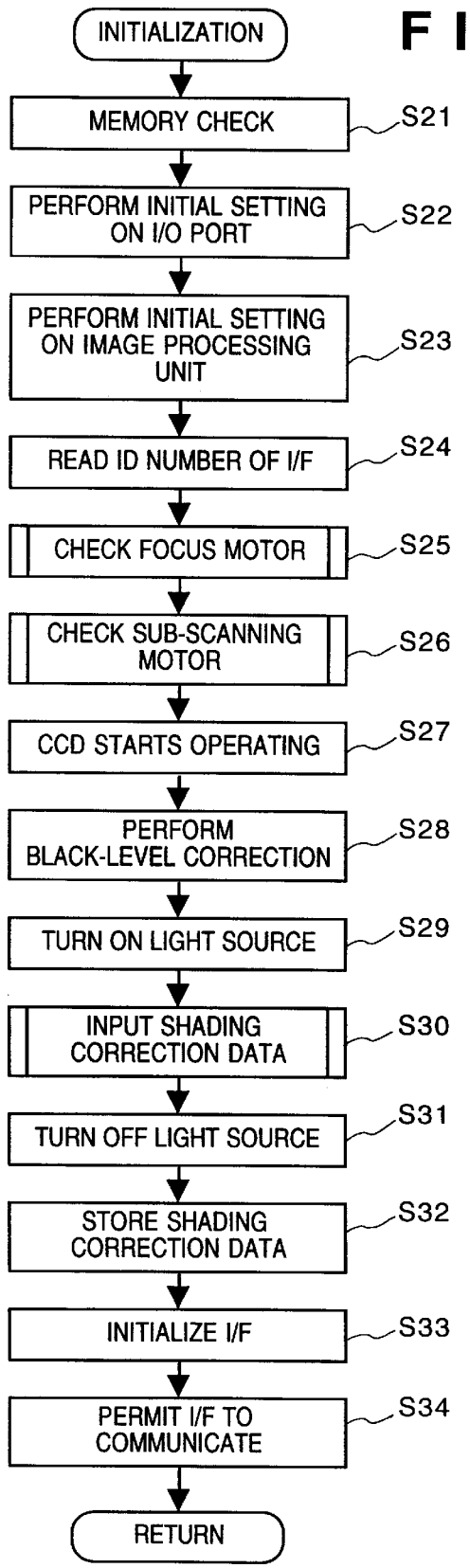
FIG. 30 is a flowchart showing initialization performed in the flowchart shown in FIG. 28.

FIG. 30 is a flowchart showing the initialization processed in step S2 in FIG. 28.

First, in step S21, memory check is performed on the line buffer 35 and the offset RAM 37, then in step S22, initial settings are set for the input/output (I/O) port of the system controller 4. Further, in step S23, the image processing unit 33 is initialized so as to be ready for image processing.

Next, after the system controller 4 reads an identification number of the I/F 36 in step S24, it drives the focus motor 18 to move the focal point fixing member 15 to a predetermined initial position (referred to as "focusing initial position", hereinafter) which is in the middle of moving range of the focal point fixing member 15 in step S25. Note, the focus position detector 16 is also checked at this time.

Thereafter, the system controller 4 drives the sub-scanning motor 12 to move the film holder 8 to a start position for scanning in the sub-scanning direction (referred to as "sub-scanning initial position") in step S26. Note, the sub-scanning position detector 13 is also checked at the same time.

Next, the system controller 4 enables the image processing unit 33 to output a clock signal 28 (CCD clock), used for driving the CCD 10, in step S27, then controls to perform black-level correction by the black level correction circuit 30 in step S28.

Then, the system controller 4 issues a light-source ON instruction to the light-source on/off circuit 6 in step S29, thereafter, in step S30, inputs shading correction data.

Subsequently, the system controller 4 issues a light-source OFF instruction to the light-source on/off circuit 6 in step S31, and the shading correction data is stored in the offset RAM 37 in step S32. Next, after the system controller 4 initializes the I/F 36 in step S33, it permits the I/F 36 to communicate in step S34. Accordingly, the initialization is completed and the process goes back to the routine shown in FIG. 28.

Figure 31:
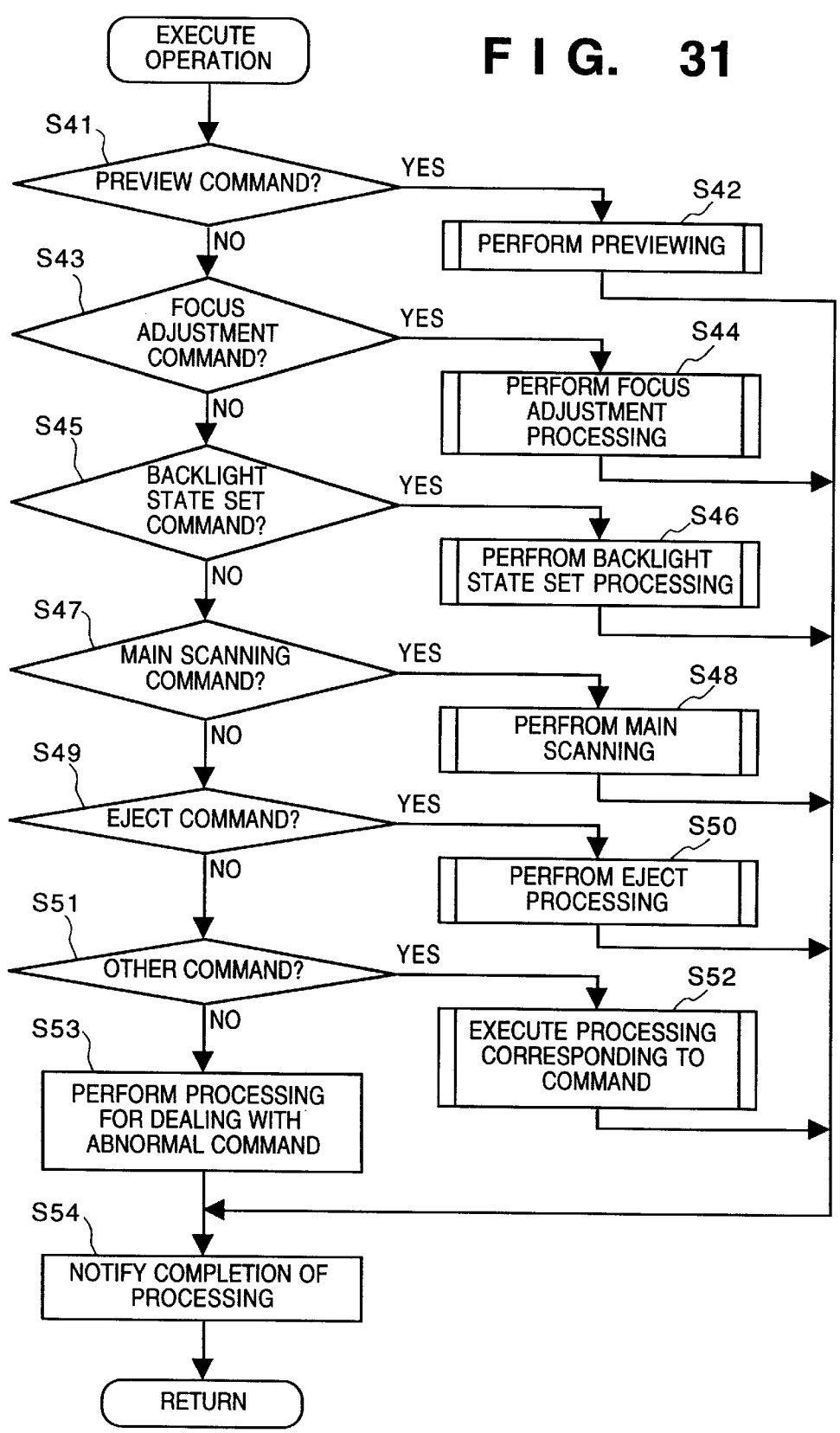
FIG. 31 is a flowchart showing a command execution routine performed in the flowchart shown in FIG. 28.

FIG. 31 is a flowchart showing a command execution routine performed in step S6 in FIG. 28.

First in step S41, whether an operation command sent from the external device 5 is a preview command or not is determined. If YES, after previewing (detail will be explained later) is performed in step S42, completion of the previewing is informed to the external device 5 in step S54, thereby the processing is actually completed. Whereas, if NO in step S41, then the process proceeds to step S43 where whether the transmitted command is a focus adjustment command or not is determined. If YES, then the process proceeds to step S44 where focus adjustment processing (detail will be explained later) is performed, then the completion of the focus adjustment processing is informed to the external device 5 in step S54, thereby completing the processing. Whereas, if NO in step S43, then the process proceeds to step S45 where whether the transmitted command is a backlight state set command or not is determined. If YES, then the process proceeds to step S46 where backlight state set processing (detail will be explained later) is performed, then the completion of the backlight state set processing is informed to the external device 5 in step S54, thereby completing the processing. Whereas, if NO in step S45, then the process proceeds to step S47 where whether the transmitted command is a main scanning command or not is judged. If YES, then the process proceeds to step S48 where the main scanning (detail will be explained later) is performed, then the completion of the main scanning is informed to the external device 5 in step S54, thereby completing the proceeding. Whereas, if NO in step S47, then the process proceeds to step S49 where whether the transmitted command is an eject command or not is determined. If YES, then the process proceeds to step S50 where the eject processing (detail will be explained later) is performed, then the completion of the eject processing is informed to the external device 5 in step S54, thereby completing the processing. Whereas, if NO in step S49, then the process proceeds to step S51 where whether the transmitted command is other command or not is determined. If YES, then the process proceeds to step S52 where processing corresponding to the command is performed, then the completion of the processing is informed to the external device 5 in step S54, thereby completing the processing. Whereas, if NO in step S51, then the process proceeds to step S53 where it is determined that an abnormal command is inputted, and processing for dealing with the abnormal command is performed, then the completion of the processing is notified to the external device 5 in step S54, thereby completing the processing.

Figure 32:
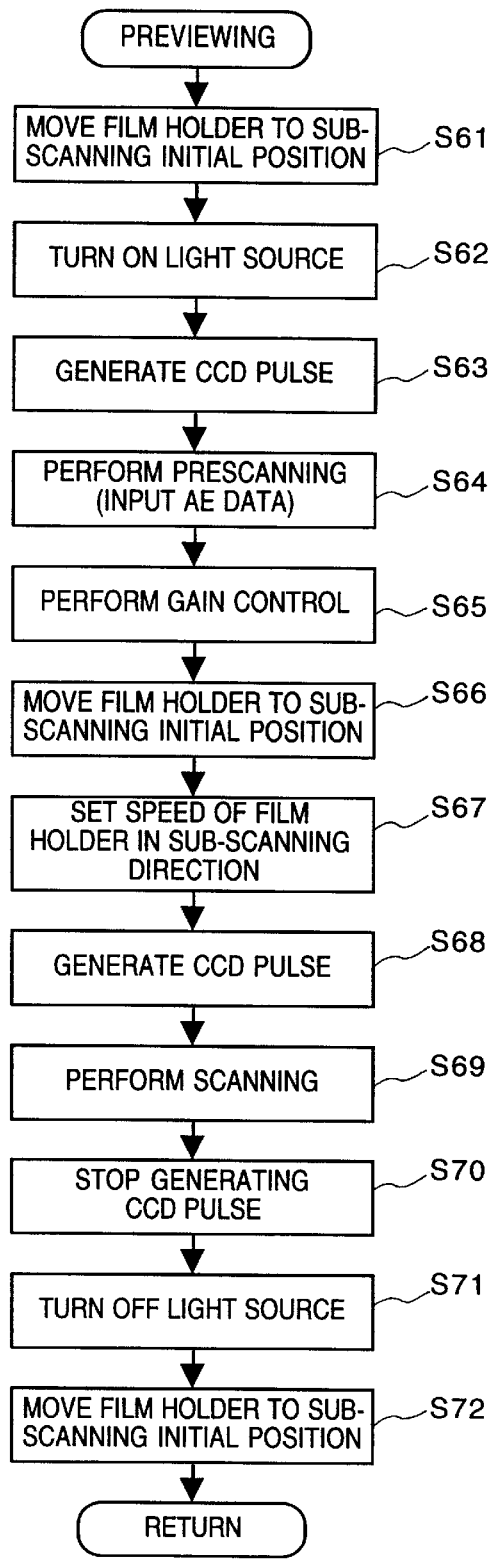
FIG. 32 is a flowchart showing a sequence of previewing performed in the flowchart shown in FIG. 31.

FIG. 32 is a flowchart showing a sequence of the previewing performed in step S42 in FIG. 31.

First in step S61, the system controller 4 supervises the state of the sub-scanning position detector 13, and controls the sub-scanning motor 12 so as to move the film holder 8 to the sub-scanning initial position. The process proceeds to step S62 and the system controller 4 issues the light source ON instruction to the light-source on/off circuit 6, and in the next step S63, the system controller 4 enables the image processing unit 33 to generate the clock signal 28 to the CCD 10.

The process proceeds to step S64, where pre-scanning is performed. In this step, the sub-scanning motor 12 moves the film holder 8 so that a central portion of the film is placed at the optical axis of the optical system 9, then data on the quantity of light (AE data) is obtained. Here, in the third embodiment, the CCD 10 is used as a quantity-of-light sensor, however, a separate sensor for exclusive use of measuring the quantity of light may be provided to measure the quantity of light.

Next, the process proceeds to step S65 where gain adjustment is performed on the basis of the input quantity-of-light data. More specifically, when the quantity of light is low, the gain is increased, whereas, when the quantity of light is too much, the gain is decreased, thereby adjusting the gain.

In the proceeding step S66, the sub-scanning motor 12 moves the film holder 8 to the sub-scanning initial position, and in step S67, the speed of the film holder 8 in the sub-scanning direction for the previewing is set. Thereafter, a resolution used in the previewing is set, and the clock signal 28 generated by the resolution/magnification converter 45 is outputted from the image processing unit 33 to the CCD 10. Next in step S69, a signal processing area in the previewing is set to the image processing unit 33 and scanning of the film starts.

Then, after the clock signal 28 is stopped in step S70, in step S71, the system controller 4 issues the light source OFF instruction to the light-source on/off circuit 6. Then the process proceeds to step S72 where the position of the film holder 8 which is moved in the scanning in step S69 is returned to the sub-scanning initial position, then the processing is completed.

Figure 33:
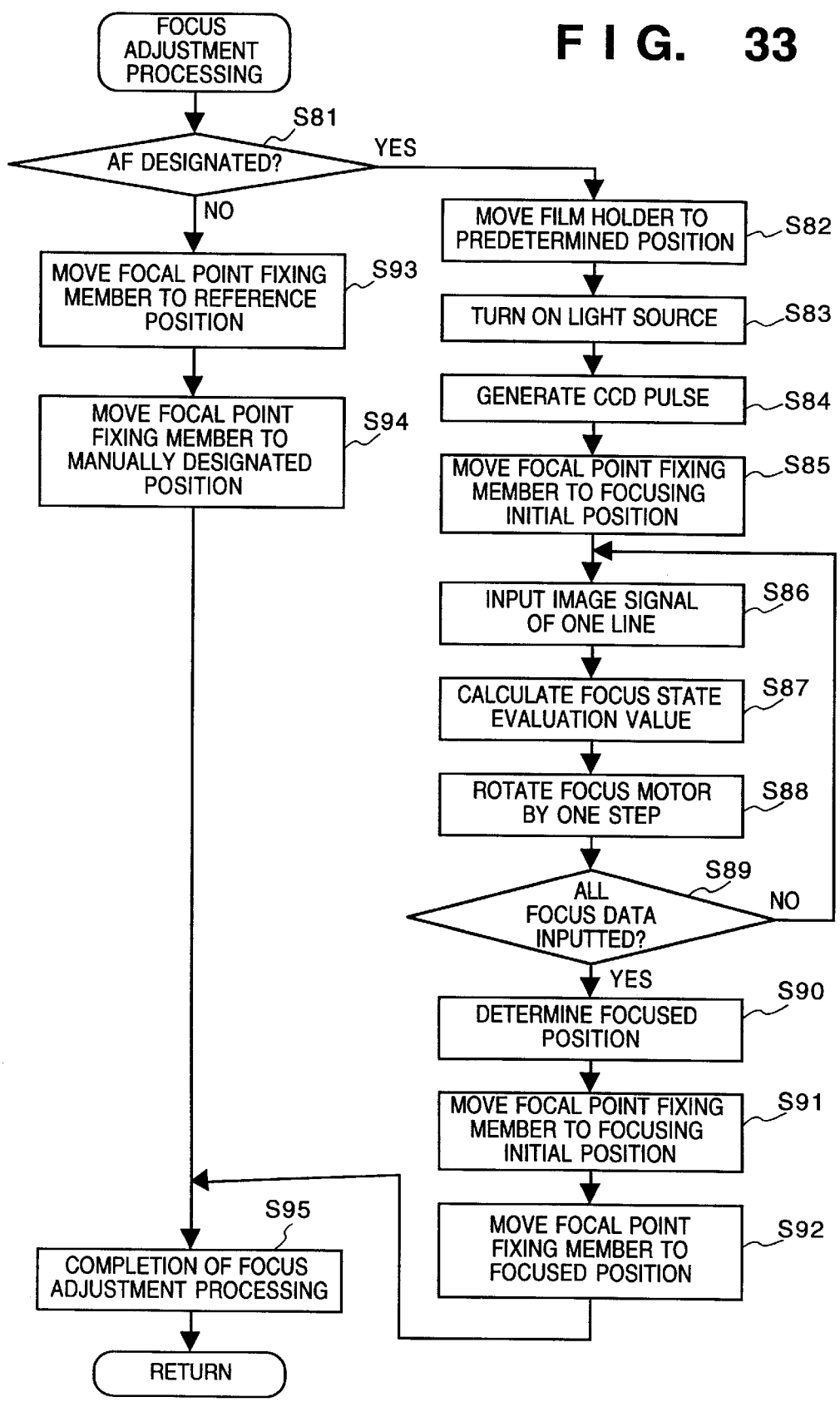
FIG. 33 is a flowchart showing a sequence of focus adjustment processing performed in the flowchart shown in FIG. 31.

FIG. 33 is a flowchart showing a sequence of the focus adjustment processing performed in step S44 in FIG. 31.

In step S81, whether or not a designation for performing automatic focusing (abbreviated as "AF" hereinafter) operation is included in the focus adjustment command is determined. If YES, then the process proceeds to step S82 where the sub-scanning motor 12 is operated to move the film holder 8 from the sub-scanning initial position to a predetermined position where the focusing processing is performed (when focusing on the center of a film image, for example, to the position where the optical axis of the optical system 9 intersects the center of the film image). Next, in step S83, the system controller 4 issues the light-source ON instruction to the light-source on/off circuit 6. The process proceeds to step S84 where the system controller 4 issues an instruction to the resolution/magnification converter 45 so as to read an image in the same resolution as that of the CCD 10 and to generate the clock signal 28 to the CCD 10.

Thereafter, in step S85, the focus motor 18 is controlled so that the focal point fixing member 15 is moved to the focusing initial position. Then, the process proceeds to step S86 where an image signal of a single line is inputted. This input image signal is temporally stored in the offset RAM 37.

Next in step S87, a focus state evaluation value is calculated. As the focus state evaluation value, the degree of sharpness is calculated, and it is stored in the offset RAM 37 along with the position of the focal point fixing member 15. Note, the degree of sharpness is a sum-square of a difference between outputs of two adjoining pixels, and it is calculated by using a known method.

Next in step S88, the focus motor 18 is rotated by one step to move the focal point fixing member. In the proceeding step S89, whether or not all focus data, i.e., the focus state evaluation values and the accompanying positions of the focal point fixing member 15, is inputted is determined. If NO, then the process returns to step S86, whereas, if YES, the process proceeds to step S90 where a focused position is determined on the basis of the focus state evaluation values. More specifically, among the focus state evaluation values, the position where the maximum degree of sharpness is obtained is determined as the focused position. Then, in step S91, the focus motor 18 is controlled to move the focal point fixing member 15 to the focusing initial position, and in step S92, the focus motor 18 is further controlled to move the focal point fixing member 15 to the focused position. Further in step S95, the sub-scanning motor 12 moves the film holder 8 to the sub-scanning initial position and the processing is completed. Thereafter, the process returns to the routine shown in FIG. 31.

Whereas, if NO in step S81, namely, if no AF is designated in the focus adjustment command, the process proceeds to step S93 where the focus motor 18 is controlled to move the focal point fixing unit 15 to a predetermined reference position which is at one end of the moving range of the focal point fixing member. Thereafter, in step S94, the focus motor 18 is moved to a position where is manually designated by the user, then the process proceeds to step S95 where the sub-scanning motor 12 moves the film holder 8 to the sub-scanning initial position, and the processing is completed. Then, the process goes back to the routine shown in FIG. 31.

Figure 34:
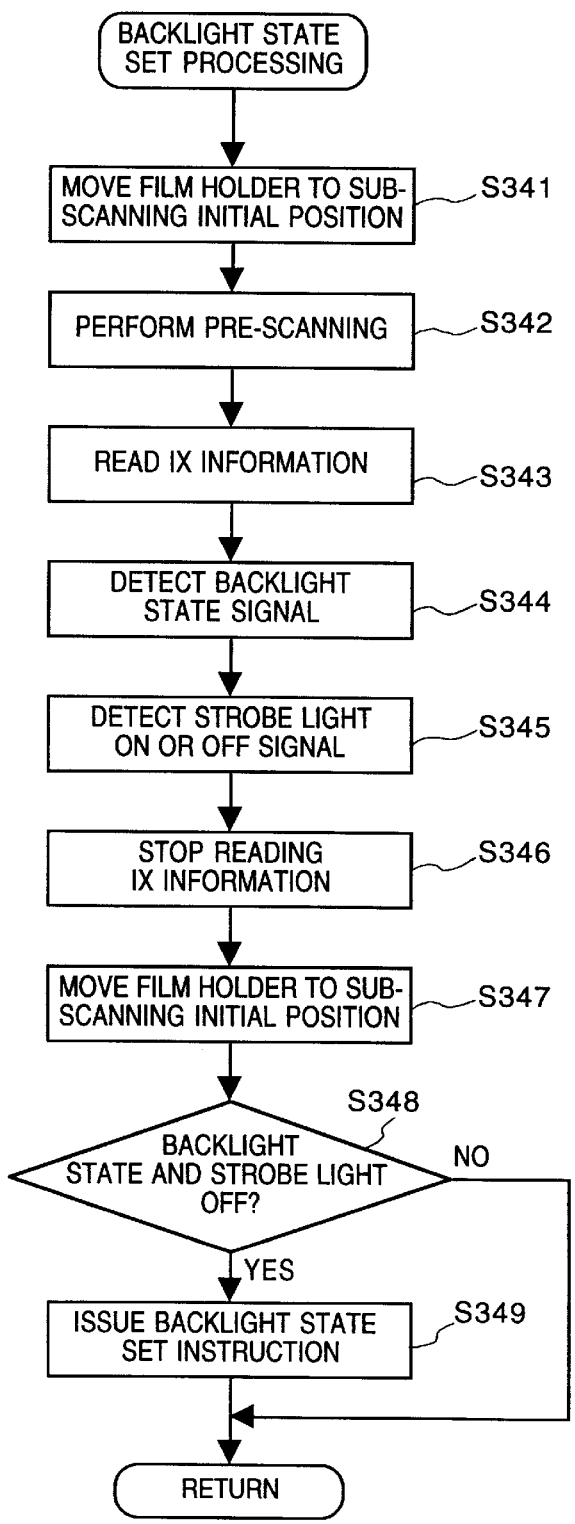
FIG. 34 is a flowchart showing a sequence of backlight state set processing performed in the flowchart in FIG. 31.

FIG. 34 is a flowchart showing a sequence of the backlight state set processing performed in step S46 in FIG. 31.

First in step S341, the film holder 8 is moved to the sub-scanning initial position, and in step S342, pre-scanning is performed. Then in step S343, the magnetic information detector 14 reads the IX information recorded as magnetic information on the film. The process proceeds to step S344 where a signal indicating that the backlight state (backlight state signal) is detected from the IX information, further in step S345, a signal indicating either ON or OFF of strobe light (strobe light ON or OFF signal) is detected from the IX information. Thereafter, the operation of the magnetic information detector 14 is stopped in step S346, further, the film holder 8 is moved to the sub-scanning initial position in step S347. Next, in step S348, whether or not both the backlight state signal and the strobe light ON signal are detected from the IX information is determined. If NO, then a backlight state set instruction is not issued, and the process returns to the routine shown in FIG. 31. Whereas if YES in step S348, then the backlight state set instruction is issued in step S349, then the process returns to the routine shown in FIG. 31.

When the backlight state set instruction is issued, a high gain is set in the main scanning processing which will be explained below.

Figure 35:
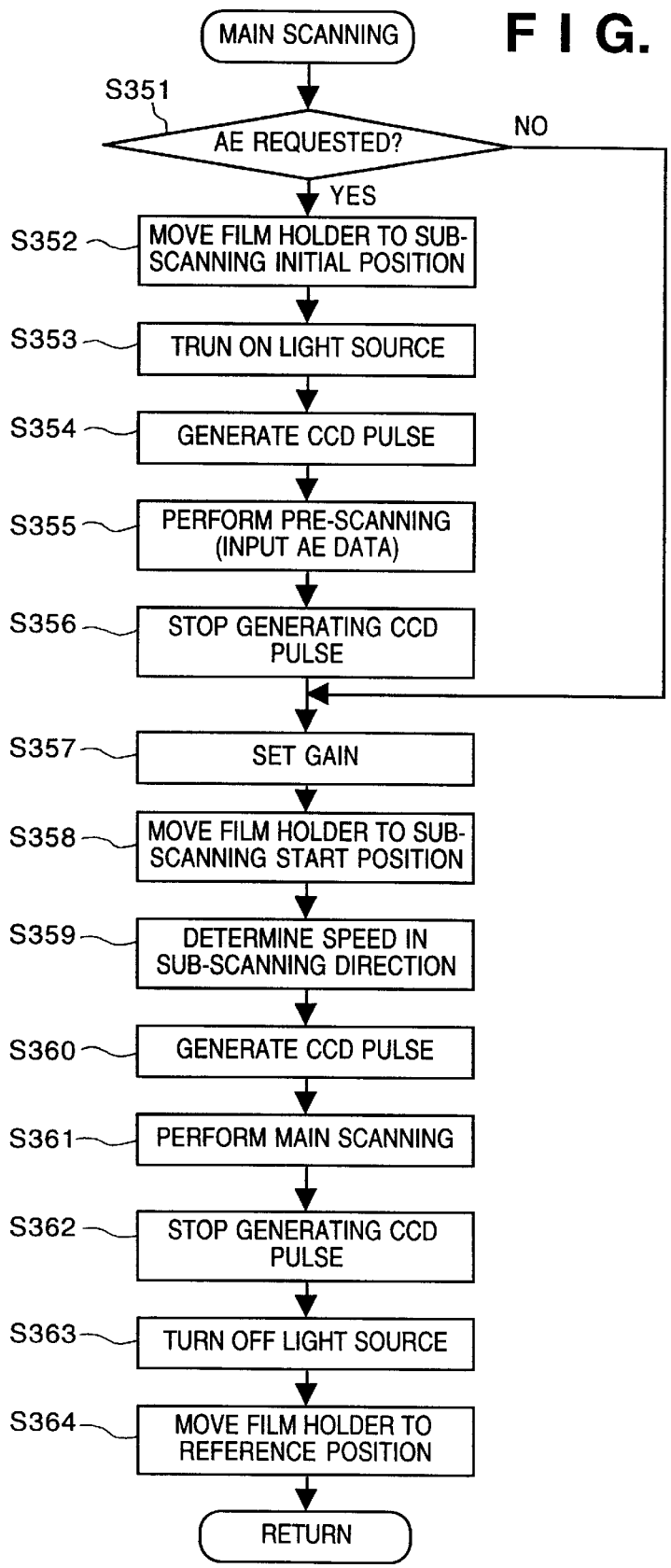
FIG. 35 is a flowchart showing a sequence of main scanning performed in the flowchart shown in FIG. 31.

FIG. 35 is a flowchart showing a sequence of the main scanning performed in step S48 in FIG. 31.

First, in step S351, whether or not a command for requesting the automatic exposure (AE) processing is included in the main scanning command is determined. If NO, then the process directly moves to step S357, whereas if YES, then the process proceeds to step S352 where the system controller 4 controls the sub-scanning motor 12 to move the film holder 8 to the sub-scanning initial position. Then, in step S353, the light source ON instruction is issued to the light source on/off circuit 6. The process proceeds to step S354 where the system controller 4 instructs the resolution/magnification converter 45 to generate a driving pulse for measuring the quantity of light, thereby enables the resolution/magnification converter 45 to generate the clock signal 28 to the CCD 10.

Next in step S355, pre-scanning is performed, and a value of the density of an image recorded on the film is estimated on the basis of the measured quantity of light, then, after calculating a gain to be used in the amplifier 29, the process proceeds to step S356 where the clock signal 28 to the CCD 10 is stopped, and the process proceeds to step S357.

In step S357, the gain is set. Here, if the backlight state set instruction is issued as described with reference to FIG. 34, the gain to the amplifier 29 is set high so as to increase the brightness of an image so as to make the object in the image be easily seen.

Next, in step S358, the system controller 4 controls the sub-scanning motor 12 to move the film holder 8 to a sub-scanning start position, where sub-scanning is started designated by, e.g., trimming information which indicates the size and shape of an image to be outputted. Next, in step S359, a speed of the film holder 8 in the sub-scanning direction is set in accordance with a resolution designated in the main scanning command. Thereafter, in step S360, settings for generating the CCD pulse in the main scanning direction are set in the resolution/magnification converter 45, in turn, the resolution/magnification converter 45 generates the clock signal 28 to the CCD 10.

Next in step S361, the scanning range in the sub-scanning direction and the range of an image to be processed with image processes in the main scanning direction are determined in accordance with the designation included in the main scanning command, and the main scanning is performed. Note, by changing the start position of sub-scanning from the sub-scanning initial position, which is set when the image scanner is turned on, to the sub-scanning start position, it becomes unnecessary for a user to perform troublesome trimming operation. In addition, the range of the image to be performed with image processes is changed, and time for performing the image processes is shortened.

Next in step S362, generation of the clock signal 28 is stopped, and in the proceeding step S363, the system controller 4 issues the light source OFF instruction to the light source on/off circuit 6. Further in step S364, the position of the film holder 8 which is moved while being scanned is returned to the predetermined reference position in the sub-scanning direction, thereby completing the main scanning and returning to the routine shown in FIG. 31.

Figure 36:
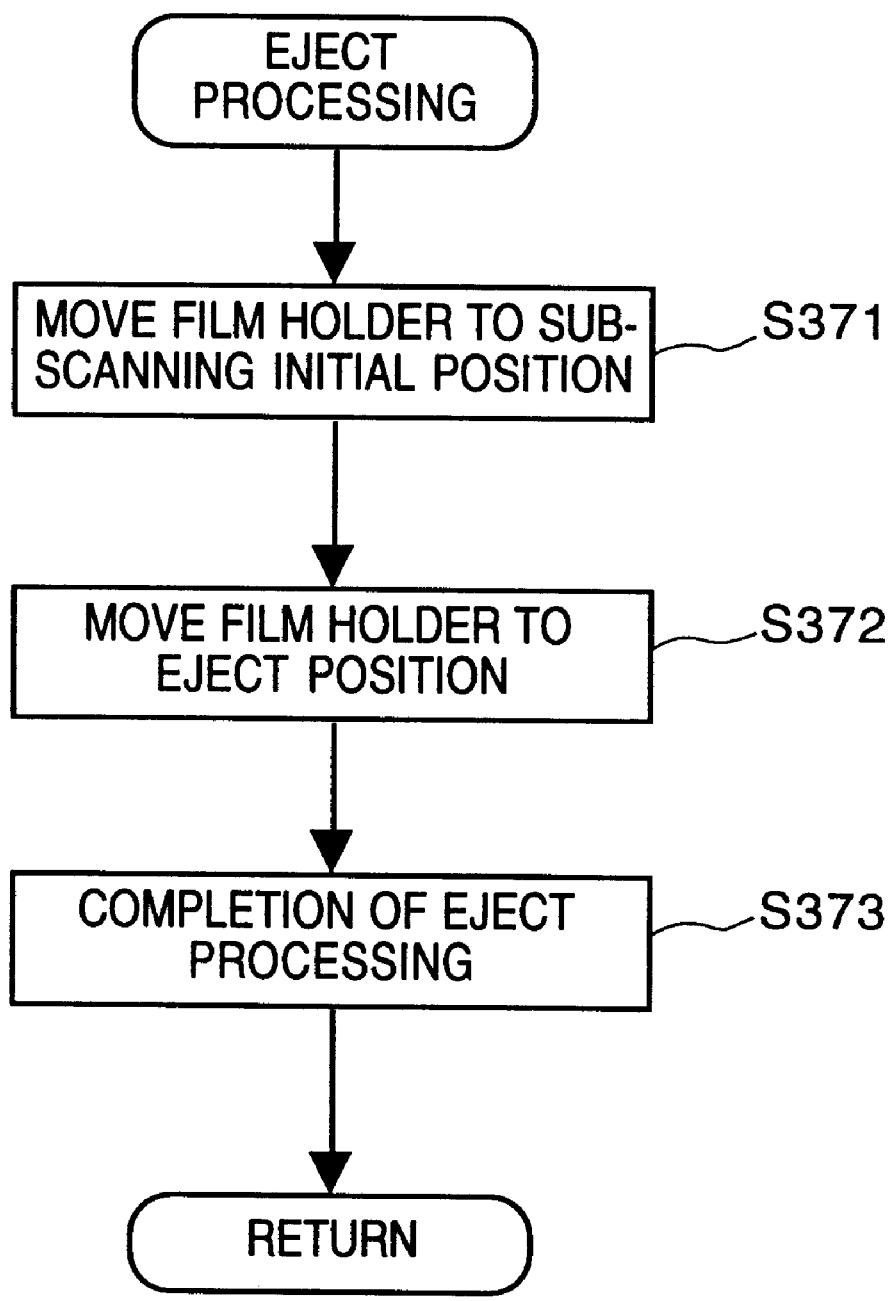
FIG. 36 is a flowchart showing a sequence of eject processing performed in the flowchart shown in FIG. 31.

FIG. 36 is a flowchart showing a sequence of the eject processing performed in step S50 in FIG. 31. In step S371, the system controller 4 controls the sub-scanning motor 12 to move the film holder 8 to the sub-scanning initial position while supervising the sub-scanning position detector 13. In the proceeding step S372, the film holder 8 is moved toward outside of the film scanner 1 from the sub-scanning initial position by a predetermined number of pulses to a predetermined eject position, thereafter in step S373, the eject processing is completed by stopping providing electric power to the sub-scanning motor 12. Then, the process returns to the routine shown in FIG. 31.

According to the third embodiment as described above, backlight information and strobe light on/off information are stored as magnetic information recorded on a film, and if the backlight state is set in the aforesaid backlight state set processing in step S349 in FIG. 34, then a high gain is set in step S357 in FIG. 35 when performing main scanning. Accordingly, if an image recorded on the film was taken against the sun, an image which does not give an impression that the image is taken against the sun is displayed on the display screen of the external device 5.

Note, the present invention is not limited to the above third embodiment. For example, in the third embodiment as described above, a gain used in the amplifier 29 in the CCD 10 is changed in order to cope with the backlight state, however, by making the charging period in the condensers 24, where photo-electric converted charges are stored, in the CCD 10 be changeable on the basis of the contents of the IX information, it is possible to achieve the same object of the third embodiment of the present invention.

Further, various information is stored as magnetic information, however, the present invention is not limited to this. For example, in a case where information relating to image sensing operation is optically recorded on the film, by providing a known optical information detector to read the optical information, it is also possible to achieve the object of the third embodiment of the present invention.

Furthermore, according to the third embodiment, an image recorded on the film is projected on the CCD 10 via the optical system 9, however, it is also preferable to configure the image scanner 1 using a contact-type sensor which directly project an image recorded on a film on the CCD 10.

Fourth Embodiment

Next, a fourth embodiment will be explained below.

Figure 37:
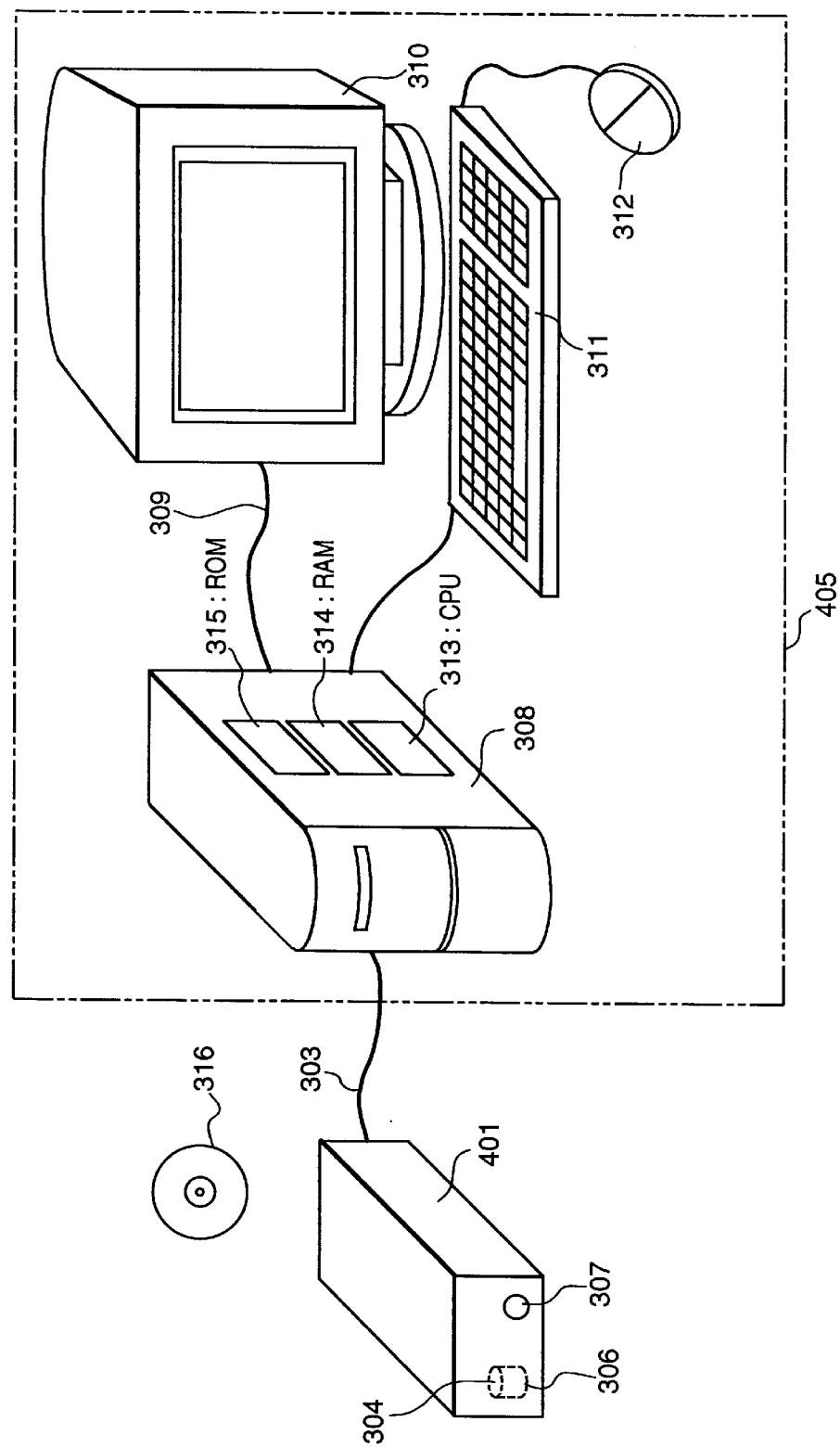
FIG. 37 is a view showing an overall configuration of an image read system according to a fourth embodiment of the present invention.

FIG. 37 is a view showing an overall configuration of an image read system according to the fourth embodiment of the present invention. Referring to FIG. 37, the image read system includes a film scanner 401 as an image read apparatus and a personal computer 405 as an information processing apparatus, which are connected to each other via a cable 303. The film scanner 401 and the personal computer 405 communicate in bi-direction. Further, although it is not shown in FIG. 37, the personal computer 405 is connected to an external storage device which includes a non-volatile memory, such as a magneto-optical disk 316, storing various information, such as an identifier (ID) information, and searches and reads the information stored in the external storage device.

The film scanner 401 has an eject table 306 for setting a film cartridge 304 in the film scanner 401, and a power switch 307 for turning the power to the film scanner 401 on or off.

The personal computer 405 has a personal computer main body 308 in which an application software, such as a driver software for operating the film scanner 401, is installed, a display device 310, such as a CRT or an LCD, connected to the personal computer main body 308 via a cable 309, and a keyboard 311 and a mouse 312 used in input operation to the personal computer main body 308. When the user inputs a desired instruction to the personal computer main body 308 using the keyboard 311 or the mouse 312, the personal computer main body 308 executes the application software, and operates the film scanner 401 and the display device 310 to display. Further, the personal computer main body 308 includes a CPU 313, a RAM 314, a ROM 315, and so on, and a driver for driving the external storage device to write and read to/from an external storage medium (e.g., magneto-optical disk) 316.

Regarding the configuration of a film used in the fourth embodiment, it is the same as that explained in the first embodiment with reference to FIG. 48, therefore, the explanation of it is omitted.

Figure 38:
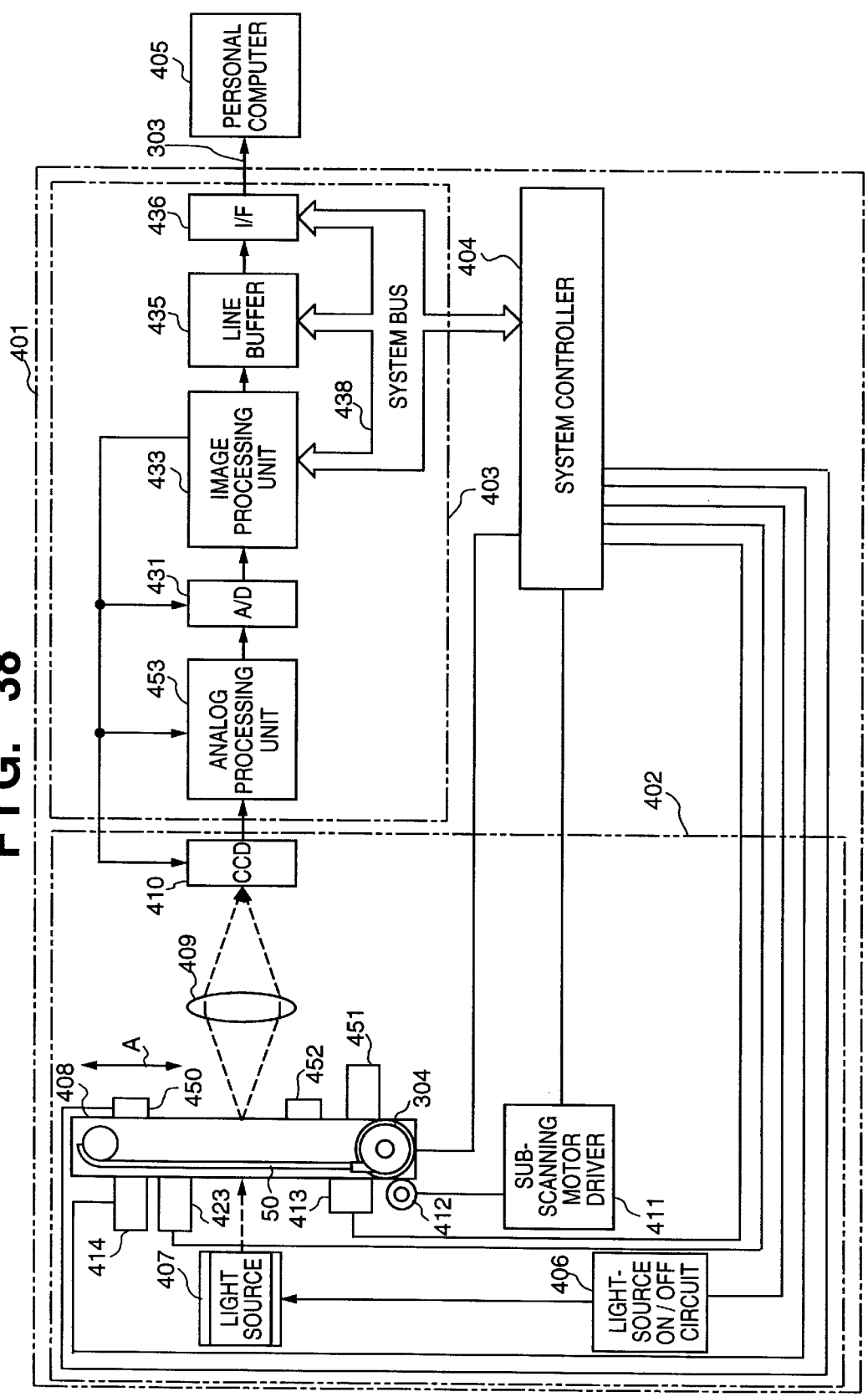
FIG. 38 is a block diagram illustrating a configuration of an image read system according to the fourth embodiment of the present invention.

FIG. 38 is a block diagram illustrating a configuration of the image read system according to the fourth embodiment. The film scanner 401 basically has a photoelectric conversion subsystem 402 for converting an optical image into an electric image signal, an image processing subsystem 403 for applying predetermined image processes to the electric image signal obtained from the photoelectric conversion subsystem 402, and a system controller 404 having a CPU, for controlling the photoelectric conversion subsystem 402 and the image processing subsystem 403, and a storage medium (ROM and RAM).

The photoelectric conversion subsystem 402 has a light source 407, basically configured with a cold-cathode xenon tube which turns on and off in accordance with an instruction from a light-source on/off circuit 406 controlled by the system controller 404, a film holder 408 for holding the film cartridge 304, an optical system 409, and a CCD 410, having three lines, respectively covered with red (R), green (G) and blue (B) filters, for converting an optical image passed through the optical system 409 into an electric image signal. The light source 407, the film holder 408, the optical system 409, and the CCD 410 are arranged in this order.

The film holder 408 is provided movable in the sub-scanning direction (in the direction of an arrow A) being driven by a sub-scanning motor 412, such as a stepping motor. At a proper edge portion of the film holder 408, a sub-scanning position detector 413 having a photo-interrupter is provided. The sub-scanning position detector 413 detects the position of a protuberant shape (not shown) of the film holder 408 as a reference position of the film holder 408 in the sub-scanning direction, and provides a detection signal of the protuberant shape to the system controller 4. In turn, the system controller 404 drives the sub-scanning motor 412 via a sub-scanning motor driver 411, thereby the film holder 408 is moved back and forth in the sub-scanning direction shown by the arrow A.

Note, the CCD 410 is provided in such a manner that the long side of the CCD 110 is normal to FIG. 38. In this arrangement, the main scanning direction, namely the long-side direction of the CCD 10, and the sub-scanning direction, which is the moving direction of the film holder 408, are orthogonal.

A magnetic information detector 414 includes a magnetic reproducing head and is provided at a proper position near the film holder 408. It obtains magnetic information recorded on the film, and provides an information signal to the system controller 404. Note, in the fourth embodiment, identification (ID) information is recorded as the IX (information exchange) information in the third magnetic track 522, shown in FIG. 48, and the magnetic information detector 414 reads the ID information.

Further, reference numeral 423 denotes a magnetic information write unit, and writes information on the third magnetic track 522.

Further, a perforation detector 450 detects the perforations 516, 517, 520, 521, 524 and 525, shown in FIG. 48, and provides a detection signal to the system controller 404. In the perforation detector 450, a timer for measuring an interval between the perforations and a memory are provided.

Reference numeral 451 denotes a cartridge sensor for checking whether or not the film cartridge 304 is set in the film holder 408, and an output signal from the cartridge sensor 451 is provided to the system controller 404. Further, reference numeral 452 denotes a feeding motor for pulling out the film from the film cartridge 304 and, inversely, rewinding the film into the cartridge 304.

The image processing subsystem 403 has an analog processing unit 453 for performing analog processes, such as clamping processing and sampling processing, on an electrical image signal (analog signal) outputted from the photoelectric conversion subsystem 402; an A/D converter 431 for converting the analog image signal processed by the analog processing unit 453 into a digital image signal; an image processing unit 433 configured with a gate array for performing predetermined image processes, such as γ correction and masking correction and outputting a clock signal for operating the CCD 410; a line buffer 435, configured with a general-purpose RAM for temporary storing image data outputted from the image processing unit 433; and an interface (I/F) 436, configured with a SCSI (small computer system interface) controller, for controlling interfacing operation to the personal computer 405. The image processing unit 433, the line buffer 435, I/F 436 are connected to the system controller 404 via a system bus 438, and these units are controlled by the system controller 404.

Next, operation of the image read system having a configuration as described above will be explained below.

Figure 39:
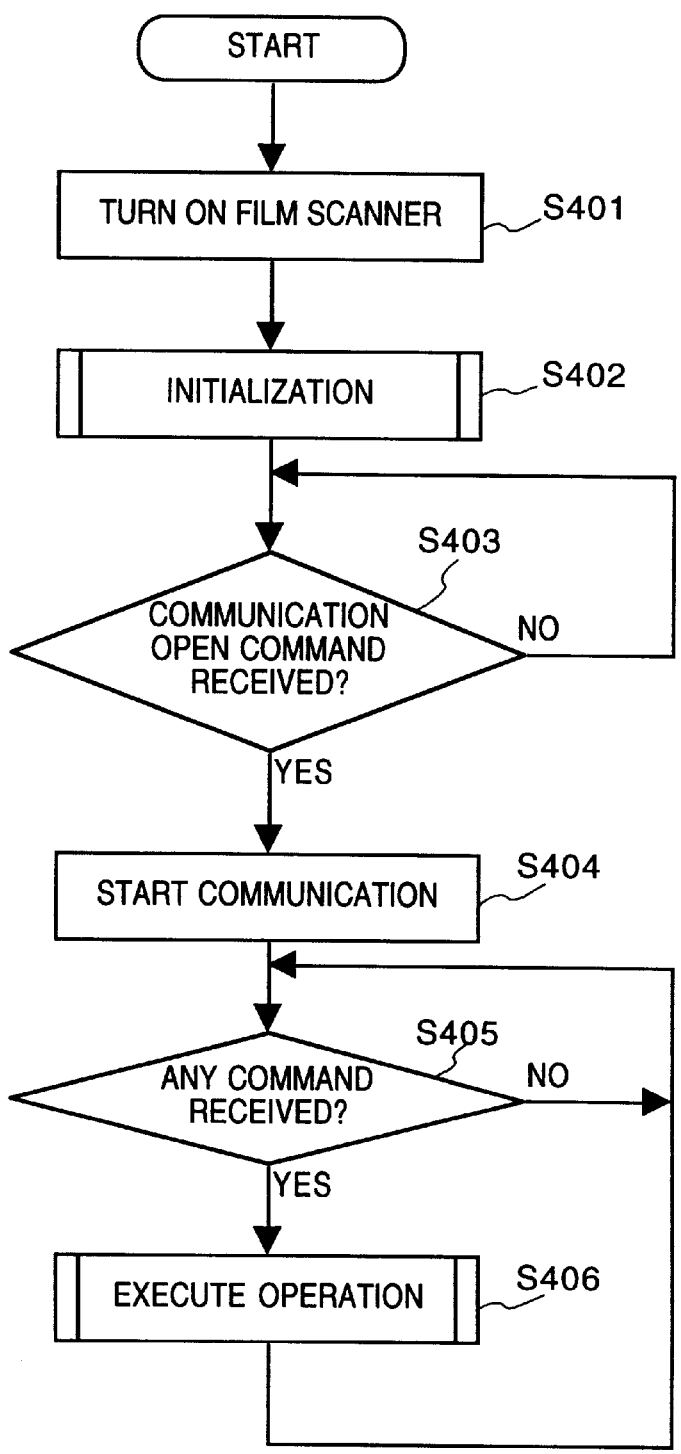
FIG. 39 is a flowchart showing a communication sequence in the film scanner when communicating with a personal computer according to the fourth embodiment of the present invention.

FIG. 39 is a flowchart showing a communication sequence in the film scanner when communicating with the personal computer according to the forth embodiment of the present invention.

After the film scanner 401 is turned on in step S401, initialization, which will be explained later, is performed in step S402. Then the process proceeds to step S403 where whether or not a communication open command is received from the personal computer 405 is determined. If NO in step S403, then the film scanner 401 goes to a stand-by state waiting for the command, whereas if YES, then the process proceeds to step S404 and the film scanner 401 starts communicating with the external device 405. Then, in the proceeding step S405, whether or not a command relating to an operation instruction is received is determined. If NO in step S405, then the film scanner 401 goes into a stand-by state waiting for a command, whereas if YES, then the film scanner 401 executes the operation in response to the received command in step S406, then the process returns to step S405.

Figure 40:
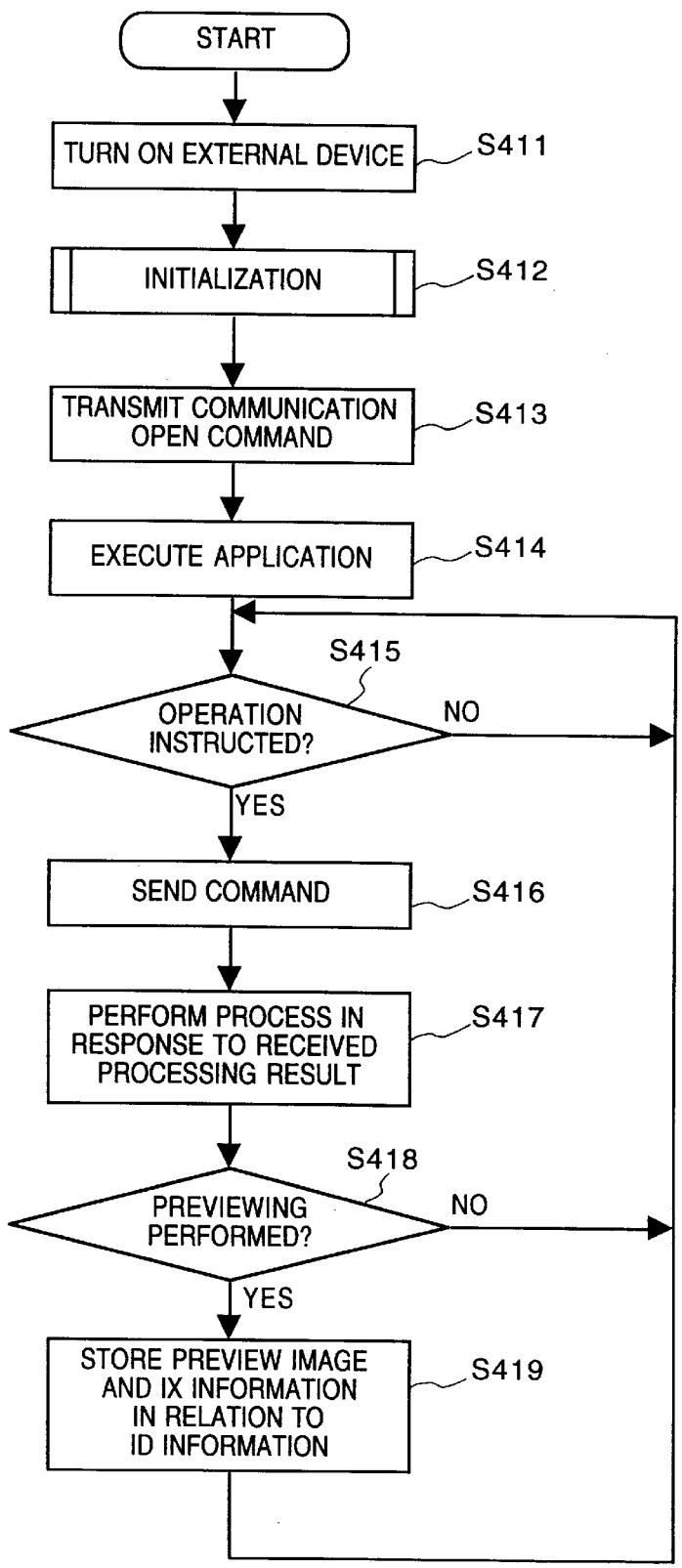
FIG. 40 is a flowchart showing a communication sequence in the personal computer when communicating with the film scanner according to the fourth embodiment of the present invention.

FIG. 40 is a flowchart showing a communication sequence in the external device when communicating with the film scanner according to the fourth embodiment of the present invention.

After the personal computer 405 is turned on in step S411, initialization, such as memory check, is performed in step S412, and a communication open command requesting to open communication is transmitted to the film scanner 401 in step S413. Next in step S414, an application software, such as a driver software, installed in the external device 405 is executed. In the proceeding step S415, whether or not a user instruction on the operation of the film scanner 401 has been received is determined. Note, the termination of the application is performed in response to a termination instruction by the user, and when such instruction is designated by the user, communication with the film scanner 401 is closed and the application is terminated.

When the determination in step S415 becomes YES in response to an instruction by the user, the driver software generates a command corresponding to the operation instruction designated by the user, and sends the command to the film scanner 401 in step S416. Thereafter, the process proceeds to step S417 where a processing result of the operation instruction is received from the film scanner 401, and the user is informed of the processing result.

Thereafter, the process proceeds to step S418 where whether or not previewing was performed in the film scanner 401 is determined. If the operation performed in the film scanner 401 is other than previewing (namely, NO in step S418), then the process returns to step S415. Whereas, if previewing was performed (YES in step S418), then the process proceeds to step S419 where a preview image or images as well as corresponding IX information are stored in an external storage device in relation to the ID information of the film stored in the third magnetic track 522. After the preview image or images and the IX information are stored in step S419, the process returns to step S415 and the subsequent processes are performed.

Figure 41:
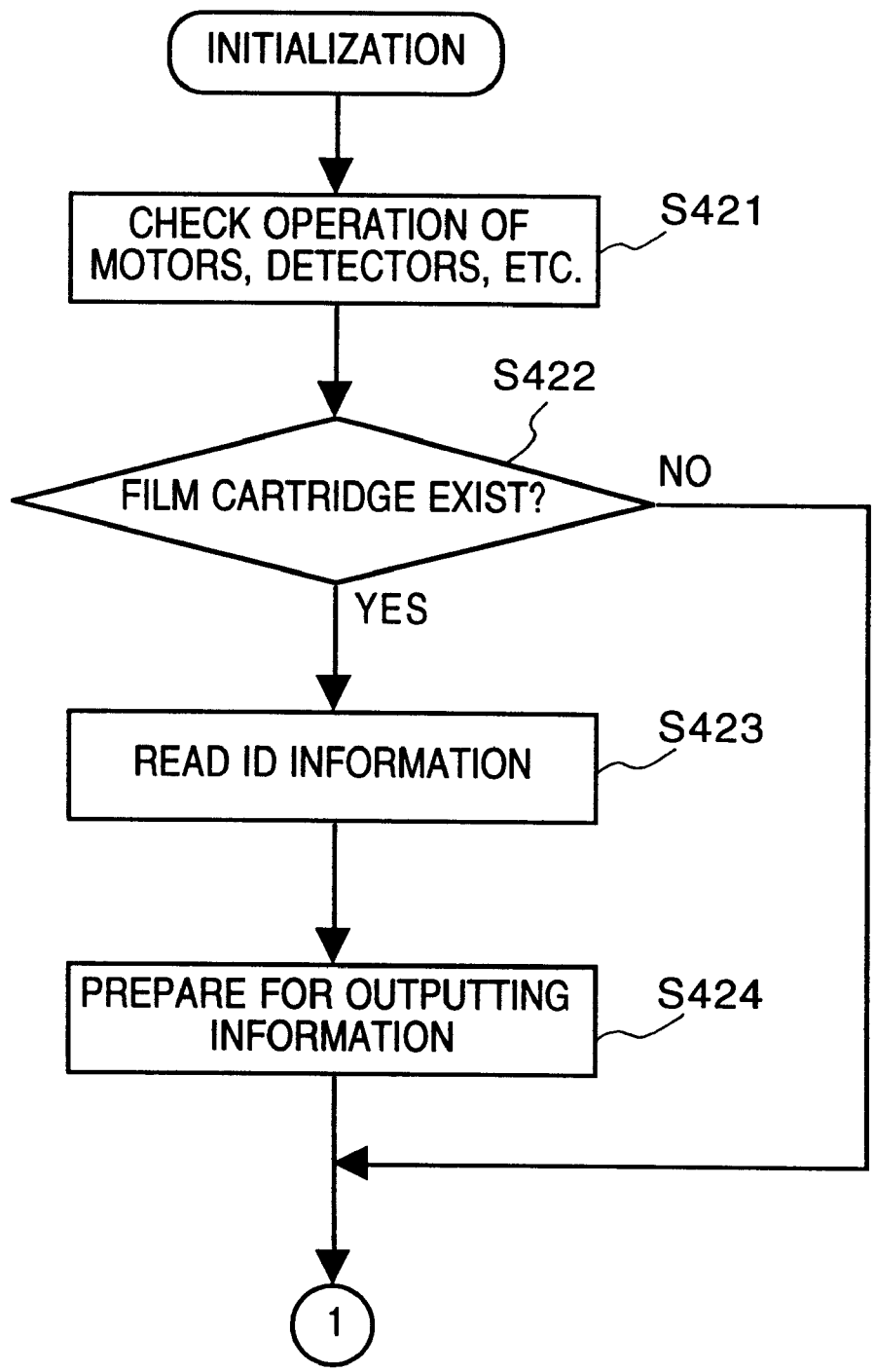
FIG. 41 is a flowchart of an initialization routine performed in the flowchart shown in FIG. 39.
Figure 42:
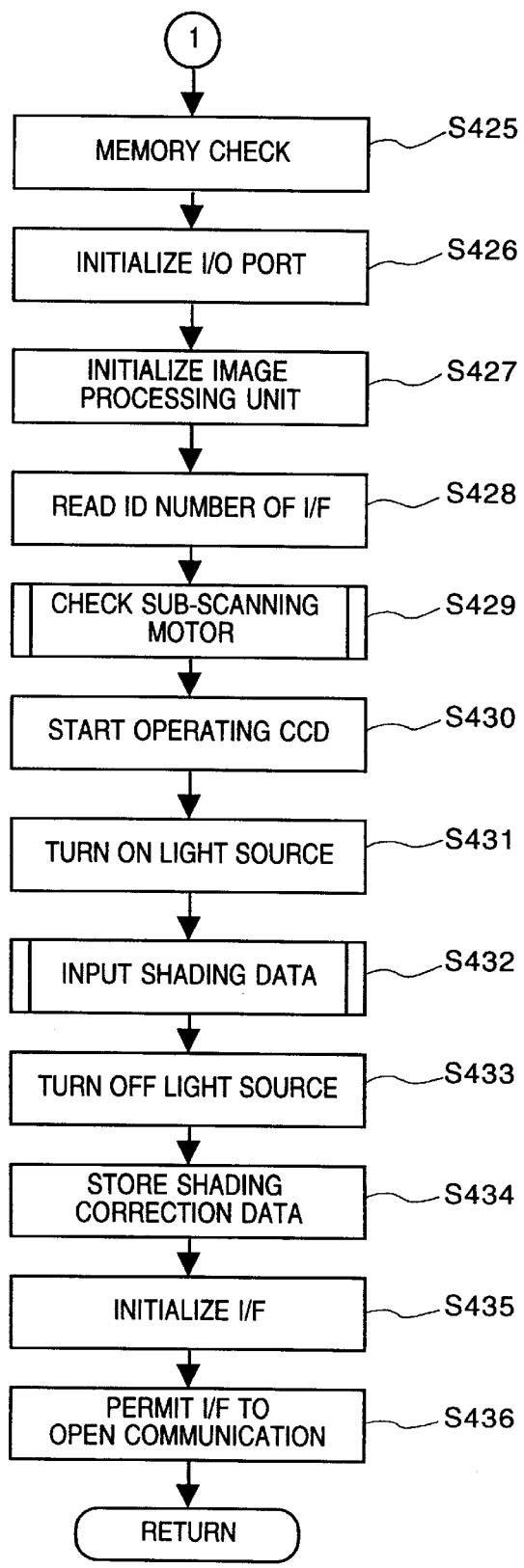
FIG. 42 is a flowchart of the initialization routine performed in the flowchart shown in FIG. 39.

FIGS. 41 and 42 are flowcharts of an initialization routine performed in step S402 shown in FIG. 39.

Referring to FIG. 41, in step S421, the respective detectors (sensors) 450, 451 and 414 are initialized, operations of the respective motors 413 and 452 are checked, and the quantity of light is checked. Then, in step S422, the system controller 404 determines whether or not the film cartridge 304 is set in the film holder 408 on the basis of the output signal from the cartridge sensor 451. If NO in step S422, the process proceeds to step S425 in FIG. 42, whereas, if YES, the process proceeds to step S423 where the feeding motor 452 is controlled while checking the detection result of the perforation detector 450, and the ID information recorded on the third magnetic track 522 is provided to the system controller 404 via the cartridge sensor 451. In the proceeding step S424, the system controller 404 prepares for outputting the ID information in response to a request from the personal computer 405, thereafter, the process proceeds to step S425 shown in FIG. 42. According to the fourth embodiment as described above, the ID information is prepared to be outputted anytime in response to a request from the personal computer 405 in the initialization routine which is performed right after the system is turned on.

Next in step S425 in FIG. 42, memory check is performed on the line buffer 435, and in step S426, initial settings of an input/output (I/O) port of the system controller 404 are performed. Further, in step S427, initial settings of the image processing unit 433 are performed so as to be ready for signal processes.

After the system controller 404 reads the ID number of the I/F 436 in step S428, the system controller 404 drives the sub-scanning motor 412 to move the film holder 408 to a predetermined sub-scanning initial position in step S429. Note, the sub-scanning position detector 413 is checked at this time.

Thereafter, the system controller 404 enables the image processing unit 433 to output a clock signal (operation clock) for operating the CCD 410 in step S430. Then, the process proceeds to step S431 where the system controller 404 issues a light source ON instruction to the light-source on/off circuit 406, and in step S432, inputs shading data.

The process proceeds to step S433 where the system controller 404 issues a light source OFF instruction to the light-source on/off circuit 406, and stores shading correction data in the line buffer 435 in step S434. Next in step S435, the system controller 404 initializes the I/F 436, the process proceeds to step S436 where the system controller 404 permits the I/F 436 to open communication. Thereby, the initialization of the film scanner 401 is completed, and the process returns to the routine shown in FIG. 39.

Figure 43:
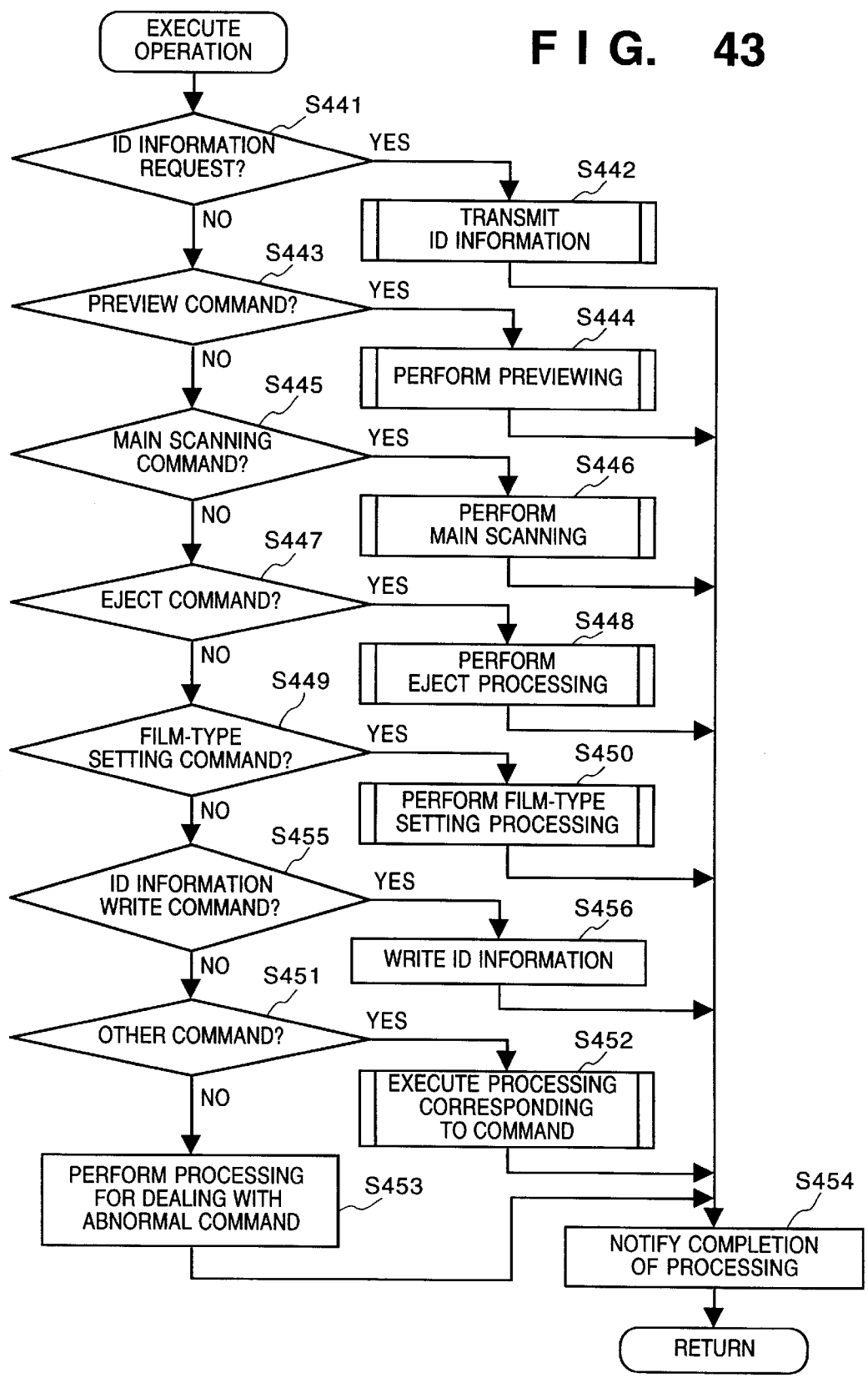
FIG. 43 is a flowchart of a command initiation routine in the flowchart shown in FIG. 39.

FIG. 43 is a flowchart showing a command initiation routine performed in the film scanner 401 in step S406 in FIG. 39.

First, in step S441, whether or not the operation command sent from the personal computer 405 is ID request command is determined. If YES, after ID information transmission (will be described later in detail) is performed in step S442, completion of the ID information transmission is informed to the personal computer in step S454, and the process returns to the routine shown in FIG. 39.

If NO in step S441, then whether or not the operation command sent from the personal computer 405 is a preview command is determined in step S443. If YES, after previewing (detail will be explained later) is performed in step S444, completion of the previewing is informed to the personal computer 405 in step S454, thereby the processing is completed. Whereas, if NO in step S443, then the process proceeds to step S445 where whether the transmitted command is a main scanning command or not is determined. If YES, then the process proceeds to step S446 where main scanning (detail will be explained later) is performed, then the completion of the main scanning is informed to the personal computer 405 in step S454, thereby completing the processing. Whereas, if NO in step S445, then the process proceeds to step S447 where whether the transmitted command is an eject command or not is determined. If YES, then the process proceeds to step S448 where the eject processing (detail will be explained later) is performed, then the completion of the eject processing is informed to the personal computer 405 in step S454, thereby completing the processing. Whereas, if NO in step S447, then the process proceeds to step S449 where whether the transmitted command is a film-type setting command or not is determined. If YES, then the process proceeds to step S450 where the film-type setting processing (detail will be explained later) is performed, then the completion of the film-type setting processing is informed to the personal computer 405 in step S454, thereby completing the processing. Whereas, if NO in step S449, then the process proceeds to step S455 where whether the transmitted command is an ID information set command or not is determined. If YES, then the process proceeds to step S456 where ID information transmitted from the personal computer 405 is recorded on the third magnetic track 522 by controlling the magnetic information write unit 423. Thereafter, the completion of the ID information recording processing is informed to the personal computer 405 in step S454, thereby completing the processing. Whereas, if NO in step S455, then the process proceeds to step S451 where whether the transmitted command is some other command or not is determined. If YES, then the process proceeds to step S552 where processing corresponding to the command is performed, then the completion of the processing is informed to the personal computer 405 in step S454, thereby completing the processing. Whereas, if NO in step S451, then the process proceeds to step S453 where it is determined that an abnormal command is inputted, and processing for dealing with the abnormal command is performed, then the completion of the processing is notified to the personal computer 405 in step S454, thereby completing the processing.

The ID information request in step S441 and the ID information transmission in step S442 are performed by exchanging information between the personal computer 405 and the film scanner 401 in the application execution routine initiated by the personal computer 405.

Figure 44:
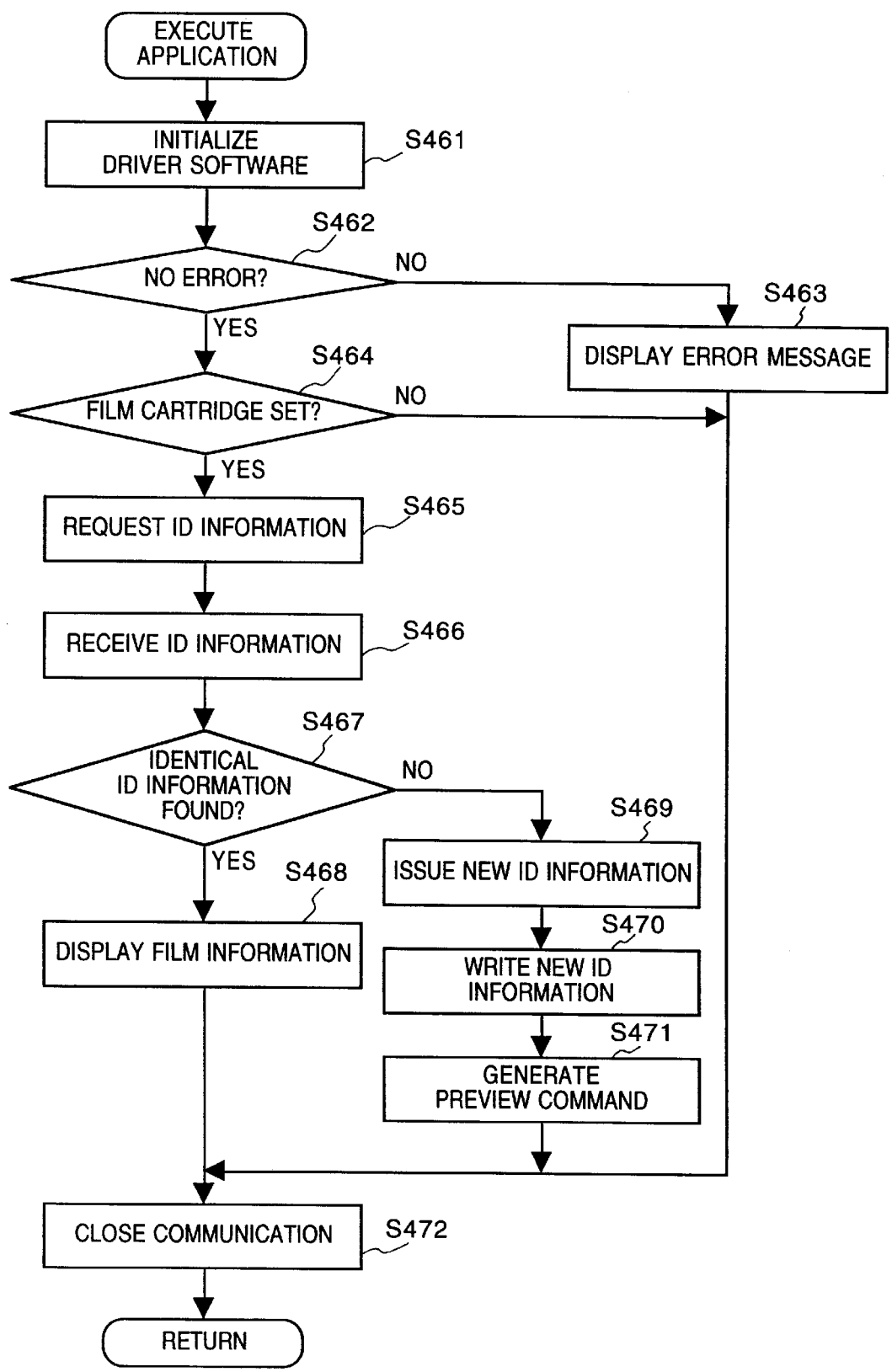
FIG. 44 is a flowchart showing a sequence of an application execution routine in the flowchart shown in FIG. 40.

FIG. 44 is a flowchart showing a processing sequence of the application execution routine performed in step S414 in FIG. 40. The ID information transmission (reception) and displaying of information, such as preview image or images and IX information, which are stored in the external storage device in relation to the ID information are performed while executing the application initiation routine.

First, in step S461, the driver software stored in the personal computer is initiated, then in the succeeding step S462, the communication state and the state of the film scanner 401 are checked. If any error is detected in step S462, then the process proceeds to step S463 where an error message is displayed. Thereafter, the communication is closed in step S472, and the process returns to the routine in FIG. 40.

Whereas, if no error is detected in step S462, the process proceeds to step S464 where whether or not the film cartridge 304 is set in the film holder 408 is determined. If NO, then the communication is closed in step S472, and the process returns to the routine in FIG. 40. Whereas, if YES in step S464, then the personal computer 405 requests the ID information to the film scanner 401 in step S465, and in the succeeding step S466, the system controller 404 outputs the ID information to the personal computer 405 in response to the request. More specifically, the ID information prepared in step S424 in the aforesaid initialization routine shown in FIG. 41 is transmitted to the personal computer 405 via the I/F 436 through the cable 303.

Next, in step S467, the personal computer 405 checks whether ID information identical to the received ID information had been received before or not by searching the stored contents in the external storage device (not shown). If the identical ID information had been received before, the personal computer 405 reads the associated information (referred to as "film information" hereinafter. Including, e.g., film type, serial number of film, information on camera which exposed the film, frame information, such as date, strobe light on/off information, and serial number of frame, and preview images) which are stored in relation to the ID information recorded in the external storage device, and displays them (preview images are displayed in multiple windows, for instance) on the display device 310 in a predetermined format in step S468. Thereafter, the communication is closed in step S472, and the process returns to the routine shown in FIG. 40.

Whereas, if no identical ID information is detected by searching the external storage device in step S467, the personal computer 405 determines that the film has never been read before or, if the film has been read before, the ID information of the film is missing. Accordingly, the personal computer 405 issues new ID information in step S469, and next in step S468, it issues an instruction to the system controller 404 to write the new ID information, using the magnetic information write unit 423, in the third magnetic track 522 of the film 513 shown in FIG. 48. Further, the personal computer 405 writes the new ID information in the external storage device in step S470, and prepares a preview command in step S471, then the communication with the film scanner 401 is closed in step S472, and the process returns to the routine shown in FIG. 40.

Note, the preview command prepared in step S471 is transmitted to the film scanner 401 in step S416 in FIG. 40. Accordingly, when a film having ID information which does not match any ID information stored in the external storage device is set, previewing is automatically executed in the fourth embodiment.

Figure 45:
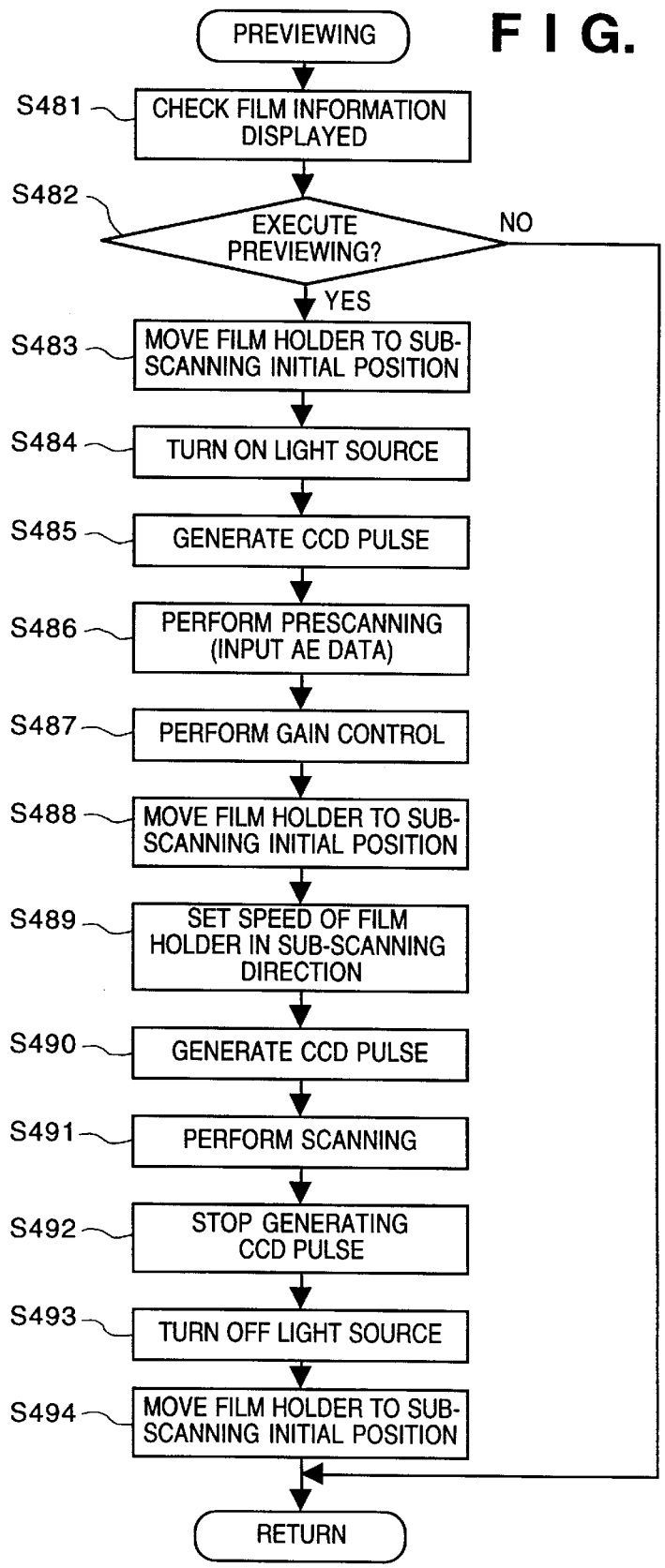
FIG. 45 is a flowchart showing a sequence of previewing in the flowchart shown in FIG. 43.

FIG. 45 is a flowchart showing a sequence of the previewing performed in step S444 in FIG. 43.

First in step S481, whether or not the film information which is stored in relation to the ID information is displayed is checked, then in step S482, whether the previewing needs to be performed or not is determined. If NO in step S482, then the process is terminated, and returns to the routine shown in FIG. 43. Note, in order to explain the overall flow of the previewing, steps S481 and S482 are shown in FIG. 45. However, these two steps are actually performed by the personal computer 405. Precisely, if NO in step S482, then a preview command is not transmitted in step S416 in FIG. 40.

Whereas, if YES in step S482, then the process proceeds to step S483. More specifically, a preview command is transmitted from the personal computer 405 to the film scanner 401 in step S416 in FIG. 40, and in response to this preview command, the subsequent processes of step S483 in FIG. 45 are performed. In step S483, the system controller 404 supervises the state of the sub-scanning position detector 413, and controls the sub-scanning motor 412 so as to move the film holder 408 to the sub-scanning initial position. The process proceeds to step S484 and the system controller 404 issues the light source ON instruction to the light-source on/off circuit 406, and in the next step S485, the system controller 404 enables the image processing unit 433 to generate the clock signal to the CCD 410.

The process proceeds to step S486, where pre-scanning is performed. In this step, the sub-scanning motor 412 moves the film holder 408 so that a central portion of the film is placed at the optical axis of the optical system 409, then data on the quantity of light (AE data) is obtained. Here, in the fourth embodiment, the CCD 410 is used as a quantity-of-light sensor, however, a separate sensor for exclusive use of measuring the quantity of light may be provided to measure the quantity of light.

Next, the process proceeds to step S487 where gain adjustment is performed on the basis of the input quantity-of-light data. More specifically, when the quantity of light is low, the gain is increased, whereas, when the quantity of light is too high, the gain is decreased, thereby adjusting the gain.

In the proceeding step S488, the sub-scanning motor 412 moves the film holder 408 to the sub-scanning initial position, and in step S489, the speed of the film holder 408 in the sub-scanning direction for the previewing is set. Thereafter, the resolution used in the previewing is set, and the clock signal is outputted from the image processing unit 433 to the CCD 410. Next in step S491, a signal processing area in the previewing is set to the image processing unit 433 and scanning of the film starts. While performing scanning, the IX information stored in relation to each frame is also read by the magnetic information detector 414, and transmitted to the personal computer 405.

Then, after the clock signal is stopped in step S492, in step S493, the system controller 404 issues the light source OFF instruction to the light-source on/off circuit 406. Then the process proceeds to step S494 where the position of the film holder 408 which is moved in the scanning in step S491 is returned to the sub-scanning initial position, then the processing is completed.

Figure 46:
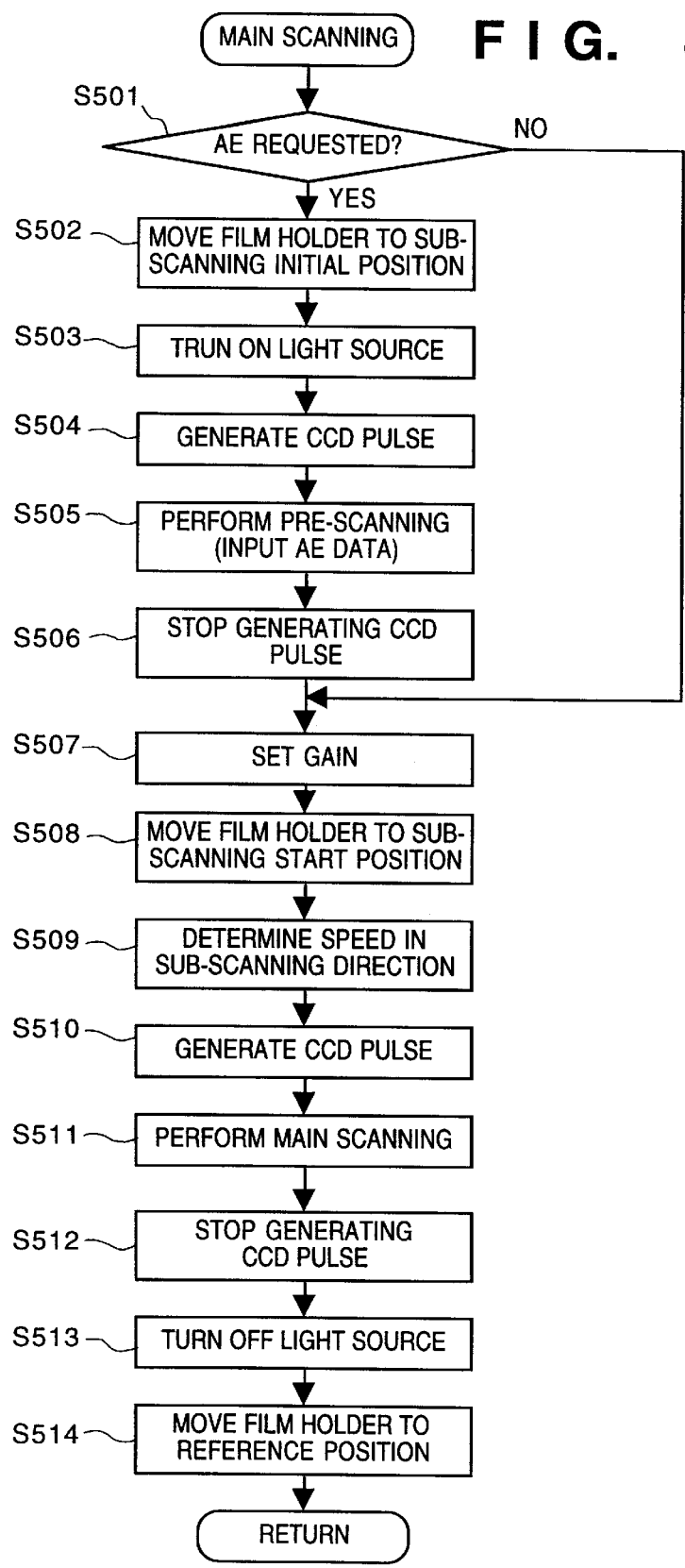
FIG. 46 is a flowchart showing a sequence of main scanning processing in the flowchart shown in FIG. 43.

FIG. 46 is a flowchart showing a sequence of the main scanning performed in step S446 in FIG. 43.

First, in step S501, whether or not a command for requesting the automatic exposure (AE) processing is included in the main scanning command is determined. If NO, then the process directly moves to step S507, whereas if YES, then the process proceeds to step S502 where the system controller 404 controls the sub-scanning motor 412 to move the film holder 408 to the sub-scanning initial position. Then, in step S503, the light source ON instruction is issued to the light source on/off circuit 406. The process proceeds to step S504 where the system controller 404 instructs the image processing unit 433 to generate a driving pulse for measuring the quantity of light, thereby enables the image processing unit 433 to generate the clock signal to the CCD 410.

Next in step S505, pre-scanning is performed, and a value of the density of an image recorded on the film is estimated on the basis of the measured quantity of light, then, after calculating a gain to be used, the process proceeds to step S506 where the clock signal to the CCD 410 is stopped, and the process proceeds to step S507.

In step S507, the gain is set. Next, in step S508, the system controller 404 controls the sub-scanning motor 412 to move the film holder 408 to a sub-scanning start position, where sub-scanning is started designated by, e.g., trimming information which indicates the size and shape of an image to be outputted. Next, in step S509, a speed of the film holder 408 in the sub-scanning direction is set in accordance with a resolution designated in the main scanning command. Thereafter, in step S510, settings for generating the CCD pulse in the main scanning direction are set to the image processing unit 433, in turn, the image processing unit 433 generates the clock signal to the CCD 410.

Next in step S511, the scanning range in the sub-scanning direction and the range of an image to be processed with image processes in the main scanning direction are determined in accordance with the designation included in the main scanning command, and the main scanning is performed. Note, by changing the start position of sub-scanning from the sub-scanning initial position, which is set when the image scanner is turned on, to the sub-scanning start position, it becomes unnecessary for a user to perform troublesome trimming operation. In addition, the range of the image to be applied with image processes is changed, and time for performing the image processes is shortened.

Next in step S512, generation of the clock signal 28 stopped, and in the proceeding step S513, the system controller 404 issues the light source OFF instruction to the light source on/off circuit 406. Further in step S514, the position of the film holder 408 which is moved while being scanned is returned to a predetermined reference position, thereby completing the main scanning and returning to the routine shown in FIG. 43.

The eject processing performed in step S448 in FIG. 43 is the same as that performed in step S50 in FIG. 31. More specifically, the processes are the same as those shown in FIG. 46. In step S371, the system controller 404 controls the sub-scanning motor 412 to move the film holder 408 to the sub-scanning initial position while supervising the sub-scanning position detector 413. In the proceeding step S372, the film holder 408 is moved toward outside of the film scanner 401 from the sub-scanning initial position by a predetermined number of pulses to a predetermined eject position, thereafter in step S373, the eject processing is completed by stopping providing electric power to the sub-scanning motor 412. Then, the process returns to the routine shown in FIG. 43.

Figure 47:
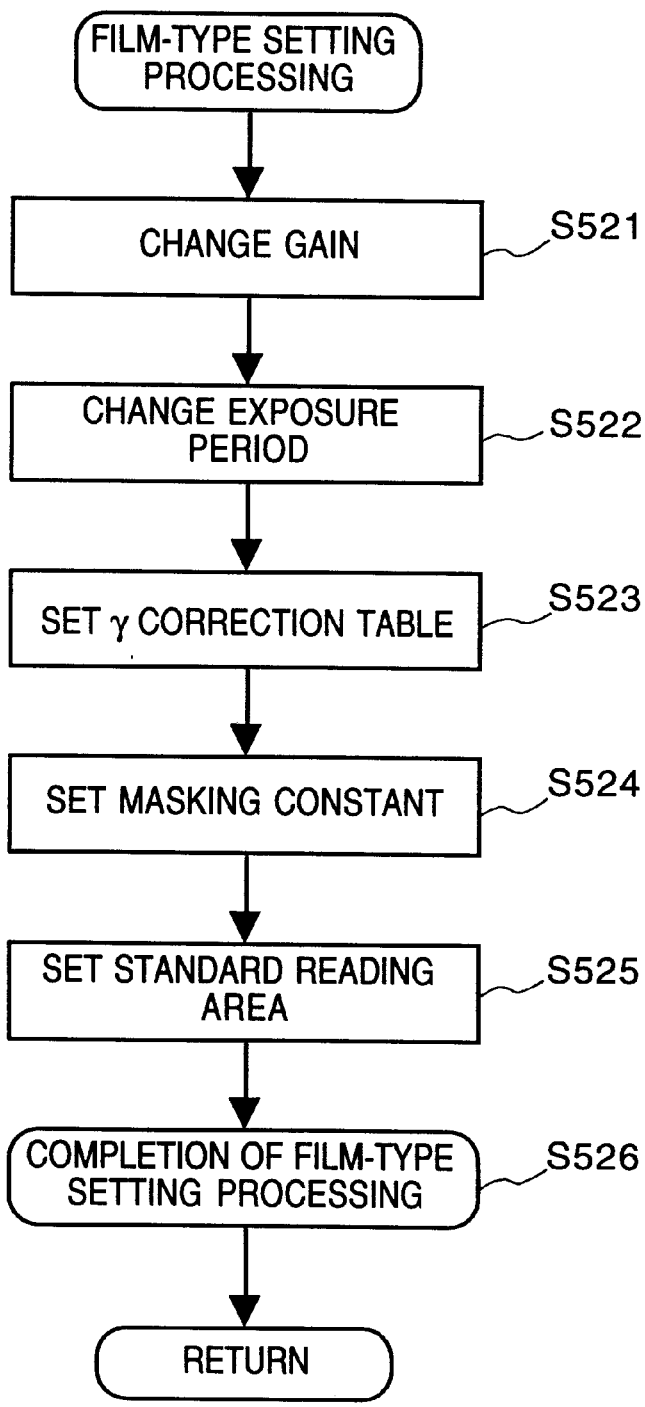
FIG. 47 is a flowchart showing a sequence of film-type setting processing in the flowchart shown in FIG. 43.

FIG. 47 is a flowchart showing a sequence of the film-type setting processing performed in step S450 in FIG. 43.

Referring to FIG. 47, in step S521, gain set in the amplifier is changed. More specifically, a film type is set to either a negative film or a positive film and, when negative film is set, parameters are set depending upon the color of the film base, setting for a 35 mm film or an APS™ film is performed, then the gain in the amplifier is changed to a predetermined gain.

In step S522, an exposure period of time is changed in dependence upon the setting of either the negative film or the positive film. At this time, the exposure period of time is also changed in correspondence with the density of an frame image recorded on the negative film, if necessary.

In step S523, a γ correction table suitable for the set film type is stored in the line buffer 435. Further, in proceeding step S524, a masking coefficient suitable for the set film type is set, and in step S525, a standard reading area is set, thereby the film-type setting processing is completed in step S526. Thereafter, the process returns to the routine shown in FIG. 43.

According to the fourth embodiment as described above, ID information is stored in the third magnetic track 522 which is a part of the film 513, and the film scanner 401 reads the ID information in initialization which is performed right after the film scanner 401 is turned on, and transmits the read ID information to the personal computer 405. In the personal computer 405, information on the film 513 (film information), such as preview images and IX information, is stored in relation to the ID information in a storage medium, such as an external storage device. Therefore, when a film which has been scanned before is to be read again, the film information which is stored in relation to the ID information of the film is obtained from the storage device and displayed, thus, it becomes unnecessary to perform prescanning of the film. As a result, time required for image processing can be saved.

Further, in the fourth embodiment, the personal computer 405 controls the film scanner 401 so that, when the ID information of a film matches ID information stored in the external storage device, previewing is not performed even when previewing is instructed by a user. However, the present invention is not limited to this, and, when previewing is instructed, after preview image or images stored in the external storage device are displayed, whether or not to perform previewing is asked to the user, and if YES, prescanning may be performed, and newly obtained preview image or images and their IX information may be stored over the old information. In this manner, it is possible to update film information in such a case where a part of information stored in the external storage device is destroyed.

Note, in the fourth embodiment, a preview image or images, ID information of a film, and IX information of each frame are stored in relation to the ID information in the external storage device, however, the present invention is not limited to this. For example, it is possible to store an image or images, obtained by main scanning, in relation to the ID information. In this case, in step S418 in FIG. 40, whether or not previewing or main scanning was performed is determined, and, if either of them was performed, image data and IX information obtained in the corresponding processing is stored in relation to the ID information in step S419. Note, the IX information is read in step S511 in FIG. 46 along with image data.

Other Embodiment

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

The present invention is not limited to the above embodiments and various changes and modifications can be made within the spirit and scope of the present invention. Therefore to appraise the public of the scope of the present invention, the following claims are made.

What is claimed is:

1. An image read system which reads an image recorded on a film capable of holding incidental information of the image in an area different from an area where the image is recorded, said system comprising:

reading means for reading the incidental information of the image recorded on the film, wherein the incidental information at least includes backlight state information indicating whether or not the image was taken against light or supplemental light on/off information indicating whether or not the image was recorded while turning on supplemental light;

processing means for processing the read image and the incidental information read by said reading means and outputting data of a single image; and control means for automatically controlling at least either a charge accumulation period for sensing the image or gain used for processing the read image on the basis of the backlight state information and/or supplemental light on/off information, wherein, when the backlight state information indicates that the image was taken against light and the supplemental light on/off information indicates that the image was sensed without turning on the supplemental light, said control means controls to accumulate charge for a longer period than a case where the above two conditions are not satisfied.

2. The image read system according to claim 1 further comprising display means for displaying the data of the single image outputted from said processing means.

3. The image read system according to claim 1, wherein the incidental information includes date information.

4. The image read system according to claim 3, wherein said processing means changes an output color of the date information.

5. The image read system according to claim 3, wherein said processing means automatically determines an output color of the date information on the basis of a color of the read image.

6. The image read system according to claim 3, wherein said processing means changes an output size of the date information.

7. The image read system according to claim 3, wherein said processing means changes a font of the date information.

8. The image read system according to claim 3, wherein said processing means changes an output position of the date information.

9. The image read system according to claim 3, wherein said processing means changes a format of the date information.

10. The image read system according to claim 1 further comprising recording means for recording output setting information of the incidental information, outputted as the data of the single image by the processing means, on the film, wherein said reading means reads the output setting information, and said processing means outputs the incidental information on the basis of the read output setting information.

11. The image read system according to claim 10, wherein the output setting information includes format, font, output size, output color, or output position, at least, of the incidental information.

12. The image read system according to claim 1, wherein the film is conforming to the advanced photo system.

13. An image read apparatus which reads an image recorded on a film capable of holding incidental information of the image in an area different from an area where the image is recorded, said apparatus comprising:

reading means for reading the incidental information of the image recorded on the film, wherein the incidental information at least includes backlight state information indicating whether or not the image was taken against light or supplemental light on/off information indicating whether or not the image was recorded while turning on supplemental light;

control means for automatically controlling a charge accumulation period for sensing the image on the basis of the backlight state information and/or supplemental light on/off information; and outputting means for outputting the read image and the incidental information read by said reading means, wherein, when the backlight state information indicates that the image was taken against light and the supplemental light on/off information indicates that the image was sensed without turning on the supplemental light, said control means controls to accumulate charge for a longer period than a case where the above two conditions are not satisfied.

14. The image read apparatus according to claim 13, wherein the incidental information includes date information.

15. The image read apparatus according to claim 13 further comprising input means for inputting output setting information of the incidental information and recording means for recording the output setting information inputted by said input means on the film, wherein said reading means reads the output setting information, and said outputting means outputs the output setting information.

16. The image read apparatus according to claim 15, wherein the output setting information includes format, font, output size, output color, or output position, at least, of the incidental information.

17. The image read apparatus according to claim 13, wherein the film conforms to the advanced photo apparatus.

18. An image read method for reading an image recorded on a film capable of holding incidental information of the image in an area different from an area where the image is recorded, said method comprising:

a reading step for reading the incidental information of the image recorded on the film, wherein the incidental information at least includes backlight state information indicating whether or not the image was taken against light or supplemental light on/off information indicating whether or not the image was recorded while turning on supplemental light;

a processing step for processing the read image and the incidental information read in said reading step and outputting data of a single image; and a control step for automatically controlling at least either a charge accumulation period for sensing the image or gain used for processing the read image on the basis of the backlight state information and/or supplemental light on/off information, wherein, when the backlight state information indicates that the image was taken against light and the supplemental light on/off information indicates that the image was sensed without turning on the supplemental light, in said control step the charge accumulation period is a longer period than a case where the above two conditions are not satisfied.

19. The image read method according to claim 18, further comprising a display step of displaying the data of the single image outputted in said processing step.

20. The image read method according to claim 18, wherein the incidental information includes date information.

21. The image read method according to claim 20, wherein, in said processing step, an output color of the date information is changed.

22. The image read method according to claim 20, wherein, in said processing step, an output color of the date information is automatically determined on the basis of a color of the read image.

23. The image read method according to claim 20, wherein, in said processing step an output size of the date information is changed.

24. The image read method according to claim 20, wherein, in said processing step, a font of the date information is changed.

25. The image read method according to claim 20, wherein, in said processing step, an output position of the date information is changed.

26. The image read method according to claim 20, wherein, in said processing step, a format of the date information is changed.

27. The image read method according to claim 18 further comprising a recording step of recording output setting information of the incidental information, outputted as the data of the single image in the processing step, on the film, wherein, in said reading step, the output setting information is read, and in said processing step, the incidental information is outputted on the basis of the read output setting information.

28. The image read method according to claim 27, wherein the output setting information includes format, font, output size, output color, or output position, at least, of the incidental information.

29. The image read method according to claim 18, wherein the film conforms to the advanced photo system.

30. An image read apparatus which reads an image recorded on a film capable of holding incidental information of the image in an area different from an area where the image is recorded, said apparatus comprising:

reading means for reading the incidental information of the image recorded on the film, wherein the incidental information at least includes backlight state information indicating whether or not the image was taken against light or supplemental light on/off information indicating whether or not the image was recorded while turning on supplemental light;

signal processing means for performing signal processes on an image signal of the read image in accordance with the incidental information read by said reading means; and control means for automatically controlling at least either a charge accumulation period for sensing the image or gain used for processing the read image on the basis of the backlight state information and/or supplemental light on/off information, wherein, when the backlight state information indicates that the image was taken against light and the supplemental light on/off information indicates that the image was sensed without turning on the supplemental light, said control means controls to accumulate charge for a longer period than a case where the above two conditions are not satisfied.

31. The image read apparatus according to claim 30, wherein said signal processing means has amplification means for amplifying the image signal with a changeable gain, and determines the gain in accordance with the incidental information.

32. The image read apparatus according to claim 30, wherein when the backlight state information indicates that the image is taken against light and the supplemental light on/off information indicates that the image is sensed without turning on the supplemental light, said signal processing means sets a higher gain to said amplification means than a case where the above two conditions are not satisfied.

33. The image read apparatus according to claim 30, wherein said reading means reads magnetic information magnetically recorded on the film.

34. The image read apparatus according to claim 30, wherein said reading means reads optical information optically recorded on the film.

35. The image read apparatus according to claim 30, wherein the film conforms to the advanced photo system.

* * * * *

UNITED STATES PATENT AND TRADEMARK OFFICE
CERTIFICATE OF CORRECTION

PATENT NO.    : 6,249,362 B1
DATED         : June 19, 2001
INVENTOR(S)   : Sato et al.

It is certified that error appears in the above-identified patent and that said Letters Patent is hereby corrected as shown below:

<u>Title page,</u>
Item [56], under "U.S. PATENT DOCUMENTS," add
-- 4,574,319   3/1986      Konishi -- and
-- 5,822,083   10/1988     Ito et al. --

Signed and Sealed this

Twenty-third Day of July, 2002

Attest:

Attesting Officer

JAMES E. ROGAN
*Director of the United States Patent and Trademark Office*